(12) United States Patent  
Bazant et al.

(10) Patent No.: US 12,383,866 B2  
(45) Date of Patent: Aug. 12, 2025

(54) ION-SELECTIVE SEPARATION BY SHOCK ELECTRODIALYSIS

(71) Applicant: Massachusetts Institute of Technology, Cambridge, MA (US)

(72) Inventors: Martin Z. Bazant, Wellesley, MA (US); Kameron Conforti, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 961 days.

(21) Appl. No.: 17/414,215

(22) PCT Filed: Jan. 3, 2020

(86) PCT No.: PCT/US2020/012215  
§ 371 (c)(1),  
(2) Date: Jun. 15, 2021

(87) PCT Pub. No.: WO2020/142711  
PCT Pub. Date: Jul. 9, 2020

(65) Prior Publication Data  
US 2022/0040642 A1  Feb. 10, 2022

Related U.S. Application Data

(60) Provisional application No. 62/788,091, filed on Jan. 3, 2019.

(51) Int. Cl.  
*B01D 61/46* (2006.01)  
*B01D 61/52* (2006.01)  
(Continued)

(52) U.S. Cl.  
CPC .......... *B01D 61/461* (2022.08); *B01D 61/52* (2013.01); *B01D 61/54* (2013.01); *C02F 1/4691* (2013.01);  
(Continued)

(58) Field of Classification Search  
CPC ..... B01D 61/46; B01D 61/461; B01D 61/462  
See application file for complete search history.

(56) References Cited

U.S. PATENT DOCUMENTS 3,341,441 A * 9/1967 Giuffrida ............... B01D 61/52  
                                                              204/525  
4,115,225 A * 9/1978 Parsi ..................... B01D 61/52  
                                                              204/525

(Continued)

OTHER PUBLICATIONS

Sigma-Aldrich "Buffer Reference Center" (2009) web.archive.org/web/20090417003507/http://www.sigmaaldrich.com/life-science/core-bioreagents/biological-buffers/learning-center/buffer-reference-center.html (Year: 2009).*

(Continued)

*Primary Examiner* — Luan V Van  
*Assistant Examiner* — Alexander R. Parent  
(74) *Attorney, Agent, or Firm* — Modern Times Legal; Robert J. Sayre

(57) ABSTRACT

Ion-selective separation by shock electrodialysis is performed by applying a voltage differential between electrodes across a porous medium to selectively draw a first species in a liquid toward at least one of the electrodes to a greater degree than a degree to which a second species in the liquid is drawn toward the same electrode. The voltage differential creates a shock in the charged-species concentration in the bulk volume of the liquid within pore channels of the porous medium, wherein the concentration of the first species in a depleted zone of the liquid bulk volume between the shock and the ion-selective boundary is substantially lower than the concentration of the second species in the liquid bulk volume between the shock and the first electrode. A dilute stream including the second species is extracted from the depleted zone separate from a concentrated stream including the first species.

17 Claims, 34 Drawing Sheets

(51) Int. Cl.
| | |
|---|---|
| *B01D 61/54* | (2006.01) |
| *C02F 1/469* | (2023.01) |
| *C02F 101/00* | (2006.01) |
| *C02F 103/08* | (2006.01) |
| *C02F 103/10* | (2006.01) |
| *C25B 1/14* | (2006.01) |
| *C02F 101/20* | (2006.01) |

(52) U.S. Cl.
CPC .............. *C02F 1/4693* (2013.01); *C25B 1/14* (2013.01); *C02F 2101/006* (2013.01); *C02F 2101/20* (2013.01); *C02F 2103/08* (2013.01); *C02F 2103/10* (2013.01); *C02F 2201/46135* (2013.01); *C02F 2201/46145* (2013.01); *C02F 2201/4618* (2013.01)

(56) References Cited

U.S. PATENT DOCUMENTS

| | | | | |
|---|---|---|---|---|
| 8,801,910 | B2* | 8/2014 | Bazant | B01D 61/425 204/632 |
| 8,899,132 | B2 | 12/2014 | Takahashi | |
| 10,252,923 | B2* | 4/2019 | Ganzi | C02F 9/00 |

OTHER PUBLICATIONS

Deng et al. "Overlimiting Current and Shock Electrodialysis in Porous Media" Langmuir 2013, 29, 16167-16177 (Year: 2013).*

Schlumpberger et al. "Scalable and Continuous Water Deionization by Shock Electrodialysis" Environ. Sci. Technol. Lett. 2015, 2, 367-372 and SI (Year: 2015).*

Cleveland and Morris (Dictionary of Energy (Expanded Edition)—C (2009) p. 68-122 Elsevier) (Year: 2009).*

Pennathur et al. "Electrokinetic Transport in Nanochannels. 1. Theory" Anal. Chem. 2005, 77, 6772-6781 (Year: 2005).*

Rollings, et al., "Ion selectivity of graphene nanopores," 7 Nature Communications 11408 (Apr. 22, 2016).

Conforti, et al., "Continuous ion-selective separations by shock electrodialysis," 66 AIChE Journal e16751 (Aug. 17, 2019).

Alkhadra, et al., "Continuous Separation of Radionuclides from Contaminated Water by Shock Electrodialysis," 54 Environ. Sci. Technol. 527-536 (Dec. 3, 2019).

Alkhadra, et al., "Small-scale desalination of seawater by shock electrodialysis," 476 Desalination 114219 (Nov. 30, 2019).

Conforti, "Continuous Ion-selective Separation by Shock Electrodialysis," MIT Phd Thesis (Feb. 2019).

Mani, et al., "Deionization shocks in microstructures," 84 Physical Review E 061504 (2011).

Nam, et al., "Experimental Verification of Overlimiting Current by Surface Conduction and Electro-Osmotic Flow in Microchannels," 114 Physical Review Letters 114501 (Mar. 2015).

Deng, et al., "Overlimiting Current and Shock Electrodialysis in Porous Media," arXiv:1310.5719V1 <available at https://arxiv.org/pdf/1310.5719.pdf> (Oct. 21, 2013).

Deng, et al., "Water purification by shock electrodialysis: Deionization, filtration, separation, and disinfection," 357 Desalination 77-83 (2015).

Schlumpberger, et al., "Scalable and Continuous Water Deionization by Shock Electrodialysis," Environ. Sci. Technol. Lett. "Just Accepted" manuscript (Nov. 3, 2015).

Dydek, et al., "Overlimiting Current in a Microchannel," 107 Physical Review Letters 118301 (2011).

* cited by examiner

ION-SELECTIVE SEPARATION BY SHOCK ELECTRODIALYSIS

BACKGROUND

The discussion of the background state of the art, discussed below, may reflect hindsight gained from the disclosed invention(s); and these characterizations are not necessarily admitted to be prior art.

Deionization shocks were first discovered in nanochannels in microfluidic lab-on-a-chip devices. Zangle, et al., "On the Propagation of Concentration Polarization from Microchannel-Nanochannel Interfaces Part II: Numerical and Experimental Study," 25 Langmuir 3909-3916 (2009) built and modeled a microchannel system to directly observe the propagation of a deionization shockwave. Two microchannels with a negative surface charge were filled with a stagnant electrolyte and separated by a negatively charged nanochannel, which had sufficient charge in the dilute electrolyte to have overlapping double layers. The nanochannel acted as an ion-selective surface to initiate the shock; and, based on differences in color, they mapped the change in the concentration of an ALEXA FLUOR dye (Thermo Fisher Scientific) used as the salt. Their modeling showed that the depletion on one side and enrichment on the other could be described as a shock. The first experimental evidence of a concentration shock in a microchannel can be found in the work of Wang, et. al., "Million-fold Preconcentration of Proteins and Peptides by Nanofluidic Filter," 77 Anal. Chem. 4293-99 (2005), where experimenters studied a concentration-enrichment effect in their device. It was not until the work of Mani, et al, "On the Propagation of Concentration Polarization from Microchannel-Nanochannel Interfaces Part I: Analytical Model and Characteristic Analysis," 25 Langmuir 3898-3908 (2009), that the cause of the phenomenon was understood. Next, Kim, et al., "Direct Seawater Desalination by Ion Concentration Polarization," 5 Nat. Nanotechnol. 297-301 (2010), described a microfluidic device that used the concentration polarization to desalinate seawater. By passing current in the direction of flow and through a nanochannel junction, a concentration shock and a deionized region were formed leading up to the nanojunction. This deionized fluid was collected separately from the enriched brine/concentrate on the other side of the shock.

While the microfluidic experiments were critical to the current understanding of shock electrodialysis, they did not represent a system that could be used at a large scale. To produce any meaningful quantity of water, a massive number of parallel channels would need to be fabricated and operated. In a sense, porous media is a less stringently controlled, but much more compact system of interconnected parallel microchannels. Experiment and theory both pushed forward the idea of overlimiting current through a charged porous medium. Mani and Bazant, "Deionization Shocks in Microstructures," 84 Phys. Rev. E 061504 (2011), showed, through theory and simulation, the way a shock would develop and propagate in porous media. The transport processes that allowed the passing of overlimiting current in a microchannel with charged walls were described in modeling work in Dydek, et al., "Overlimiting Current in a Microchannel," 107 Phys. Rev. Lett. 118301 (2011), which showed that when confined to small pores (~100 μm), electroosmotic flow dominates transport, while, at even smaller pore diameters (~1 μm), surface conduction takes over. Later visualization experiments in Nam, et al., "Experimental Verification of Overlimiting Current by Surface Conduction and Electro-Osmotic Flow in Microchannels," 114 Phy. Rev. Lett. 114501 (2015), confirmed the regimes in which surface conduction and electroosmotic flow both play a role in sustaining overlimiting current in a microchannel.

The first shock electrodialysis experiments were reported in Deng, et al., "Overlimiting Current and Shock Electrodialysis in Porous Media," 29 Langmuir 16167-16177 (2013), which described the use of a microporous borosilicate glass frit (average pore size 500 nm) for the charged porous media to sustain overlimiting current. They built a radially symmetric device, which used copper dissolution (anode) and electrodeposition (cathode) as the electrode reactions to supply an overlimiting current through a copper sulfate electrolyte. The device was able to achieve a four-order-of-magnitude reduction in the concentration of copper sulfate, showing for the first time the possibility of shock electrodialysis (SED) as a water desalination technology. Theory for SED in porous media was also presented in that paper, explaining some of the effects of the interconnectivity of the pores and the scaling laws expected for current due to electroosmotic flow and surface conduction. It also directly showed the importance of surface conduction by demonstrating that overlimiting current could only be sustained when the charge of the porous medium matched that of the membrane near the depleted region. In Deng, et al., "Water Purification by Shock Electrodialysis: Deionization, Filtration, Separation, and Disinfection," 357 Desalination 77-83 (2015), the same device was demonstrated to have additional water-purification capabilities that are not present in other desalination technologies. Specifically demonstrated was filtration of large particles, separation of charged dye, and disinfection of *E Coli* strain K12. The device worked well and served to validate the theories that had been presented so far, but the radially symmetric geometry made scale-up difficult.

The next-generation device, described in Schlumpberger, et al., "Scalable and Continuous Water Deionization by Shock Electrodialysis," 2 Environ. Sci. Technol. Lett. 367-372 (2015) (hereafter, Schlumpberger 2015), employed a rectangular geometry to make future scale-up efforts easier. Schlumpberger 2015 showed that, with the new architecture, they could still achieve over 99.99% desalination. They also demonstrated that for a binary salt, the desalination was insensitive to the specific salt chosen. The desalination was only a function of the dimensionless current, given below as equation (1), where I is the current, $z_+$ is the charge number of the cation, $c_+$ is the concentration of the cation, F is Faraday's constant, and Q is the volumetric flowrate into the frit. Schlumpberger 2015 also reported the effect of electroosmotic flow on the water recovery in the system. Because the surface transport will always be occurring in the deionized region and because the electroosmotic flow is in the direction of the surface transport, an increase in water recovery results from an increase in applied current and, therefore, electroosmotic flow.

$$\tilde{I} = \frac{I}{z_+ c_+ FQ} \tag{1}$$

Methods and apparatus for desalination and liquid purification using macroscopic porous media and membranes, exploiting the formation of sharp gradients in salt concentration, referred to as "desalination shocks," driven by surface conduction and electro-osmotic flow, are described in U.S. Pat. Nos. 8,801,910 B2 and 8,999,132 B2, which are owned by the same entity as the present application and which likewise include Professor Martin Bazant as an inventor.

A desalination and purification system 10 from these earlier patents is shown in FIG. 1. A cationic porous medium (CPM) 12 with negatively charged pore channels 14 is in contact with an ion-selective boundary 16 in the form of a cation exchange membrane (CEM). A liquid including co-ions and oppositely charged counter-ions, charged impurities and/or charged droplets flows left-to-right as shown through the cationic porous medium 12. Direct electric current is passed from the cationic porous medium 12 through the cation exchange membrane 16; and a desalination shock forms at the CPM/CEM interface and propagates into the cationic porous medium 12, leaving behind a depleted region of fresh water (the term, "fresh water," as used herein, can represent potable water having less than approximately 10 mM of dissolved salts). Particles suspended in the input stream are also rejected by size or charge at the entrance to the cationic porous medium (at the left side of the cationic porous medium 12 in FIG. 1) and are further rejected by the shock within the cationic porous medium 12. The direction of flow for anions and cations in the system are shown with respective arrows. Though a gap for liquid flow is shown here between the anode 19 and the cationic porous medium 12, the anode 19 and cationic porous medium 12 can be in flush contact in other embodiments, and the source liquid can be directly injected into the porous medium 12.

The porous medium 12 has a rigid structure and has ideally a high surface charge. In one embodiment, the cationic porous medium 12 is a porous glass frit with approximately 1-micron pores, and the cation exchange membrane 16 is formed of a sulfonated-tetrafluroethylene-based fluoropolymer-copolymer (commercially available as a NAFION membrane from E. I. du Pont de Nemours and Company). Alternatively, the cationic porous medium 12 can take many other naturally occurring or artificially fabricated forms, such as the following:

- electrochemically prepared porous materials, such as anodic aluminum oxide with parallel nanopores;
- fused or packed beds of silica beads, latex spheres, or other colloid particles (see embodiment discussed below);
- zeolite materials;
- other types of porous glass or ceramic frits;
- porous polymer materials;
- functionalized polymers with large negative surface charge;
- cross-linked polymers; or
- porous metals or semiconductors with oxide coatings.

The cationic porous medium 12 can also be made from any of the following:

- polydimethylsiloxane (PDMS),
- polymethylmethacrylate (PMMA),
- other elastomeric materials,
- etched or milled glass,
- silicon or other semiconductors, or
- other solid materials with micro/nano-fabricated artificial pore networks extending therethrough.

The porous material may also contain ion-exchange resins or nanoporous materials to enhance counterion conductivity to the counterion-selective boundary. This will promote desalination shocks leading to strong salt depletion in the larger pores if the conduction paths for counterions have few interruptions. If, however, as in packed beds of ion-exchangers, the conduction paths terminate and produce transient enrichment and depletion regions at the pore scale, then mixing due to concentration polarization and nonlinear electro-osmotic flows can prevent the formation of desalination shocks, or cause them to widen, thereby lowering their salt separation efficiency. For this reason, particular embodiments involve porous materials that have pore thicknesses that mostly fall into an optimal range of negligible double-layer overlap and suppressed convection within the pores (e.g., 100 nm to 10 microns in aqueous solutions). The microstructure can also be anisotropic to optimize surface conduction to the membrane, while allowing for transverse flow to extract the desalinated fluid, as described below.

In the embodiment of FIG. 2, the cationic porous medium 12 is a packed bed of microspheres formed, e.g., of silica or latex. The microspheres can be loaded by flow into a tube 32 and condensed toward the end by centrifuge. This method also allows for easy porosity grading or other control of the spatial variation in microstructure of the cationic porous medium 12, by varying the loading strategy or type of particles. For example, finer particles can be employed (thereby reducing pore volume) in regions of the system where restricted fluid flow is desired. Accordingly, the packed bed of particles can have non-uniform porosity, surface charge, or microstructure on a scale at least an order of magnitude greater than average particle diameter to promote increased liquid flow through particular regions of the system. In other embodiments, the surface charge or microstructure can be substantially varied in different regions to control the spatial distribution of fluid flow through the system. Pressure buildup, however, may disrupt the packing and interfere with stable shock formation.

Many of the same types of materials can also be used in an anionic porous medium (in place of the cationic porous medium 12 shown in FIG. 1), with positive surface charge, such as positively charged polymeric porous materials, positively charged self-assembled monolayers or thin films on porous substrates, or artificially prepared surfaces by polymeric layer-by-layer deposition, starting from any of the cationic porous media listed above. With any of these cases of cationic or anionic porous media, the surface charge, surface ionic mobility, and/or electro-osmotic slip mobility can be enhanced by surface treatments, films, coatings, or self-assembled molecular layers.

To illustrate the principles behind the formation of the desalination shock, a channel for electrolyte liquid flow through the pore channels 14 in the cationic porous medium 12 is shown in FIGS. 3 and 4. As shown in FIG. 3, the pore walls 20 of the cationic porous medium 12 have a negative charge and attract excess positive ions from the liquid to form double layers 24 at the interfaces of the pore walls 20 and the liquid 22. Typically, the double layers 24 are thin compared to the channel thickness. The pore channels have a sufficient diameter, $h_p$ (e.g., at least 50 nm in water, or more generally, greater than the Debye length), to prevent overlap of double layers on opposite sides of the pore channel. The liquid volume 26 bounded by the double layers 24 is termed the "bulk liquid." More precisely, when the excess salt in the double layers 24, relative to the quasi-neutral solution, is subtracted, what remains is the effective volume of bulk electrolyte 26 filling the pores. As shown, the pore size, $h_p$, is greater than the Debye screening length, $\lambda D$; and $\lambda D$ is below 1 nm in seawater and can be as large as 100 nm in deionized water.

The pore channel 14 can be conceptually divided into three regions, as shown in FIG. 4. The liquid in the bulk volume 26 has a high charge content, or ionic conductivity, on the left side (as shown) where the initial liquid is introduced; as a result, electric current flows primarily through the bulk liquid here. In the center is a "shock region" 28 in which current flows shift from being primarily in the bulk liquid volume 26 (on the left side) to being primarily in the double layer 24 (to the right). The bulk liquid volume 26' in the region 30 to the right of the shock region 28 is depleted (i.e., has a very low content of charged ions, particles or droplets); consequently, the electrical resistance in the bulk liquid volume 26' in the depleted region 30 is lower than the electrical resistance along the double-layer interface 24. Accordingly, this depleted bulk liquid volume 26' can be regarded as being desalinated and/or purified compared with the initial liquid fed into the system 10. The fundamental mechanism for the formation of the depleted region 30 is surface conduction through the double layers 24, which becomes increasingly important compared to classical diffusion in the bulk liquid 26/26', as the salt concentration is reduced by the ion-selective surface (of the membrane 16 or electrode).

SUMMARY

Apparatus and methods for ion-selective shock electrodialysis are described herein, where various embodiments of the apparatus and methods may include some or all of the elements, features and steps described below.

A method for ion-selective separation by shock electrodialysis utilizes a system that includes at least one liquid conduit with at least one inlet port, at least one outlet port for a dilute stream, and at least one outlet port for a concentrated stream. The system also includes a first electrode and a second-electrode-and-ion-selective-boundary configuration selected from (a) a second electrode and at least one distinct ion-selective boundary and (b) a second electrode that also serves as the ion-selective boundary. The ion-selective boundary has a charge and is contained in the liquid conduit adjacent to a porous medium or that functions as the porous medium. The porous medium defines pore channels that are filled with the liquid and have a surface charge, wherein the charge of the ion-selective boundary and surface charge of the pore channels share a sign.

A liquid including a plurality of species is flowed into the inlet port and through the pore channels, forming a thin diffuse electrochemical double layer at an interface of the liquid and the charged surface of the pore channels in the porous medium with a liquid bulk volume beyond the double layer in the pore channels. A voltage differential is applied between the electrodes across the porous medium. The voltage differential has a magnitude set to selectively draw a first of the species in the liquid toward at least one of the electrodes at a proportion greater than a proportion of a second of the species is drawn toward the same electrode. Current at the electrodes is produced via the application of the voltage differential by either Faradaic reactions or by capacitive charging and discharging and create a shock in the charged-species concentration in the bulk volume of the liquid within the pore channels. The concentration of the first species in a depleted zone of the liquid bulk volume between the shock and the ion-selective boundary is substantially lower than the concentration of the second species in the liquid bulk volume between the shock and the first electrode. Electric current flows primarily through the double layers or micropores in the region between the shock and the ion-selective boundary, while electric current flows primarily through the liquid bulk volume in the region between the shock and the first electrode. The dilute stream is extracted from the depleted zone of the bulk volume in the porous medium by flow to the at least one outlet port for the dilute stream between the shock and the ion-selective boundary. The first species is flowed in the concentrated stream on an opposite side of the shock from the depleted zone, wherein at least one outlet port for the concentrated stream is separated across the porous medium from the at least one outlet port for the dilute stream by the shock and not by a membrane.

While the separation of magnesium ions from sodium ions is particularly discussed, herein, the disclosed techniques and guidance provided by the various examples can be used to selectively separate other ions from different ions in solution.

In other embodiments, there are a wide variety of properties of ions and more generally suspended particles, molecules or droplets that may play an equal or larger role in selective separation during shock ED, such as hydrated ion or molecular size, ion/droplet/particle polarizability (or dielectric decrement) and specific non-electrostatic interactions (e.g., Van de Waals, hydration forces) between different ions and suspended particles (not only those being separated) and especially complex interactions between ions or suspended particles and charged surfaces in the porous medium in the salt-depleted region behind the shock wave.

Additionally, ions may be separable in monovalent ion mixtures (e.g., separating radioactive $Cs^+$ from $Na^+$ and $Li^+$). Besides separating by ion valence, different small ions may be separable in the Hofmeister series based on differences affecting solubility of proteins (these are mainly the "hydration forces"); further, one may be able to separate proteins or other macromolecules; or sugars and other small molecules; or nano-emulsions (e.g., oil/water) or different miscible or immiscible liquid-electrolyte mixtures (such as battery electrolytes, possible with some water or other contaminants); or nanoparticles (e.g., graphene flakes, Au/Pt/Pd nanoparticles for catalysis, composites or other applications).

Separation may also be performable based on solvated ion size, not only in water, but also in organic electrolytes and ionic liquids used in batteries, such as $Li^+$ or $PF_6^-$ from larger room-temperature ionic-liquid ions, such as 1-Butyl-3-methylimidazolium (BMIM), 1-Ethyl-3-methylimidazolium (EMIM), bis(trifluoromethane)sulfonimide (TFSI) or organic solvents, such as ethylene carbonate (EC)/diethyl carbonate (DEC)/dimethyl carbonate (DMC).

It is also possible to selectively enrich something in the dilute stream while simultaneously pulling something(s) out or pulling everything else out of that same dilute stream. One example is a highly polarizable but uncharged particle being enriched in the dilute stream while some salt(s) is/are simultaneously removed from the dilute stream and enriched in the concentrated stream.

Any or all of the above separations may be performed simultaneously based on any number of differences in physical and/or chemical properties; and the effects are not limited to an aqueous environment.

In short, the methods can be used to (a) selectively remove something (e.g., ion, charged particle, uncharged particle, bacteria, virus, spore, droplet, molecule, or anything else entrained, suspended, or dissolved in the fluid) from the dilute stream; (b) selectively enrich something in the dilute stream; (c) completely deionize the dilute stream; and/or (d) selectively enrich something in the concentrated and/or electrode stream(s).

Figure 1:
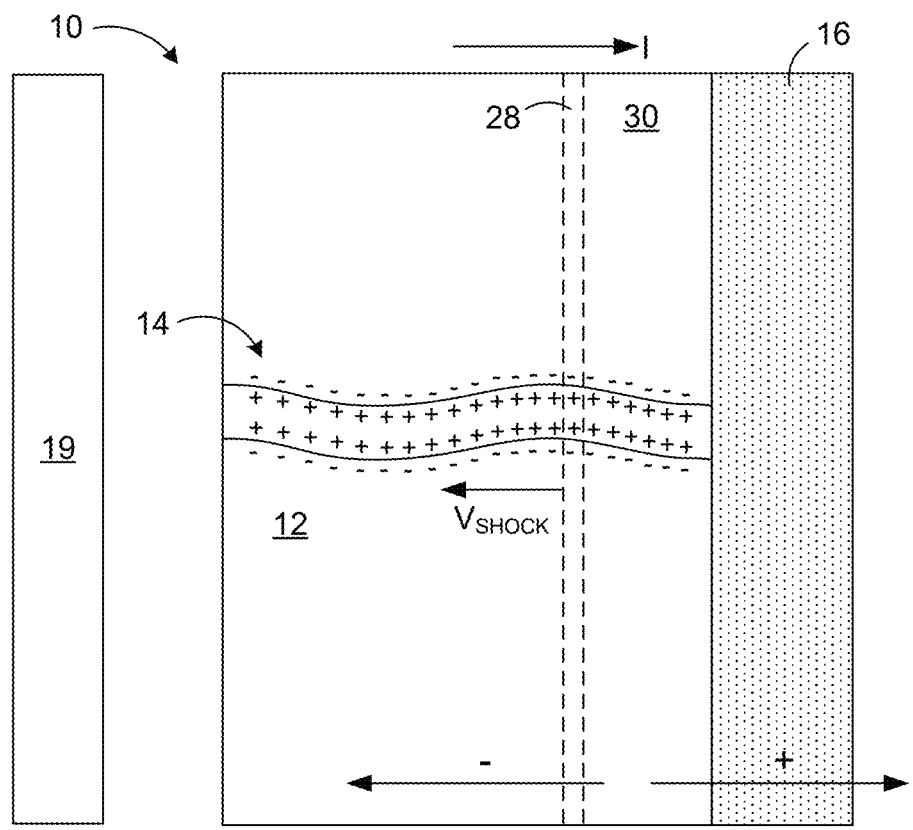
FIG. 1 shows the basic elements of a shock electrodialysis system, including a cationic porous medium (CPM) with negatively charged pores in contact with a cation exchange membrane (CEM).
Figure 2:
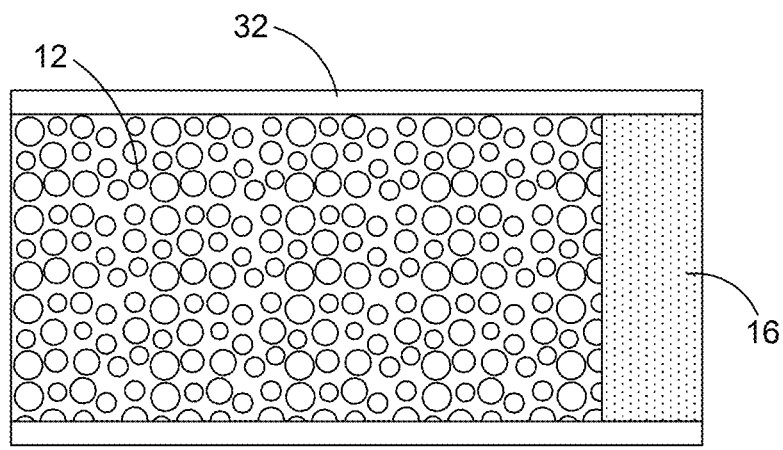
FIG. 2 shows another embodiment of the system of FIG. 1, where the cationic porous medium is a packed bed of micron-sized negatively charged beads (e.g., silica or latex) in a liquid-filled tube or column.
Figure 3:
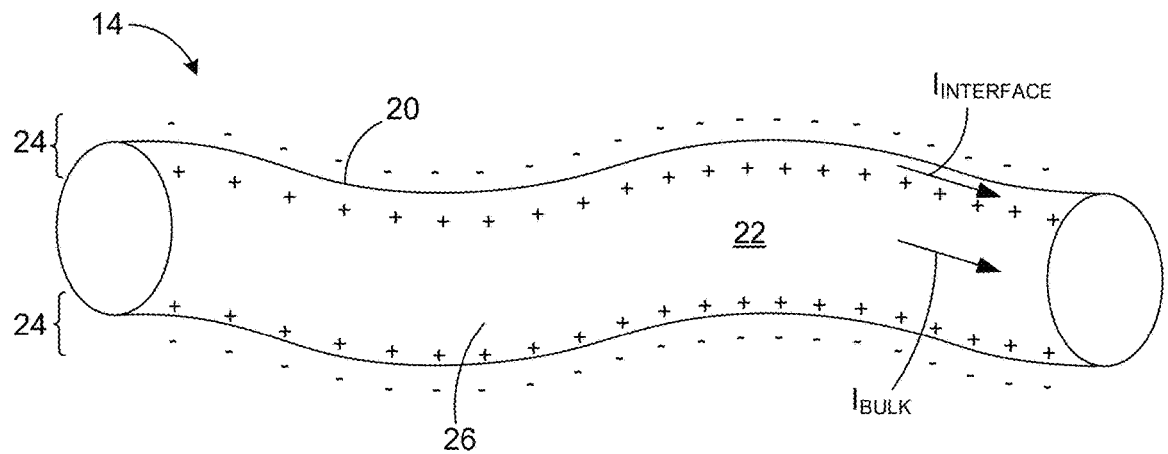
FIGS. 3 and 4 are illustrations intended to explain the basic physics of shock formation in a charged pore filled with a liquid electrolyte.
Figure 4:
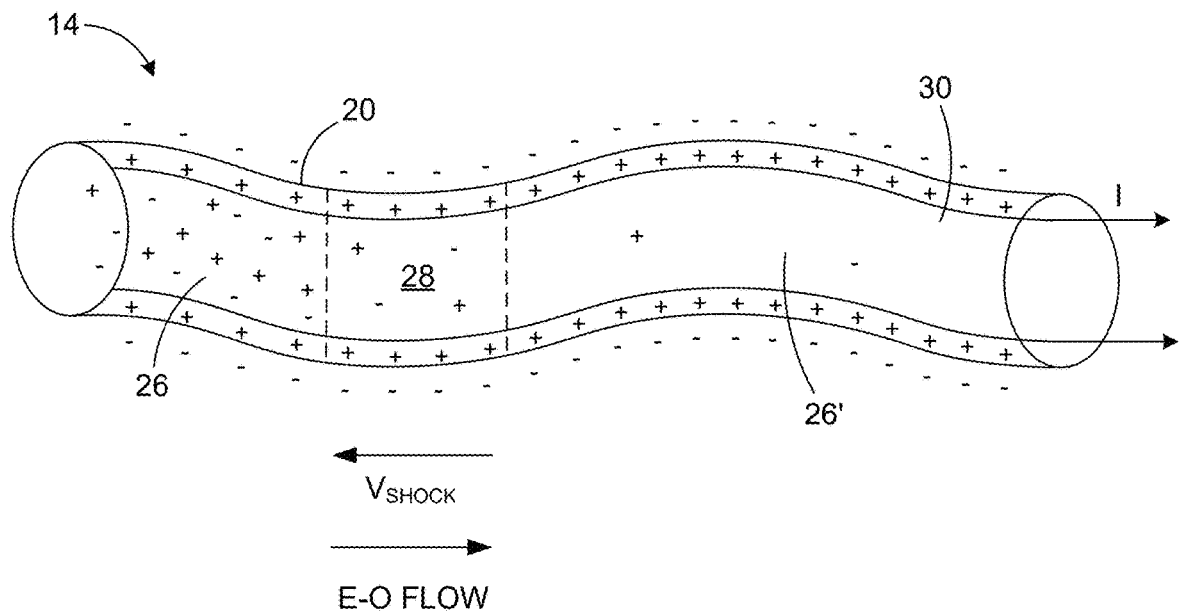

In the accompanying drawings, like reference characters refer to the same or similar parts throughout the different views; and apostrophes are used to differentiate multiple instances of the same or similar items or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Figure 5:
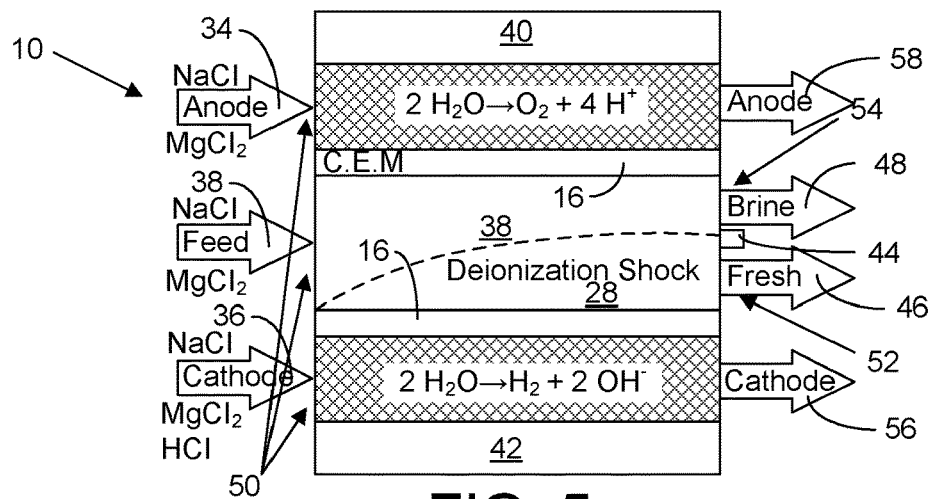
FIG. 5 is a schematic illustration of a device performing shock electrodialysis (SED).

Operating Principle:

Shock electrodialysis operates by passing a high current through an electrolyte that is confined by charged walls. At sufficiently high (overlimiting) current, a sharp deionization front (called a shock) emerges and begins to propagate. In the depleted region, current is sustained by surface conduction and electroosmotic flow, which keep ions close to the walls while the bulk fluid is deionized. In cross flow, the deionized fluid can be collected separately from the rest of the electrolyte. An exemplification of a shock electrodialysis device 10 that accomplishes this separation is shown in FIG. 5.

The following discussion draws on the shock electrodialysis work described in Schlumpberger 2015 and U.S. Pat. No. 8,901,910 B2; and the present invention builds thereupon.

SED Exemplification:

Following the scalable and continuous SED architecture, as described in U.S. Pat. No. 8,801,910 B2, a prototype was built that utilizes three inlet streams (two electrode flush streams and one feed stream) and that produces four outlet streams (two electrode flush streams, one concentrated stream, and one dilute stream), which are supplied to the device by ⅛-inch VITON tubing and connected to the pumps by polypropylene quick-turn barbed tube plugs. The top and bottom of the device were made of cast acrylic, which serves as a porting plate for these streams. The tubes were secured in the porting plates by LOCTITE 414 super glue. Four 1/16-inch VITON gaskets were used to seal the device and provide the channels for the electrode flushes. The electrodes used were a platinum mesh (from Alfa Aesar) and were connected to a KEITHLEY 2450 sourcemeter by titanium wires. The electrode channels were fluidically separated from the porous frit (Adams & Chittenden Scientific Glass, ultrafine, pore size 0.9-1.4 μm, BET internal area of 1.75 m2/g, mass density of 1.02 g/cm3, porosity of 0.31, and dimensions of 20 mm×10 mm×8 mm) by a cation exchange membrane (NAFION N112 membrane). DEVCON 5 MINUTE Epoxy was used to secure the frit to the acrylic frit holder. The splitter was made of cast acrylic and sealed to the frit by GORE expanded-polytetrafluoroethylene (ePTFE) gasket tape (0.01 inch). 316-stainless-steel nuts, bolts, and washers were used to hold the layers of the device together.

Drawings for all of the parts were made in SOLIDWORKS computer-aided design software and COREL-DRAW graphic design software. The vertical bolt holes and small-diameter fluid holes were cut into the acrylic porting plates by a laser cutter. The fluid holes were drilled out to ⅛ inch for half of the thickness of the acrylic plates to eventually hold the ⅛-inch VITON tubing. The horizontal bolt holes and the alignment pin holes were drilled manually, taking care to avoid all of the vertical holes in the porting plate. The bolt holes and alignment-pin holes were cut into the splitter by the laser cutter. The splitter, itself, was created by several passes of rastering on the laser cutter. The GORE gasket tape was cut by the laser cutter. The acrylic frit holder was cut by the laser cutter, and the surfaces that will be attached to the frit were roughened by 120-grit sandpaper. The membranes were boiled for one hour in 3% hydrogen peroxide, rinsed in $diH_2O$, boiled for two hours in $diH_2O$, boiled for one hour in 0.5 M $H_2SO_4$, rinsed 3× in boiling $diH_2O$, and then cut to size with scissors. The membranes were stored in $diH_2O$ until use. The VITON gaskets were cut by tracing a template using a marker and then using a razor blade by hand. When using the blade, it was advantageous to push straight down instead of sliding along the cut lines to keep edges clean. For the bolt holes and fluid-inlet holes in the gasket, a circular punch was used. The platinum electrodes and the frit were used as-is.

The device was assembled by first soaking the frit in water and then securing it to the frit holder by epoxy and allowing it to cure overnight. During the first hour, the frit was kept wet by dripping water onto it. The water soaking minimizes the amount of epoxy that wicks into the frit. Second, the electrodes and titanium wires were attached to the innermost gaskets with a small amount of electrical tape. The top porting plate was held upside down, and five bolts (10-32) were put through five washers and then through the five bolt holes of the porting plate. Next, the outer VITON gasket was pushed on. Then, the inner gasket with the electrodes was pushed on such that the electrode and the wires were between the two gasket layers to ensure sealing. Next, the first membrane was laid in place, covering the open electrode channel but not the feed stream fluid holes and extending a few millimeters past the front face of the frit. The frit and frit-holder assembly were placed on top of the membrane and the VITON gaskets, holding the membrane in place. Then, the second membrane was laid down, completely covering the frit. Then, the inner VITON gasket with the electrode attached was pushed against the membrane and frit-holder assembly with the electrode facing up. The outer VITON gasket and bottom porting plate were pushed on next. Five washers and then five nuts were put onto the bolts, holding the assembly in place. Each nut was first tightened to 5 lb-in, then 10, then 15, and ultimately 20 lb-in of torque.

Feed solutions for the process include aqueous solutions with dissolved sodium (Na) and magnesium (Mg) ions. The Na—Mg feed solutions contained varied ratios of NaCl and $MgCl_2$ but a constant chloride concentration of 10 mM NaCl:$MgCl_2$=1:1 was 3.3 mM NaCl and 3.3 mM $MgCl_2$; 1:5 was 0.91 mM NaCl: 4.5 mM $MgCl_2$; 5:1 was 7.14 mM NaCl: 1.43 mM $MgCl_2$; 9:1 was 8.18 mM NaCl: 0.91 mM $MgCl_2$. These ratios were chosen deliberately. 1:1 was the first case studied; equal molar concentrations represent a good base case. Effluent concentrations will be shown to be as different as 5:1 in the dilute stream. The 5:1 case was then carried out as an artificial "second pass" of the separation. A true second pass would have been much more dilute than the 10 mM chloride concentration studied. 1:5 was chosen for symmetry, examining the behavior in the region of magnesium abundance. 9:1 was chosen to represent the sodium and magnesium relative abundances in seawater, though diluted by a factor of about 50, as described in Schlumpberger 2015.

The composition of the anode flush stream 34 was identical to that of the feed stream 38 (with reference to FIG. 5). The composition of the cathode flush stream 36 was similar to those of the anode flush and feed streams 34 and 38 but also included 50 mM HCl to prevent any precipitation of magnesium or lead hydroxides. This precipitation would have been particularly problematic at the cathode because of the significant production of hydroxide ions at the platinum electrode. The flowrate of the electrode flush streams 34 and 36 was 0.4 mL/min, and the flowrate of the feed stream 38 was 0.05 mL/min or 0.25 mL/min.

Figure 6:
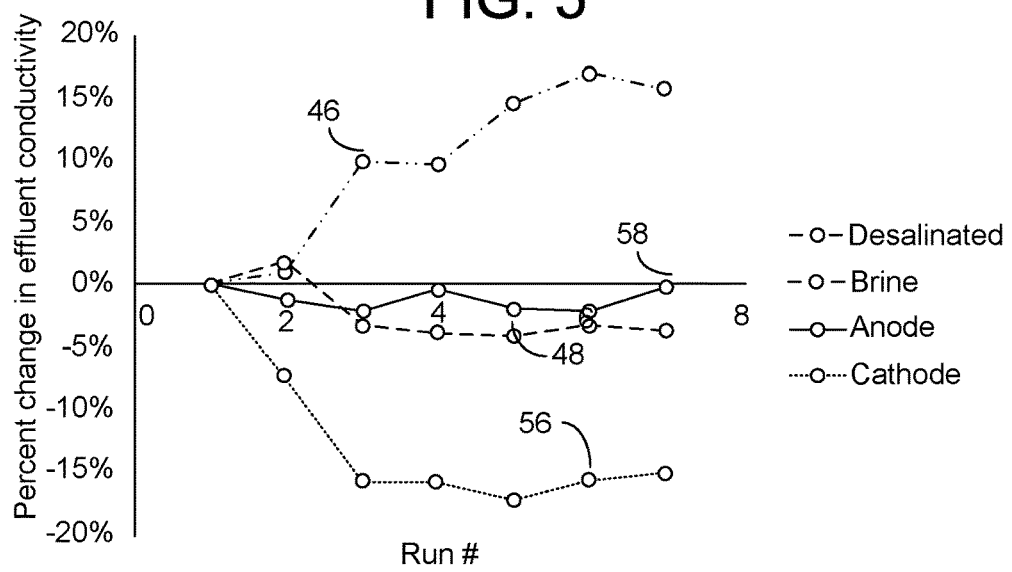
FIG. 6 is a chart plotting the change in effluent conductivities through initial runs with a newly assembled SED device with 3 mA applied.
Figure 7:
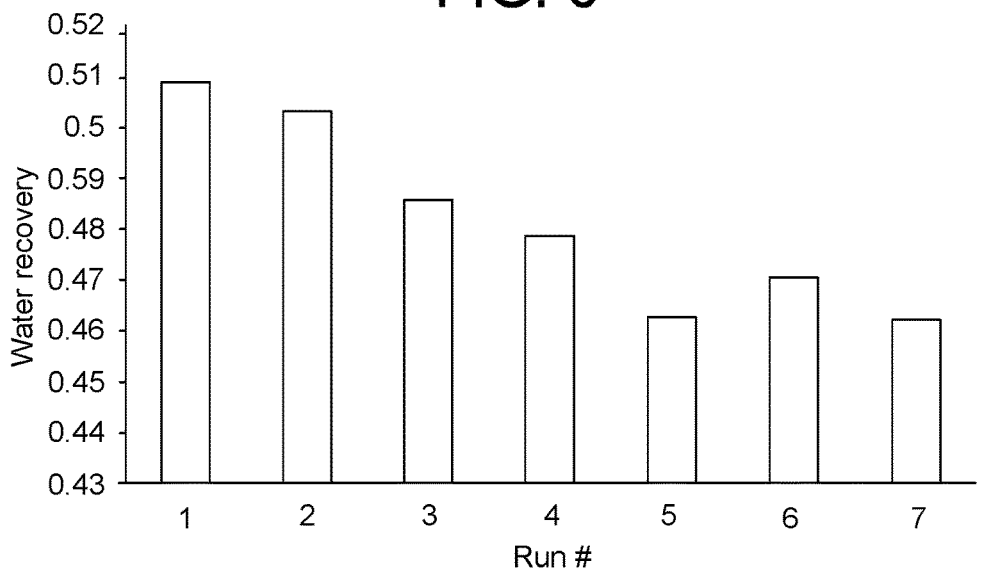
FIG. 7 is chart plotting the change in water recovery through initial runs of the new assembled SED device with 3 mA applied.

After the device was assembled, it was subject to some electrochemical conditioning to achieve repeatable performance. The steady-state voltage required to achieve 3 mA of current started above 10 V and settled into a value closer to 7.5V. At the highest current studied, 12 mA, the voltage response was noisy due to bubbles that were produced at the electrodes as products of the water-splitting reaction. FIGS. 6 and 7 show the conductivity and water recovery, respectively, for the device when 3 mA were applied. The percent change in conductivity is relative to the first run with the newly assembled device. The change settled out after about 4 runs. The water recovery stabilized over the same period.

Figure 8:
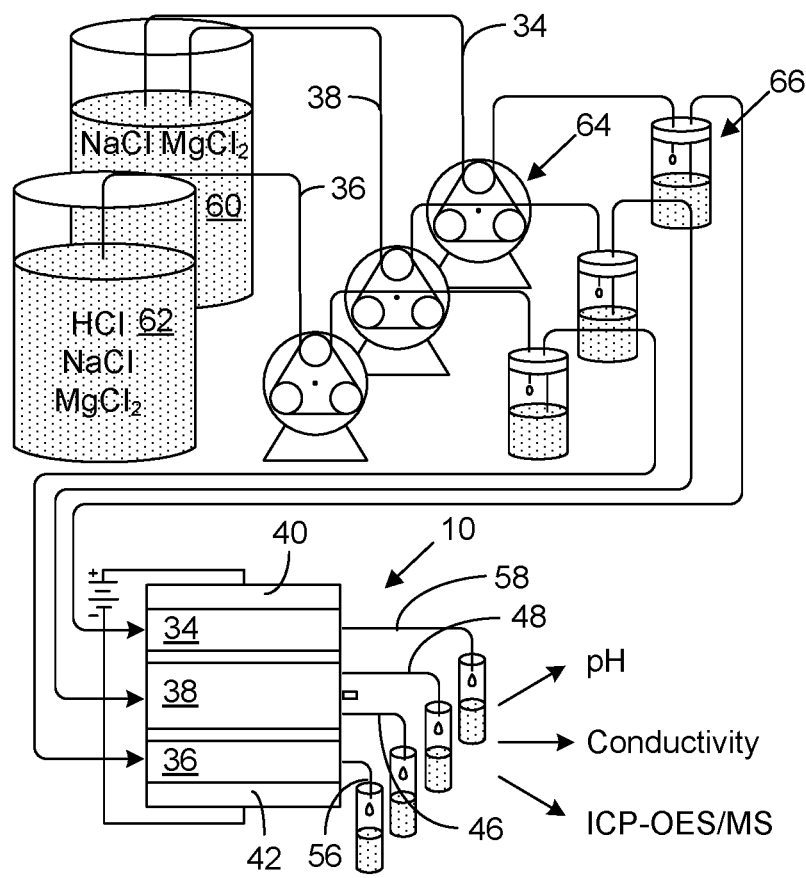
FIG. 8 is a schematic illustration of an experimental workflow.

FIG. 8 shows a schematic of the experiment workflow. The feed stream 38 and the electrode flush streams 34 and 36 were pumped from the reservoirs 60 and 62 to the SED device 10 by peristaltic pumps 64. To smooth out the pulsating flow from the peristaltic pumps 64, small buffer tanks 66 were used before the fluid entered the SED device 10. These sealed capacitors 66 were filled approximately halfway with solution. As solution dripped in, the headspace was pressurized, driving flow out through a tube extending to the bottom of the capacitor 66. At steady state, the pressure of the headspace was almost entirely unaffected by the pulsating drops entering, producing a very steady flow out of the capacitor 66 despite the oscillating input. After being passed through the SED device 10 to perform separation, all of the effluent streams 46, 48, 56, and 58 were collected and measured for volume, conductivity, pH, and sodium and magnesium composition by inductively coupled plasma—optical emission spectroscopy (ICP-OES).

The flowrate was allowed to equilibrate for 12 hours before current was applied via the electrodes 40 and 42, ensuring that the fluid capacitors were fully pressurized. The current was allowed to equilibrate for at least 2 hours to allow the voltage signal to reach a steady value. The current and voltage were set and measured by a KEITHLEY 2450 sourcemeter.

Conductivity was used as an initial confirmation that the SED device 10 was working properly. The conductivity of the brine/concentrate 48 was expected to increase from its initial value while that of the dilute stream 46 decreased. The conductivity of all streams was measured by a conductivity probe, calibrated daily.

pH was used to track the proton concentration throughout the system. This enabled the direct measurement of current efficiency. The pH was measured using a pH probe, calibrated daily.

After conductivity and pH were measured, the samples were diluted in nitric acid—to a final concentration of 2-weight-% nitric acid—to be used in the ICP-OES. Typical dilutions were 2× to 4× to bring down the concentration of the ions to avoid saturating the detector. Calibration standards were also generated by diluting in 2-wt % nitric acid.

The data generated by the ICP-OES were in the form of intensity vs. wavelength, in triplicate, for each sample taken. The data were post-processed to convert the signals into concentrations. First, the signals from the "blank" samples, consisting of 2-weight-% nitric acid with no additional ions, were averaged to provide a baseline background signal intensity. This baseline was subtracted from all of the signals from every other sample. Then, a Gaussian function was fit to the signal to avoid under-counting the integrated intensity. This underestimation would be more severe at low signal, leading to a non-linear relationship between concentration and intensity. The Gaussian fits were then integrated to give the total signal. The calibration curve was made by a linear regression of all of the standards with a fixed y-intercept of zero. Using the calibration curve, all of the signals were converted to sample concentrations; these concentrations were multiplied by the dilution factor from the sample preparation to give the initial concentrations.

The experimental protocol involved the use of hydrochloric acid in the cathode flush stream 36 that was not recovered at the end of the experiment. A more practical electrode flush stream would be recycled. By buffering both the cathode and anode buffer to the same pH and then collecting and mixing the streams together, acid dosing could potentially be eliminated. Since both electrode flush streams 34 and 36 were isolated from the rest of the system by a cation exchange membrane 15, the anion of the buffer would not get into the frit, where the actual ion separation was occurring. In the anode flush stream 34, the buffer would become slightly acidified while the cathode stream was equally basified. Due to the nature of buffers, neither would change in pH very much, but some of their buffering capacity would be lost. Upon mixing the two streams, they would maintain the same initial concentration of buffer anion and return to the starting pH and the same initial buffering capacity.

A few criteria were established for a suitable buffer. First, a buffer in the relevant range of roughly pH=5-7 was targeted to prevent scaling. Second, the buffer, itself, was a composition that would not form precipitates with the cations in solution. Third, the buffer was stable to both the oxidizing and the reducing potentials in the cell.

The citrate buffer system appeared to work well in terms of buffering range and preventing precipitation. A citrate buffer is even used to solubilize difficult-to-dissolve salts. Sodium citrate's standard reduction potential is reported as −0.180 V, but a reported oxidation potential remained elusive. Consequently, a preliminary test of stability was performed. Using an H-cell and the gas chromatograph (GC), a citric-acid buffer solution was tested under relevant conditions.

A citric-acid buffer system at 100 mM concentration with a pH adjusted to 5 was used for the working electrode (anode). The counter electrode was filled with 10 mM $H_2SO_4$. The two compartments were separated by a NAFION (N112) membrane. For the no-citric-acid run, sulfuric-acid solution was used in both compartments.

Figure 9:
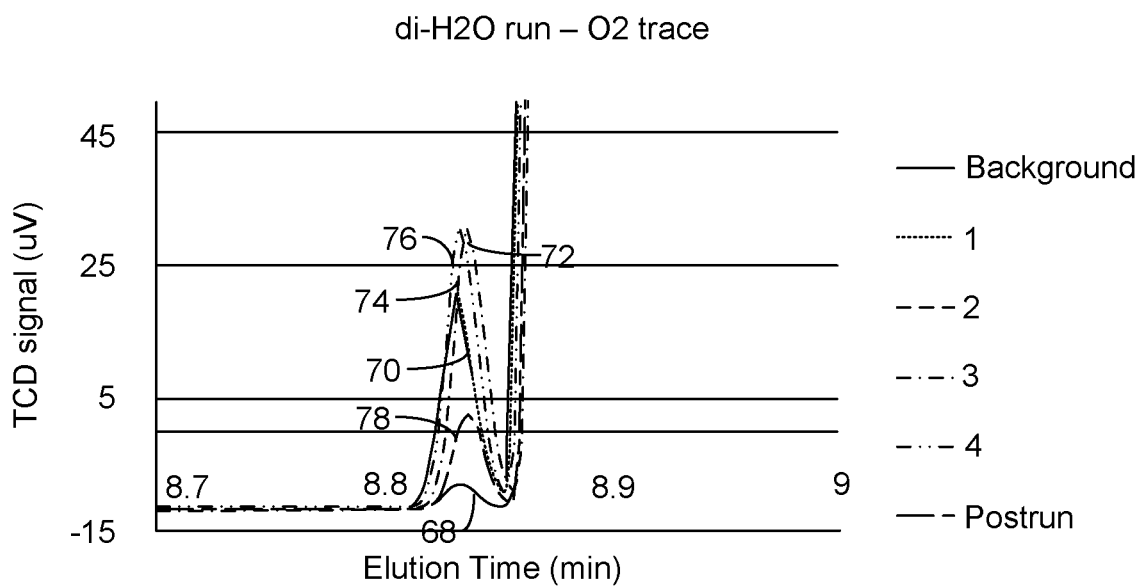
FIG. 9 is a plot of gas-chromatograph runs showing oxygen evolution for distilled water with no added citric acid.
Figure 10:
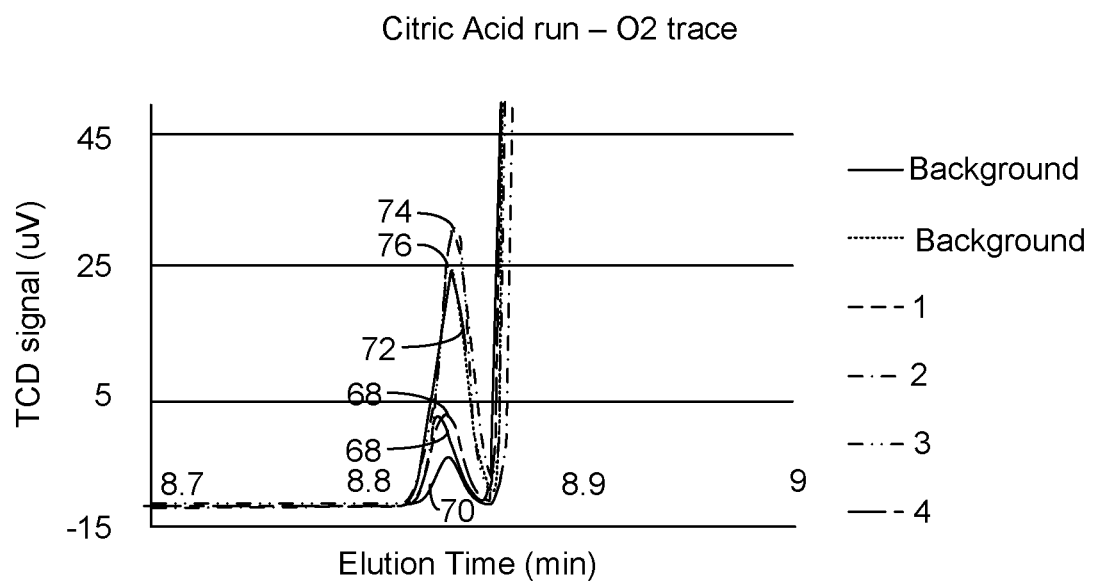
FIG. 10 is a plot of gas-chromatograph runs showing oxygen evolution for distilled water with 100 mM citric acid added.
Figure 11:
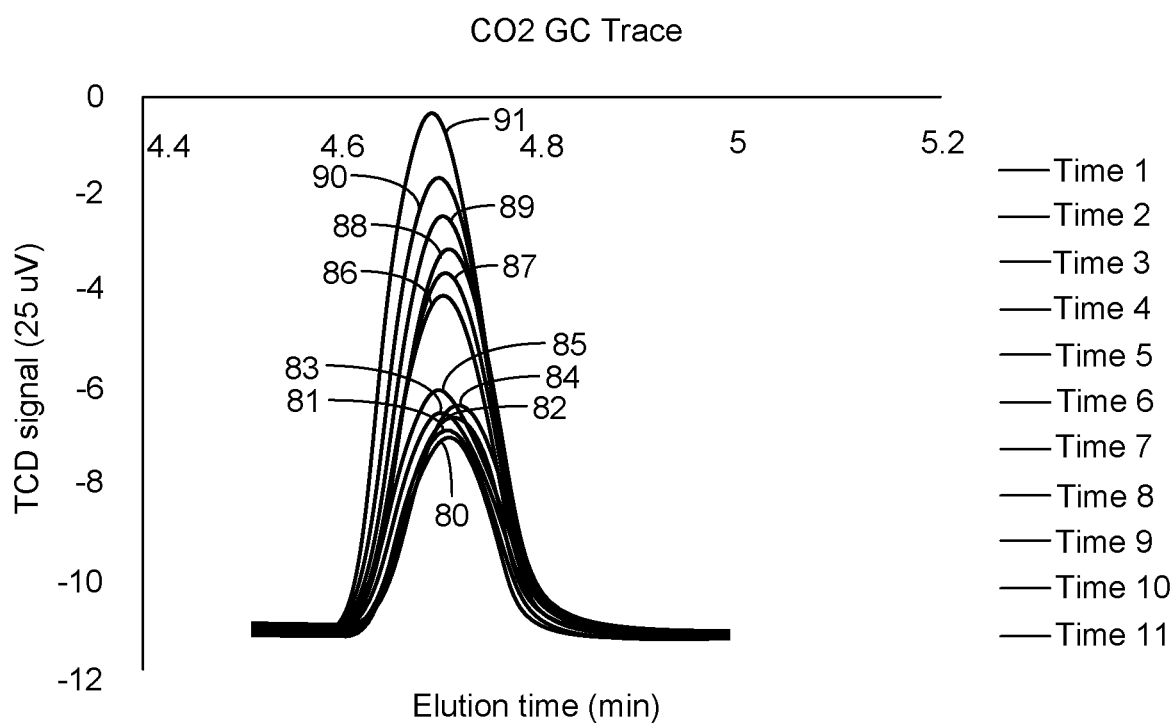
FIG. 11 is a plot of gas-chromatograph runs showing $CO_2$ evolution over time. The $CO_2$ in the SED system is not a function of the applied current; it is only a function of how many times the study was run.

The $O_2$ produced from the runs (background 68, run one 70, run two 72, run three 74, run four 76, and post-run 78) with 100-mM citric acid and without citric acid, as reflected in the plots of FIGS. 10 and 9, respectively, were within 10% of each other; and the experiment with higher $O_2$ evolution was the run with citric acid. If citric acid was being oxidized, the $O_2$ evolution would have been lower. The $CO_2$ showing up at the detector is likely already in the GC and needs to be baked out for a more careful study. As seen in FIG. 11, $CO_2$ showing up in the detector simply decreases with each successive run (shown over a sequence of times 80-90) and is decoupled from any other experiment conditions. In summary, we observed the correct amount of $O_2$ evolution at the anode, and no $CO_2$ was produced. These observations provided enough evidence to conclude preliminarily that the citric-acid buffer was not being oxidized and consumed at the anode.

Following the protocols outlined, above, the SED device 10 had its performance characterized as a desalination technology and as a selective separation technology, in accord with this invention.

The total desalination was measured by ICP-OES, as described above, and calculated as shown below in Equation (2), where C represents the concentration in the feed and dilute output (fresh) for Na and Mg.

$$\text{Desalination} = 100\% \cdot \left(1 - \frac{c_{Na,fresh} + c_{Mg,fresh}}{c_{Na,feed} + c_{Mg,feed}}\right) \quad (2)$$

Figure 12:
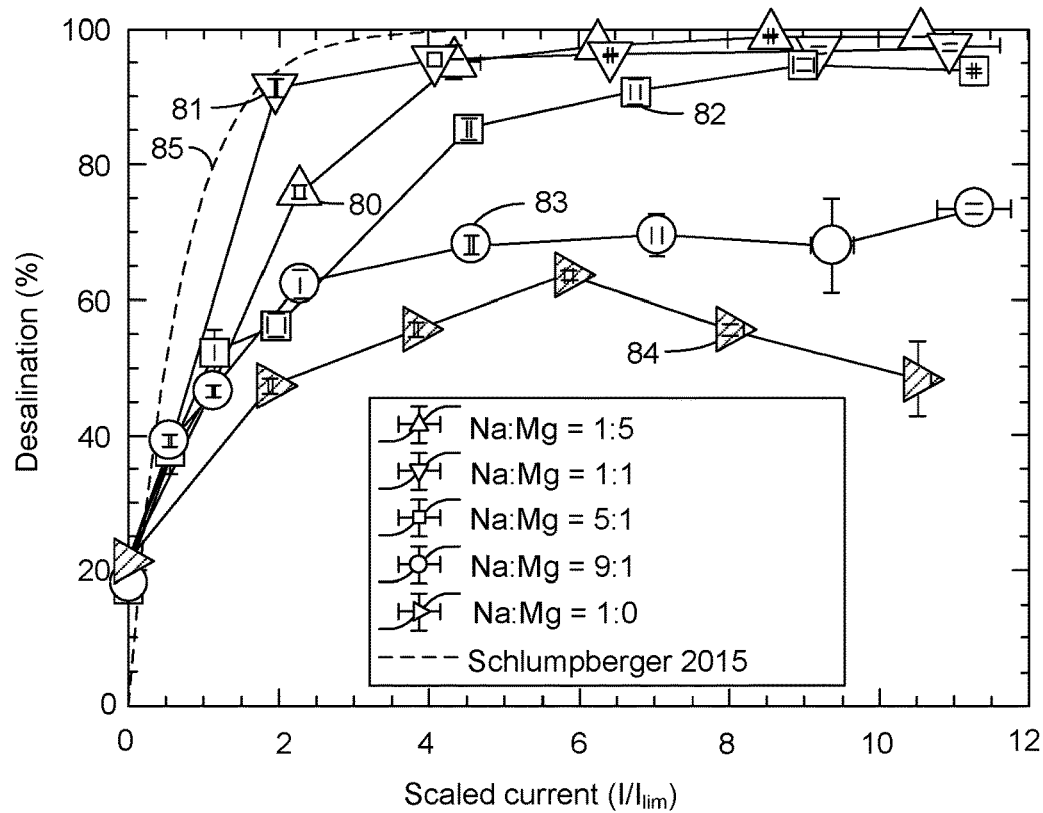
FIG. 12 is a plot of total desalination achieved in a fresh stream from a SED device as a function of feed composition and applied current.

FIG. 12 shows this total desalination across all of the feed compositions studied [Na:Mg=1:5 (plot 80), =1:1 (plot 81), =5:1 (plot 82), =9:1 (plot 83), and =1:0 (plot 84)] and compares them to the previous results of Schlumpberger 2015 (plot 85). There are a few key differences in operation between the tests run in 2015 and the results presented here. The first is the use of a larger device with larger volumetric flowrates. To sustain the same scaled current, a larger current density is required. The second is the inclusion of 50-mM hydrochloric acid in the cathode flush stream. The final difference is the inclusion of a divalent cation, $Mg^{2+}$, in the feed stream.

The first noticeable difference in performance between the two systems was the apparent desalination with no applied current. This desalination was due to the addition of acid in the cathode flush stream. The second noticeable difference was the reduction in total desalination at a given current. The departure from Schlumberger's data reduces monotonically with increased magnesium content at high applied currents. The reason for this effect is not known for certain, but it may have to do with magnesium's effect on pH. As for the reason for the departure in the first place, that may have to do with the higher current density leading to more water splitting in places other than at the electrodes.

The first-pass metric for the device performing well is its ability to decrease the conductivity of the dilute stream. At steady state, the conductivity was expected to decrease with increasing applied current. This correlation was mostly the case for all of the feed compositions analyzed. With no applied current, the conductivity should (mostly) be a function of the inlet conductivity of each stream. The conductivity of the cathode flush stream will always start higher than that of any of the other streams because it contains all of the salt that the other streams have with additional conductivity coming from the 50-mM hydrochloric acid that is added to prevent scaling.

The effect of this additional acid is not limited to the conductivity of the cathode flush stream. Because of the high concentration of protons in the cathode flush stream, there is a strong driving force for those protons to cross the cation exchange membrane into the dilute stream. To preserve electroneutrality, some sodium or magnesium ions are driven out of the dilute stream and into the cathode flush stream. Despite the total dissolved charge remaining the same, the conductivity is altered by the change in composition. Protons have a much higher electromobility in water when compared to sodium or magnesium. For this reason, the conductivity of the dilute stream is observed to be higher than that of the concentrate or anode flush streams at zero applied current. The higher conductivity of the dilute stream holds across all feed compositions studied.

Figure 13:
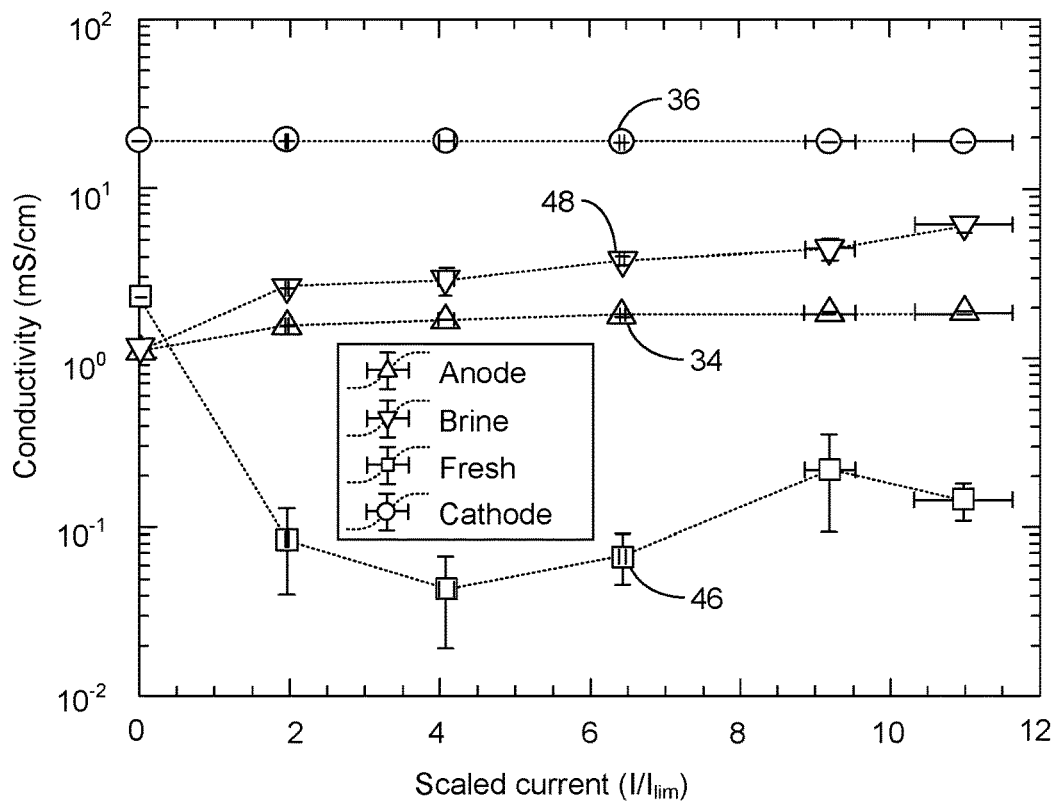
FIG. 13 is a plot of effluent conductivities of each stream from a SED device with a feed composition of $NaCl:MgCl_2=1:1$.

In FIG. 13, the change in conductivity with respect to applied current is shown for a feed stream comprising equimolar (1:1) NaCl and $MgCl_2$. The dilute stream 46 initially decreases in conductivity by more than an order of magnitude with the applied current, indicating that some desalination is occurring. Then, the conductivity of the dilute stream 46 plateaus a bit and even appears to increase. The reason for this increase will become clear in the rest of the analysis. As expected, the concentrated stream 48 gets steadily more conductive with increased current. The anode flush stream 34 also increases in conductivity as it gets acidified by the production of oxygen gas. The conductivity in the cathode flush stream 36 decreases slightly with increased current as protons are reacted into hydrogen gas and replaced by the less-conductive ions of sodium and magnesium.

Figure 14:
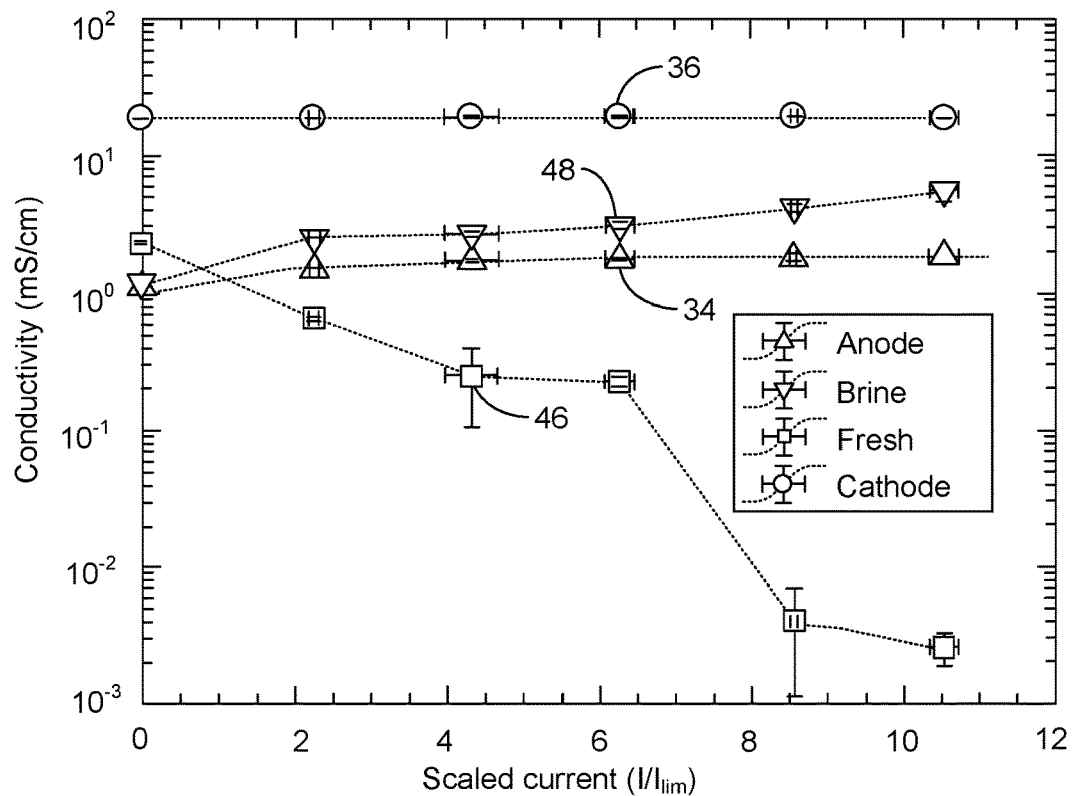
FIG. 14 is a plot of effluent conductivities of each stream from a SED device with a feed composition of $NaCl:MgCl_2=1:5$.

FIG. 14 shows the relationship between effluent conductivity and applied current for the case of a feed with an enrichment of magnesium over sodium (NaCl:$MgCl_2$=1:5). This feed condition results in the largest change in conductivity in the dilute stream 46; the conductivity drops by almost three orders of magnitude. Both electrode flush streams 34 and 36 and the concentrated stream 48 show a trend similar to that of FIG. 13.

Figure 15:
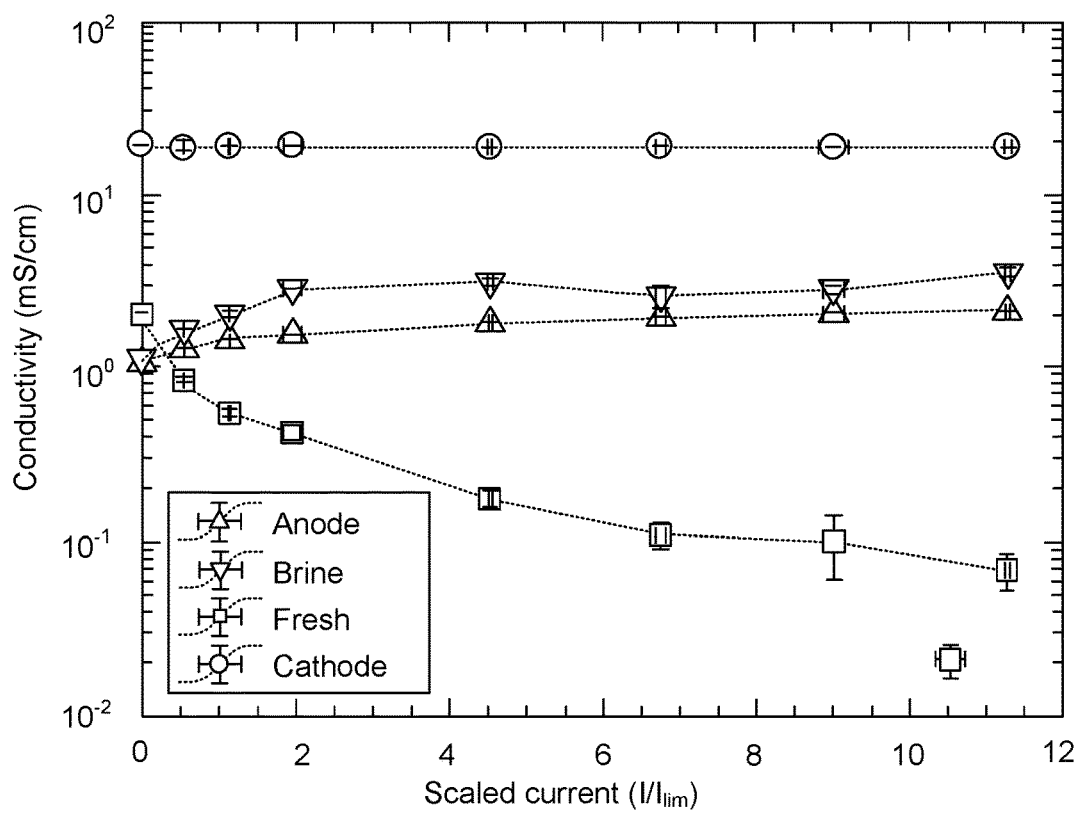
FIG. 15 is a plot of effluent conductivities of each stream from a SED device with a feed composition of $NaCl:MgCl_2=5:1$.

FIG. 15 presents the effluent conductivities for the case of a feed stream enriched in sodium relative to magnesium (NaCl:$MgCl_2$=5:1). The trends are similar to those found in FIG. 14, but the conductivity does not drop as much at the highest currents in the fresh/dilute stream 46. This plot does come with additional resolution at lower currents, showing that even with an under-limiting current, some desalination is possible.

Figure 16:
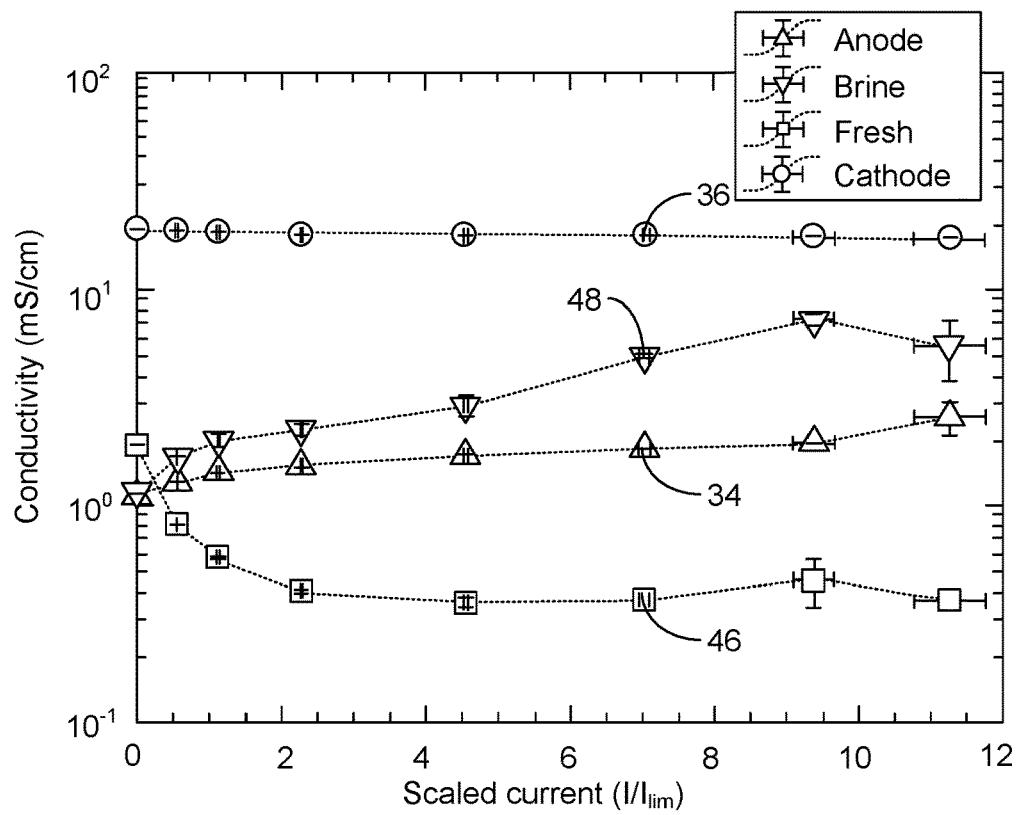
FIG. 16 is a plot of effluent conductivities of each stream from a SED device with a feed composition of $NaCl:MgCl_2=9:1$.

The effluent conductivity of the "diluted seawater" feed stream (NaCl:$MgCl_2$=9:1) case is shown in FIG. 16. The trends in the electrode flush streams 34 and 36 and in the brine/concentrated stream 48 are similar to those in previous runs. The conductivity in the fresh/dilute stream 46 again drops in response to higher applied current but plateaus at a higher conductivity than any of the other mixed feeds.

Figure 17:
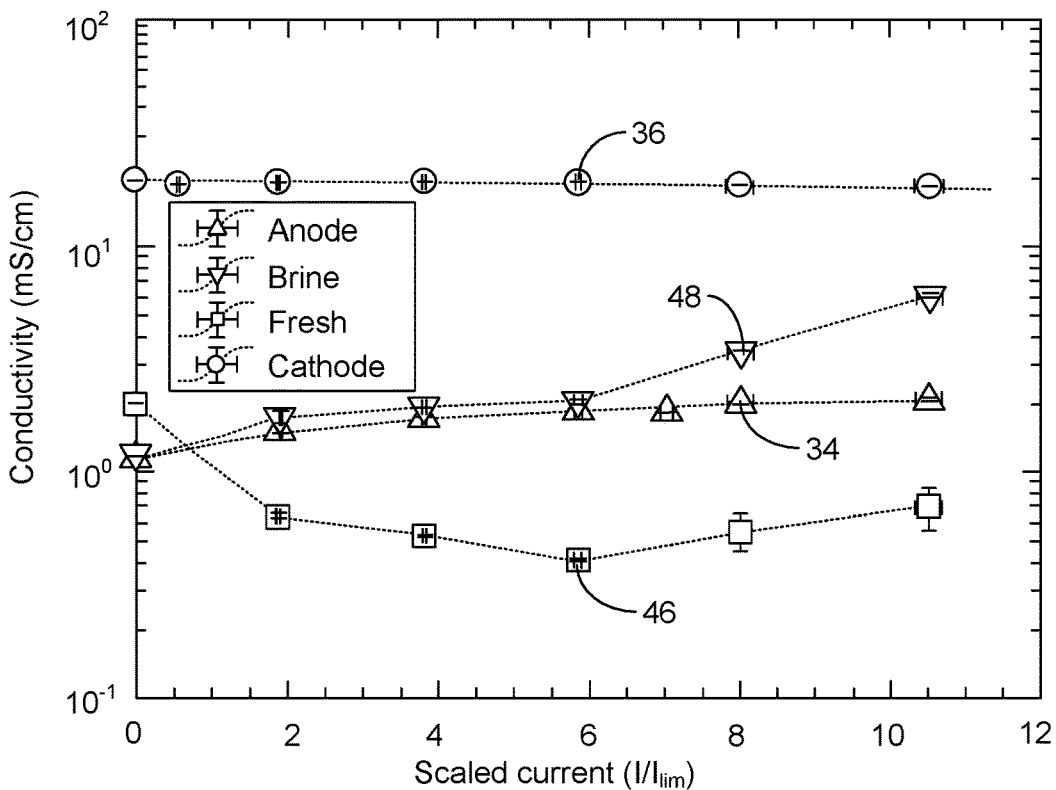
FIG. 17 is a plot of effluent conductivities of each stream from a SED device with a feed of 10 mM NaCl.

FIG. 17 provides the effluent conductivity in each stream for the feed solution consisting of only 10-mM NaCl. The results are similar to most of the previous runs, but the overall change in conductivity in the fresh/dilute stream 46 is quite low.

Overall, the effluent conductivities of all streams for most conditions studied changed in a way that was qualitatively consistent with the current understanding of shock electrodialysis. In a few high-current cases, increased current did not correspond to decreased conductivity. To establish the reason or mechanism for this phenomenon, additional measurements were taken.

The internal pH gradients in the shock electrodialysis system can play a major role in the performance in the system. At this stage, it is not possible to get the internal gradients so the effluent pH from each stream is measured as a proxy. The pH also controls the surface charge of the borosilicate frit; any pH above 2 should keep the frit with its desired negative charge. The cathode stream has its pH adjusted to below 2; but there is no frit in that stream, so the low pH should not negatively impact the device performance.

Figure 18:
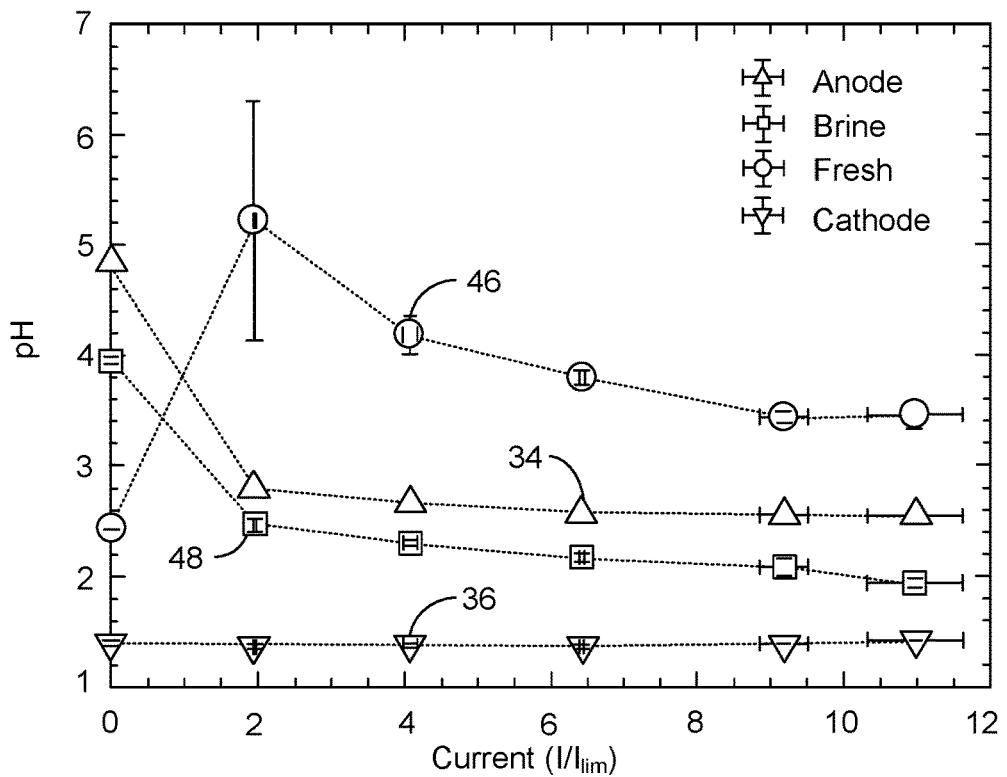
FIG. 18 is a plot of effluent pH in each stream from a SED device with a feed composition of $NaCl:MgCl_2=1:1$.

FIG. 18 shows the pH as a function of applied current for a feed stream comprising equimolar (1:1) NaCl and $MgCl_2$. With no applied current, the pH increases with distance from the cathode side of the device. This relationship makes sense, as the cathode flush stream 36 has a very low starting pH from the 50-mM hydrochloric acid that is added. As mentioned in the previous section, the protons are able to cross through the cation exchange membranes 16 by exchanging with sodium and magnesium ions present in the feed. Once current is applied, the resulting electric field curtails the proton transport out of the cathode flush stream 36. As all ions are moved out of the fresh/dilute stream 46, it becomes less acidic. In the anode flush stream 34, protons are generated by water splitting. Some of these protons exit in the anode flush stream 34, resulting in a pH that decreases with increased current, the rest are transported across the cation exchange membrane 16 where they acidify the brine/concentrated stream 48 and, at the highest currents, slightly acidify the dilute stream 46. The cathode flush stream 36 becomes slightly less acidic as protons are consumed by hydrogen gas generation and replaced by sodium and magnesium ions.

Figure 19:
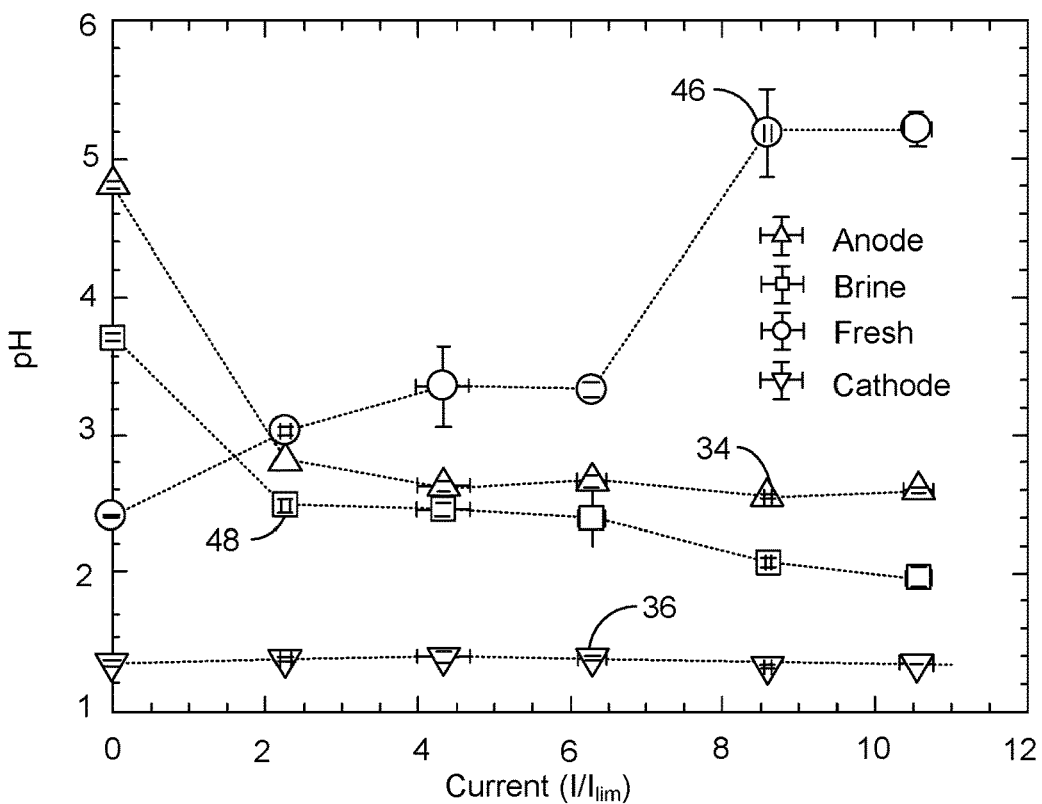
FIG. 19 is a plot of effluent pH in each stream from a SED device with a feed composition of $NaCl:MgCl_2=1:5$.

In FIG. 19, the pH is shown as a function of applied current. The pHs at zero current are very similar to those in FIG. 18, despite the different feed composition of 1:5 $NaCl:MgCl_2$ in FIG. 19. The anode flush stream 34 and brine/concentrated stream 48 again become more acidic with increasing current, while the cathode flush stream 36 loses a bit of its acidity to hydrogen-gas generation. The fresh/dilute stream 46 becomes increasingly neutral as all ions are driven out at high currents.

Figure 20:
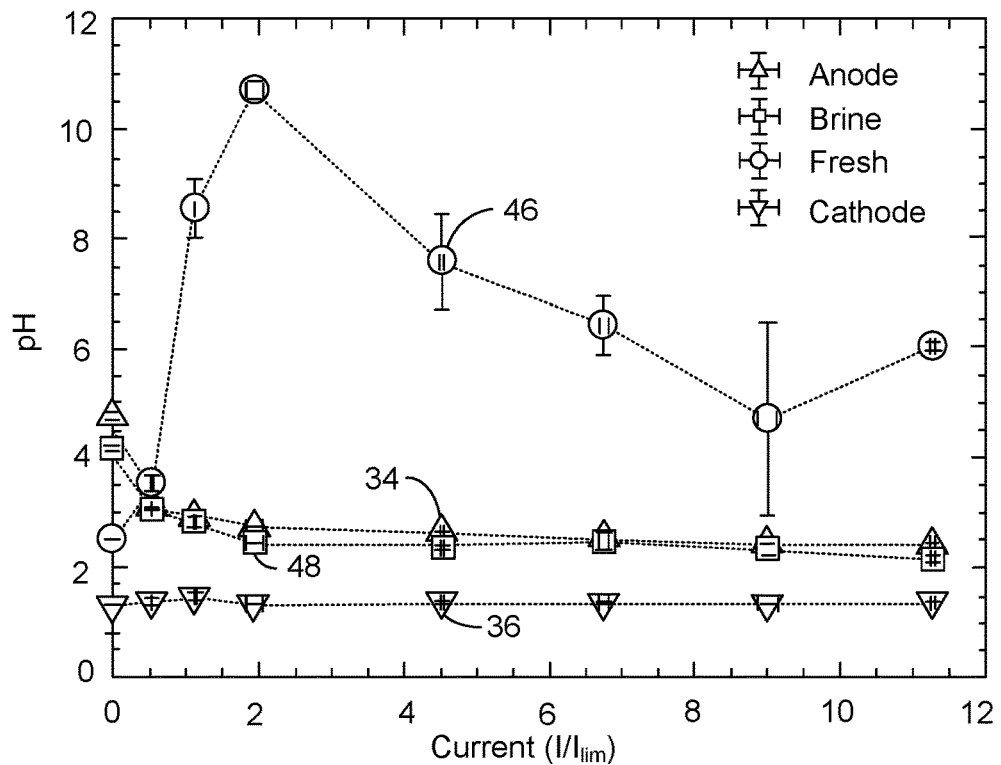
FIG. 20 is a plot of effluent pH in each stream from a SED device with a feed composition of $NaCl:MgCl_2=5:1$.

The reverse case of 5:1 $NaCl:MgCl_2$ is presented in FIG. 20. The zero-current effluent pHs are similar to the previous cases. The anode flush stream 34 and brine/concentrated stream 48 are once again acidified at increasing current, while the cathode flush stream 36 becomes less acidic. The behavior of the fresh/dilute stream 46 is different in this case, though. At intermediate applied currents, the pH increases past neutral, an increase that cannot be explained by desalination, alone. Therefore, there must be some water splitting near the cathode membrane (i.e., the membrane 16 closest to the cathode 42). At higher currents, the pH is driven back near neutral as the dilute stream 46 becomes more depleted of all ions, hydroxides included.

Figure 21:
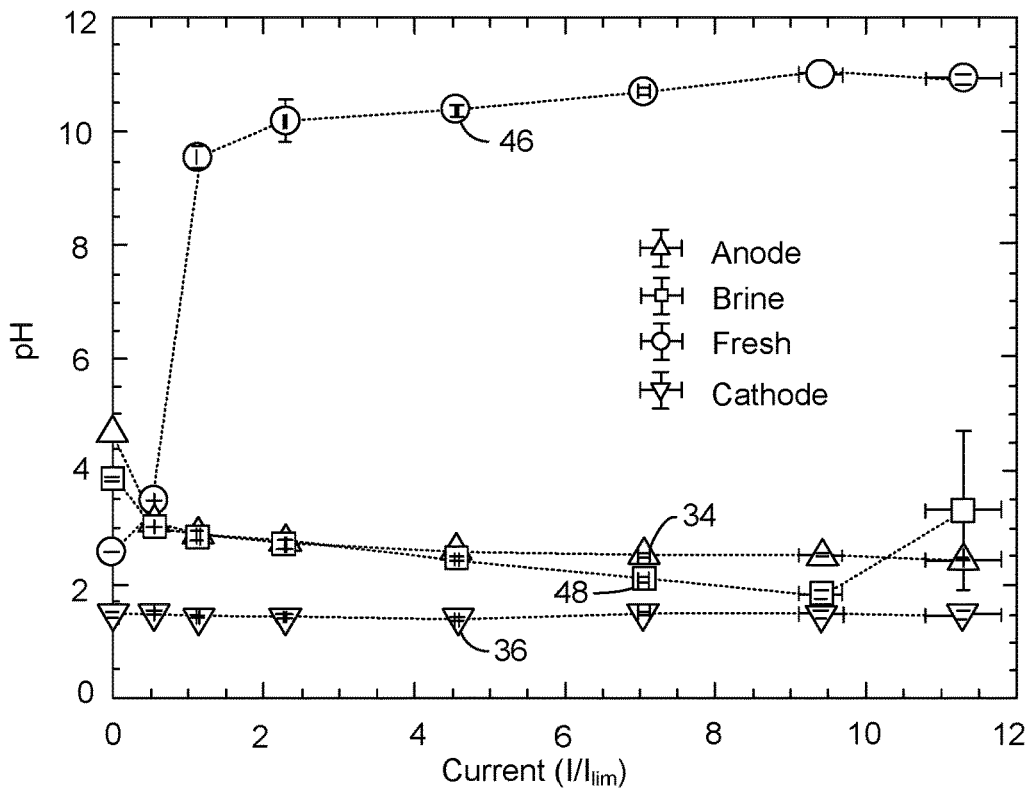
FIG. 21 is a plot of effluent pH in each stream from a SED device with a feed composition of $NaCl:MgCl_2=9:1$.

FIG. 21 shows the effluent pH for the "dilute seawater" feed condition ($NaCl:MgCl_2$=9:1). The trends in the data are largely the same as in the 5:1 $NaCl:MgCl_2$ case. The notable exception is the pH of the fresh/dilute stream 46 at high currents. Instead of dropping back toward neutral as the fresh/dilute stream 46 is desalinated, the pH continues to climb. At the highest current studied, the pH of the concentrated stream 48 jumps unexpectedly. This effect could be the result of some of the hydroxide ions generated at the cathode membrane making it all the way to the concentrated stream 48. The standard deviation on this concentrated-stream data point is quite large, so it is also possible that there may have been some human error.

Figure 22:
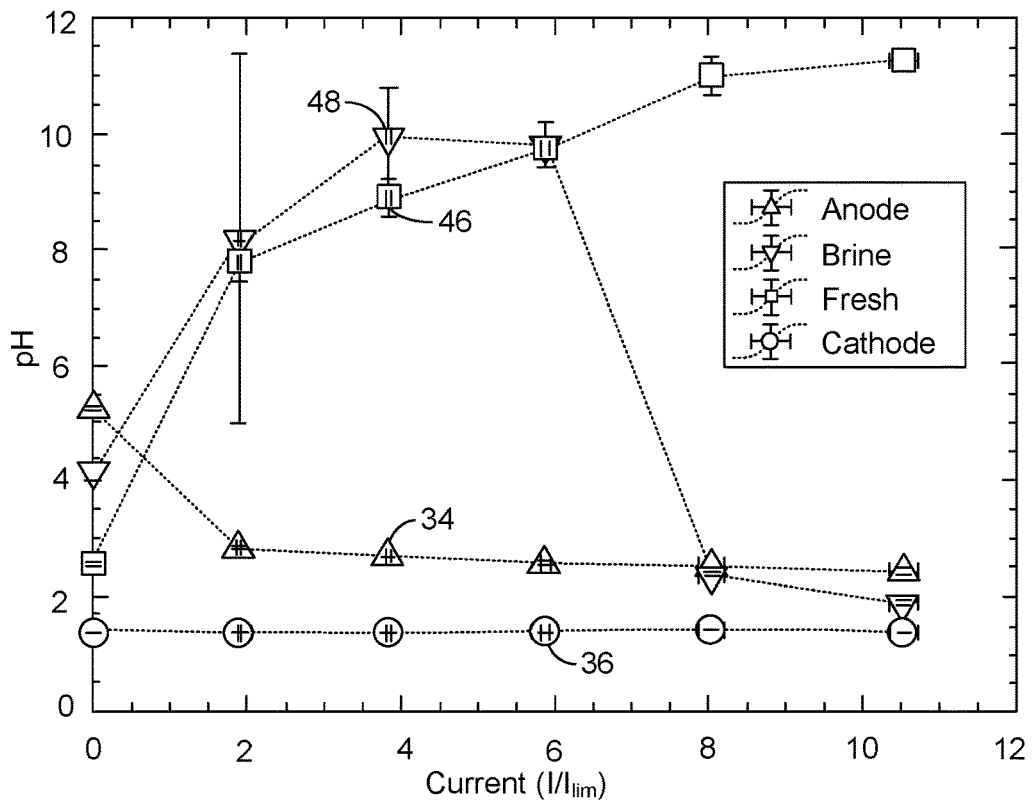
FIG. 22 is a plot of effluent pH in each stream from a SED device with a feed of 10 mM NaCl.

The effluent pHs for the case with 10-mM NaCl and no $MgCl_2$ present is shown in FIG. 22. The pHs of the electrode flush streams 34 and 36 and the fresh/dilute stream 46 all follow a pattern very similar to the case of very dilute magnesium (FIG. 21), as one might expect. The major difference comes from the effluent pH of the brine/concentrated stream 48. At moderate currents, the pH is very close to that of the dilute stream 46. It is only at the highest currents that the concentrated stream 48 drops back down to acidities that are close to those in the anode flush stream 34. It is possible that the magnesium present in the other conditions acted as an acid buffer that prevented the pH in the concentrated stream 48 from spiking. It would also explain why the same buffering didn't occur in the dilute stream 46. Generally, as the dilute stream 46 has all ions removed, magnesium included, the pH increases.

Overall, the trends in effluent pH were largely as expected. The pH at zero current for each stream decreased with distance from the acidic cathode flush stream 36. The pH dropped in the anode flush stream 34, while it increased in the cathode flush stream 36 in response to reactions that produced or consumed protons, respectively. The pH increase of the dilute stream 46 was evidence of water splitting at the cathode membrane. Under most circumstances, the concentrated stream 48 simply acidified in response to the protons crossing in from the anode flush stream 34. However, when the magnesium ions were not present in the system, the concentrated stream 48 became basic along with the dilute stream 46 at moderate currents. This suggests that magnesium may play some role in buffering the pH of the system.

The pHs observed also corroborated the results from the previously discussed results on conductivity. The high zero-current conductivity of the dilute stream 46 is explained by its low zero-current pH. The dilute-stream pH is ~2.5 compared to ~4 and ~5 for the concentrated stream 48 and the anode flush stream 34, respectively. Though the difference in the pH between the anode flush stream 34 and the concentrated stream 48 is almost as high as that between the dilute stream 46 and concentrated stream 48, the difference does not manifest as a significant difference in zero-current conductivity. The difference in proton concentration is about a factor of 10; but, overall, the concentration of protons is low enough that conductivity is dominated by the concentration of the other salts; the proton concentrations are roughly 0.1 mM and 0.01 mM for the concentrated and dilute streams 48 and 46, respectively.

Selective Ion Removal:

In some applications, selective removal of a multivalent ion is advantageous. To test the ability of an SED device to, e.g., remove magnesium while leaving behind sodium, the concentrations in the dilute stream 46 of each were obtained using ICP-OES. Ultimately, the SED device proved capable of selectively removing magnesium to different degrees, depending on the salt ratio in the feed.

Figure 23:
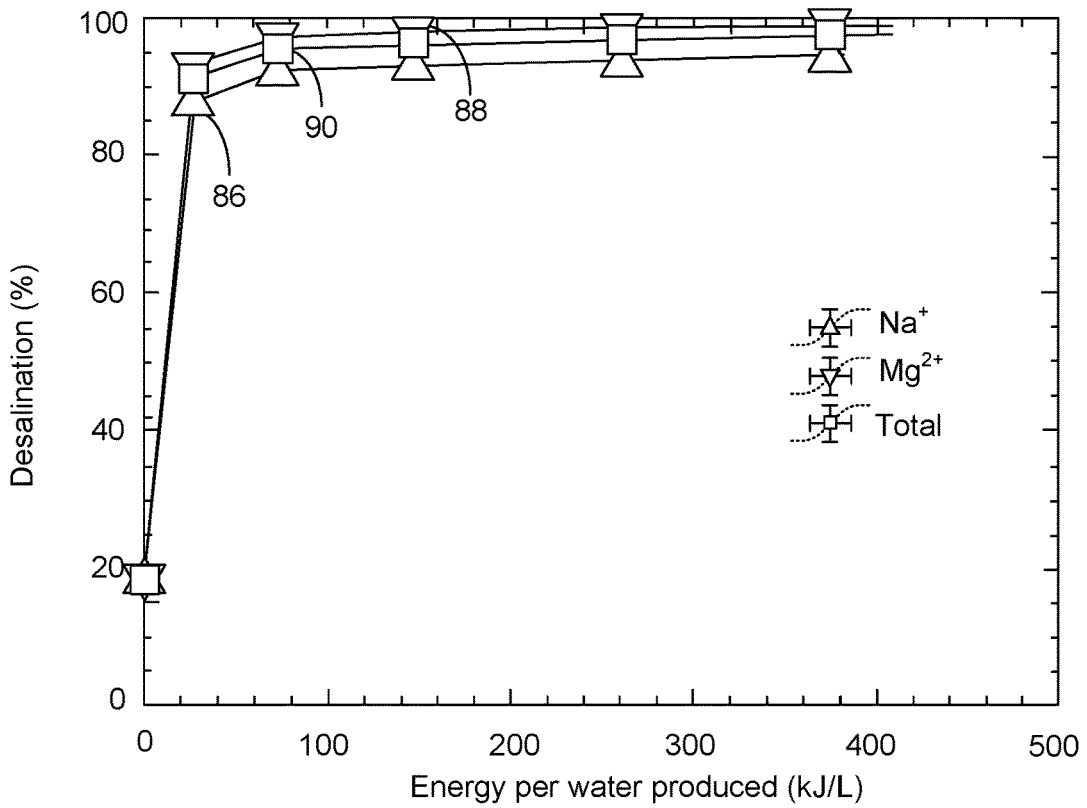
FIG. 23 is a plot showing desalination of sodium and magnesium ions in a fresh stream from a SED device for a feed composition of $NaCl:MgCl_2=1:1$.

FIG. 23 shows the percent removal of each ion ($Na^+$ 86, $Mg^{2+}$ 88, total ions 90) from the dilute stream as well as the total desalination as a function of energy input for a feed stream comprising equimolar (1:1) sodium and magnesium chlorides. The energy input is calculated from the applied current and measured voltage and does not account for the pumping cost. It is normalized by the flow rate of the dilute stream, not the inlet flow rate. At zero current, the ions are removed by exchange with protons across the cathode membrane. There is no selectivity in this exchange, indicating that the membranes are not inherently selective to either sodium 86 or magnesium 88. At moderate and high currents, the magnesium 88 is mostly removed, while a little bit of sodium 86 is left behind. The maximum removal percentage of magnesium 88 was 98.8±0.24%.

Figure 24:
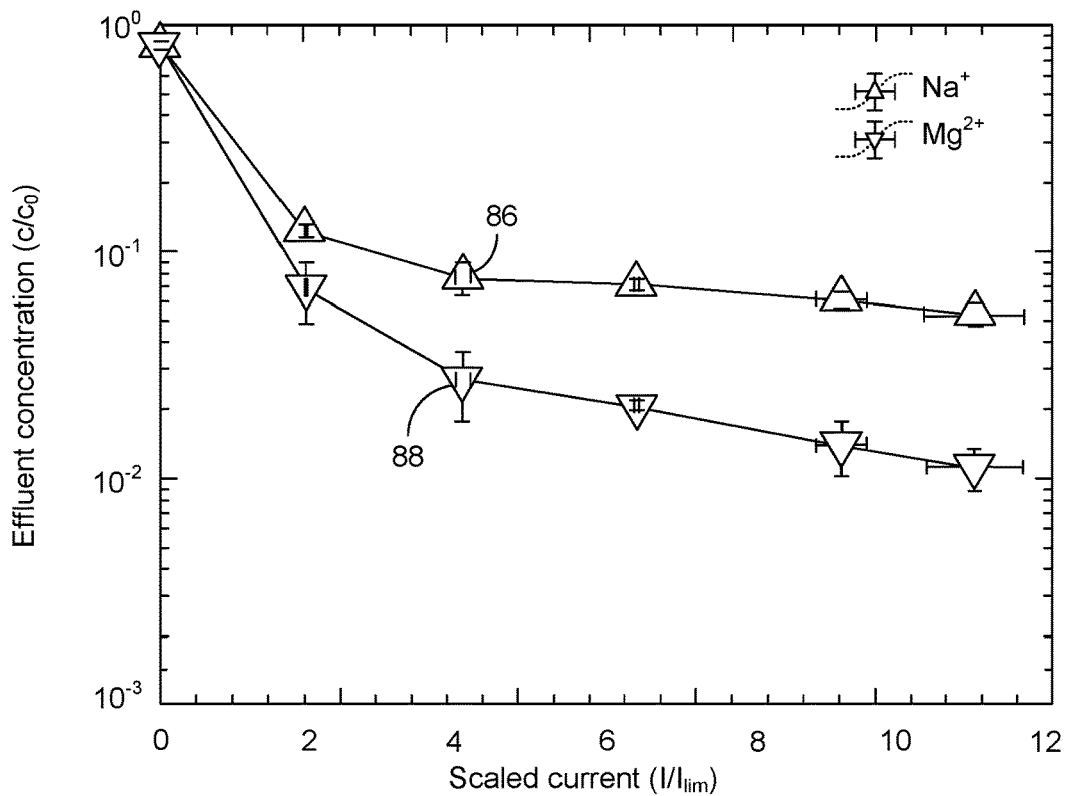
FIG. 24 is a plot showing retention of sodium and magnesium ions in the fresh stream for a feed composition of $NaCl:MgCl_2=1:1$.

The difference in retention for the equimolar condition is made more obvious in FIG. 24, where the effluent concentrations, scaled by their inlet concentrations, are plotted as a function of the applied current. When moderate-to-high currents are applied, the SED device is able to selectively remove magnesium 88 while retaining a higher concentration of sodium 86. At higher currents, the selectivity becomes greater; and, at the highest current applied, the sodium 86 concentration is 4.7 times higher than magnesium 88.

Figure 25:
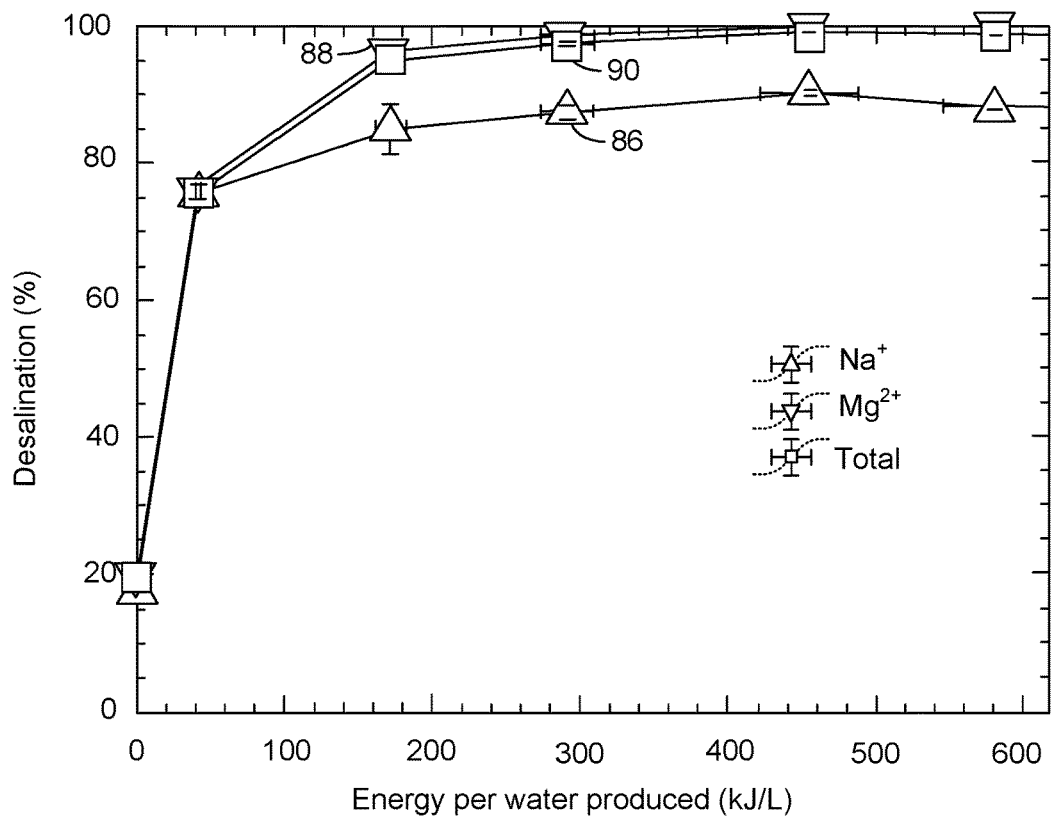
FIG. 25 is a plot showing desalination of sodium and magnesium ions in the fresh stream for a feed composition of $NaCl:MgCl_2=1:5$.

FIG. 25 shows the ion removal as a function of energy input for a stream that is enriched in the magnesium 88 (NaCl:MgCl$_2$=1:5), the target ion to be removed. The zero-current desalination is once again non-selective. At low energy input, the desalination takes place without any selectivity. As energy input increases, the magnesium 88 removal is driven higher while sodium 86 removal plateaus. At the highest energy input, 99.945±0.0084% of the magnesium 88 is removed.

Figure 26:
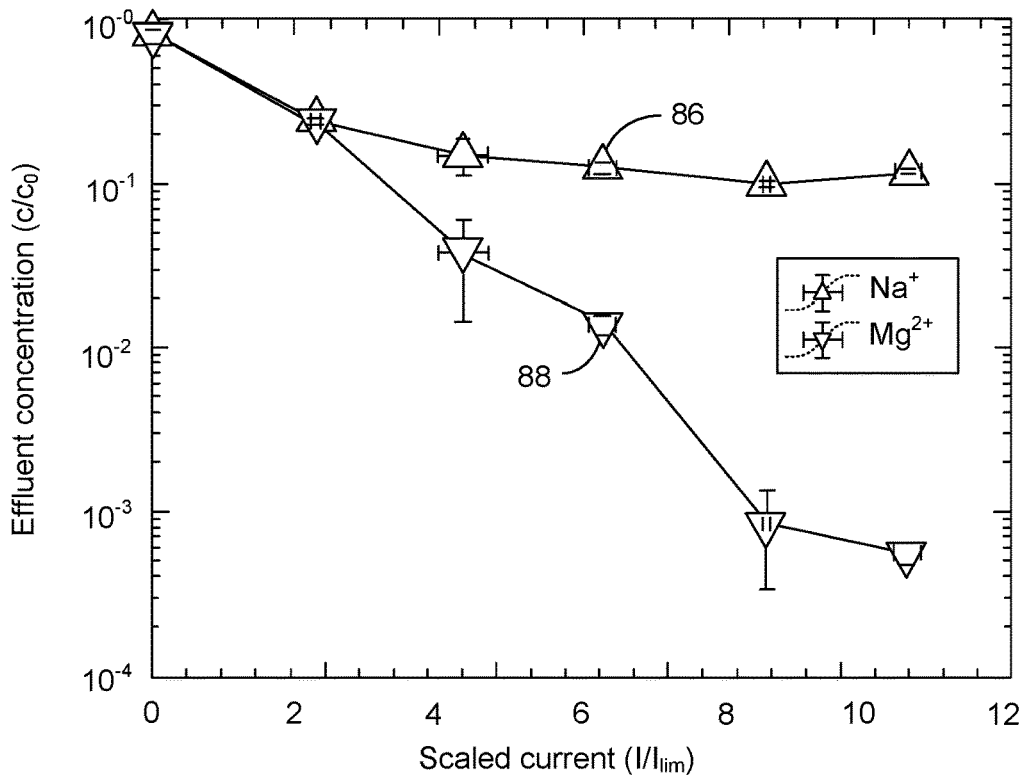
FIG. 26 is a plot showing retention of sodium and magnesium ions in the fresh stream for a feed composition of $NaCl:MgCl_2=1:5$.

FIG. 26 shows the striking difference in ion removal for the two ions (with a feed composition of NaCl:MgCl$_2$=1:5) as a function of the applied current. On a log scale, the magnesium 88 concentration drops almost linearly, while the sodium 86 concentration plateaus at roughly 10% of its inlet value. At the highest current studied, the difference in ion retention is more than 200-fold.

Figure 27:
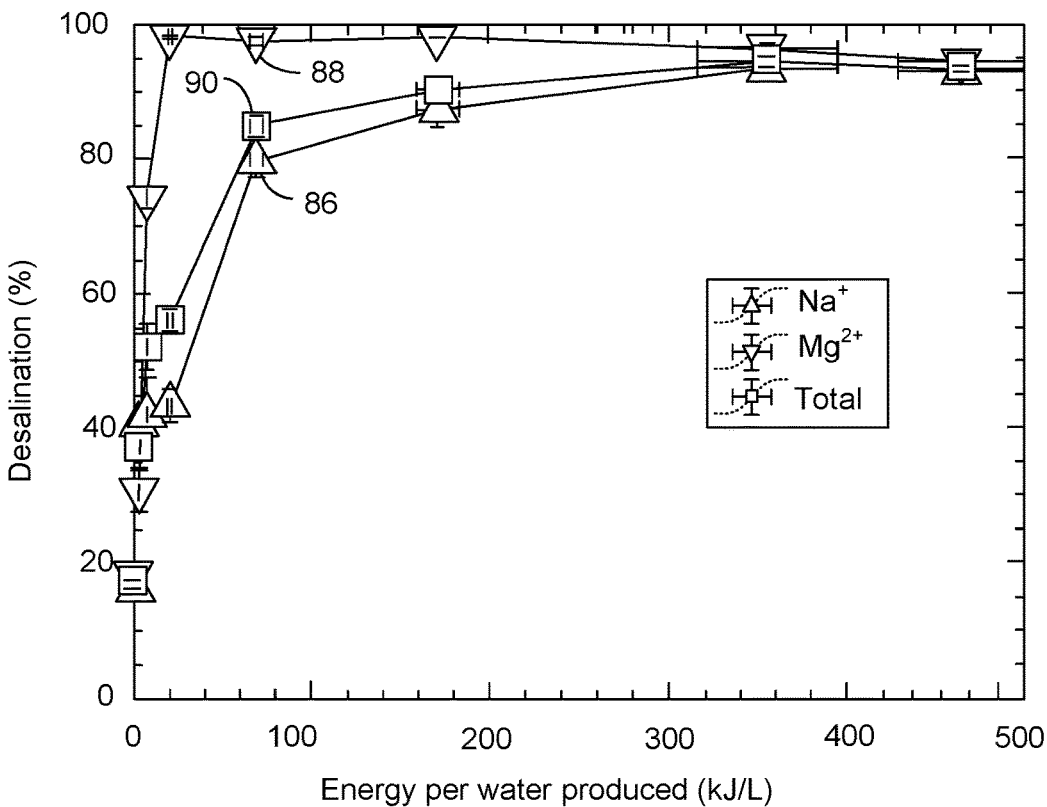
FIG. 27 is a plot showing desalination of sodium and magnesium ions in the fresh stream for a feed composition of $NaCl:MgCl_2=5:1$.

In the case of dilute magnesium in a sodium-dominated feed stream (NaCl:MgCl$_2$=5:1), FIG. 27 shows that the ion-removal trend is not as simple as increased energy input yielding increased target-ion removal. The sodium 86 removal and the total desalination increase monotonically with increased energy input. However, the removal of magnesium 88 increases rapidly with increasing energy applied to its maximum value of 98.6±0.12% at a relatively low energy input and then decreases slowly as the energy input increases further. From FIG. 27, it appears that magnesium 88 is quickly and selectively driven out of the dilute stream at low currents. Contrastingly, at higher currents and higher total desalination, all ions are driven out without much selectivity.

Figure 28:
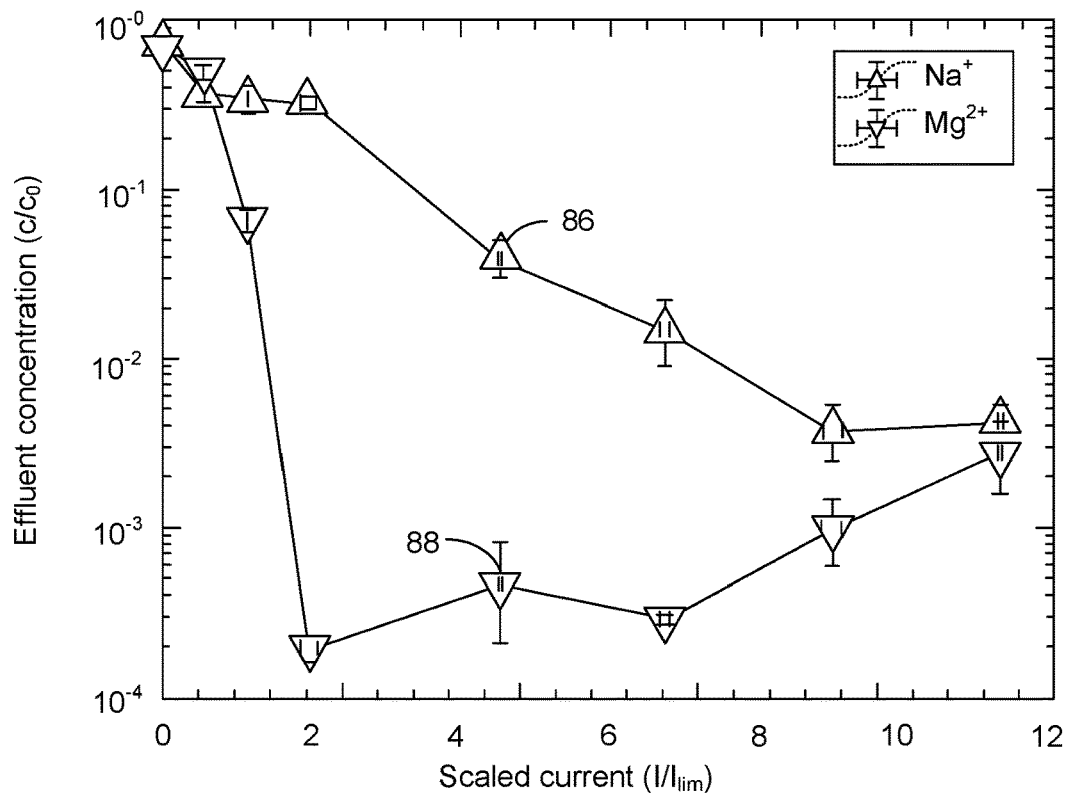
FIG. 28 is a plot showing retention of sodium and magnesium ions in the fresh stream for a feed composition of $NaCl:MgCl_2=5:1$.

FIG. 28 shows the scaled-ion retention as a function of applied current for the feed condition of NaCl:MgCl$_2$=5:1. At low current, the concentration of sodium 86 drops a little bit and then stagnates, while the magnesium 88 is selectively removed. At intermediate current, after magnesium 88 reaches its minimum concentration, the concentration of sodium 86 drops while that of magnesium 88 slightly increases. At the highest current applied, the selectivity is almost gone as the magnesium 88 concentration increases to a value comparable with sodium 86. The maximum selectivity occurs at a scaled current of 2 and represents a 40-fold difference in retention.

Figure 29:
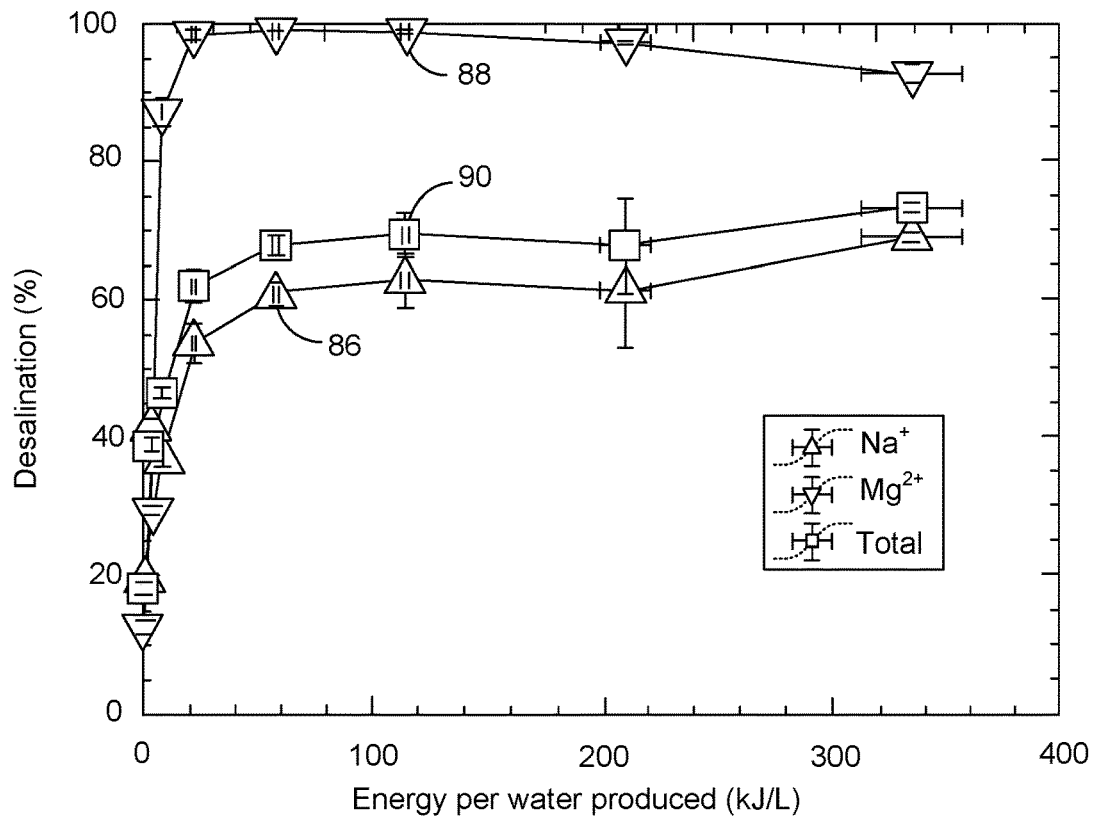
FIG. 29 is a plot showing desalination of sodium and magnesium ions in the fresh stream for a feed composition of $NaCl:MgCl_2=9:1$.

FIG. 29 shows the ion-specific desalination performance for the "diluted seawater" feed condition (NaCl:MgCl$_2$=9:1). The plot is qualitatively similar to FIG. 27, but the total desalination never reaches very high values. The magnesium 88 removal peaks at a relatively low energy input and then highest current applied. Magnesium 88 on the other hand is removed quite well, having its concentration drop over 40 times lower than that of sodium 86.

Figure 31:
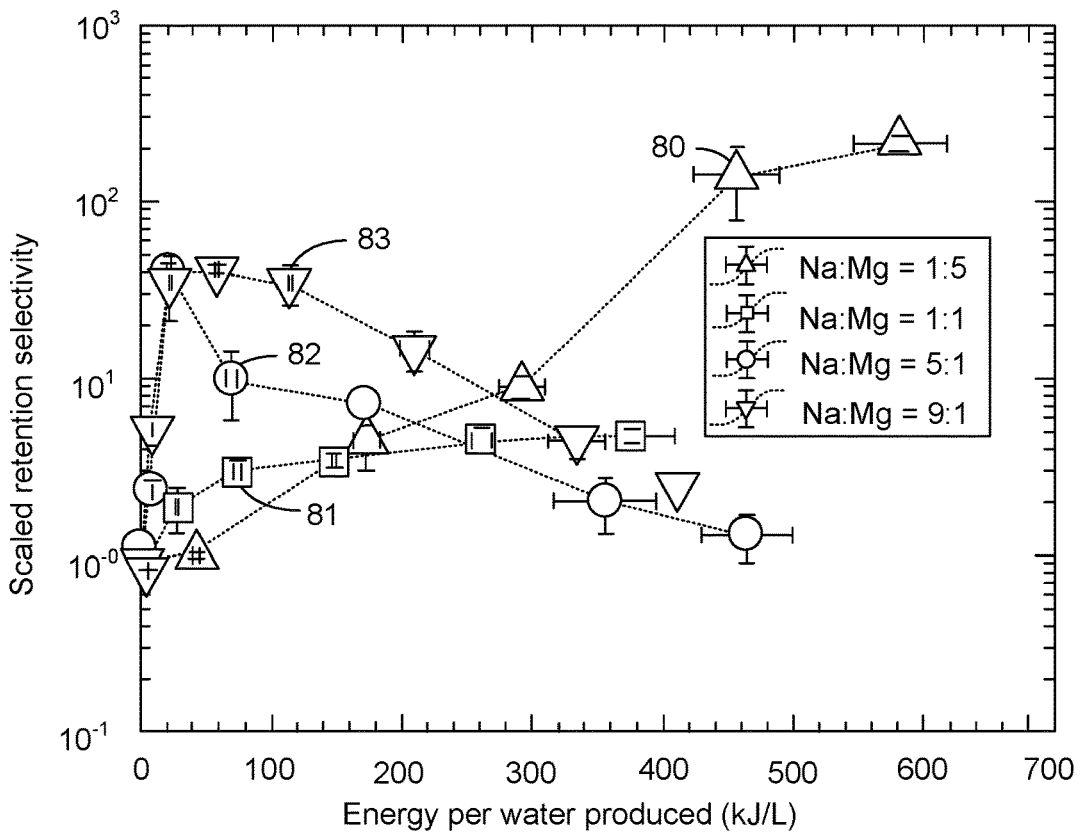
FIG. 31 is a plot showing selectivity of retention of magnesium ions for varied initial salt ratios.

The aggregated selectivities for each of the feed compositions studied (Na:Mg=1:5 plot 80, Na:Mg=1:1 plot 81, Na:Mg=5:1 plot 82, and Na:Mg=9:1 plot 83) is provided in FIG. 31. The retention selectivity can be thought of in one of two ways. The retention selectivity can be thought of as the ratio of the effluent concentrations of sodium and magnesium, scaled by their ratio of inlet concentrations; or the retention selectivity can be thought of as the ratio of their scaled effluent concentrations, as shown in equation (3), below.

$$\text{Scaled Retention Selectivity} = \frac{c_{Na}/c_{Mg}}{c_{Na,0}/c_{Mg,0}} = \frac{c_{Na}/c_{Na,0}}{c_{Mg}/c_{Mg,0}} \qquad (3)$$

The trend in selectivity as a function of energy input changes dramatically with the changes in the inlet concentrations. For the system with the most magnesium, the selectivity monotonically increases with increased energy input. This is the system that has the highest energy consumption because of its low conductivity, which results from its high total desalination. The equimolar system also has a monotonically increasing selectivity with increased energy input, but the highest total selectivity is much lower than the other cases. Perhaps with greater energy input, the selectivity could be driven higher, but that would require more current than any of the tests so far. For the two cases of dilute magnesium in a stream dominated by sodium, the maximum selectivity comes at a low applied energy and then continues to drop.

Table 1, below, summarizes the best retention-selectivity performance of this SED device at each feed composition. At maximum selectivity, the target-ion removal is always over 98%, going as high as 99.94% in the case of a magnesium-rich feed. This impressive magnesium removal and scaled selectivity (>200) comes at a high energy cost and requires a very-high total desalination to accomplish. On the other side of the spectrum, the case of NaCl:MgCl$_2$=5:1 can achieve over 98.5% removal of the target ion with only 56% total desalination. This low total desalination allows for a low current and high conductivity, giving an energy cost that is more than an order of magnitude lower than the energy cost in the 1:5 case.

TABLE 1

| NaCl:MgCl$_2$ | Scaled Selectivity | Total Desalination | Mg$^{2+}$ Removal | Current (I/I$_{lim}$) | Energy (MJ/m$^3$) |
|---|---|---|---|---|---|
| 1:5 | 216 ± 26 | 98.70 ± 0.05% | 99.94 ± 0.01% | 10.54 ± 0.19 | 581 ± 37 |
| 1:1 | 4.75 ± 0.45 | 97.38 ± 0.40% | 98.88 ± 0.24% | 10.97 ± 0.66 | 375 ± 33 |
| 5:1 | 40.3 ± 4.2 | 56.27 ± 1.73% | 98.59 ± 0.13% | 1.96 ± 0.12 | 20.8 ± 1.1 |
| 9:1 | 41.3 ± 2.4 | 68.06 ± 1.41% | 99.06 ± 0.02% | 4.56 ± 0.03 | 57.5 ± 1.2 | decreases with increased energy. The sodium 86 removal and total desalination increase with increased energy input, as expected. The peak magnesium 88 removal is 99.1±0.67%.

Figure 30:
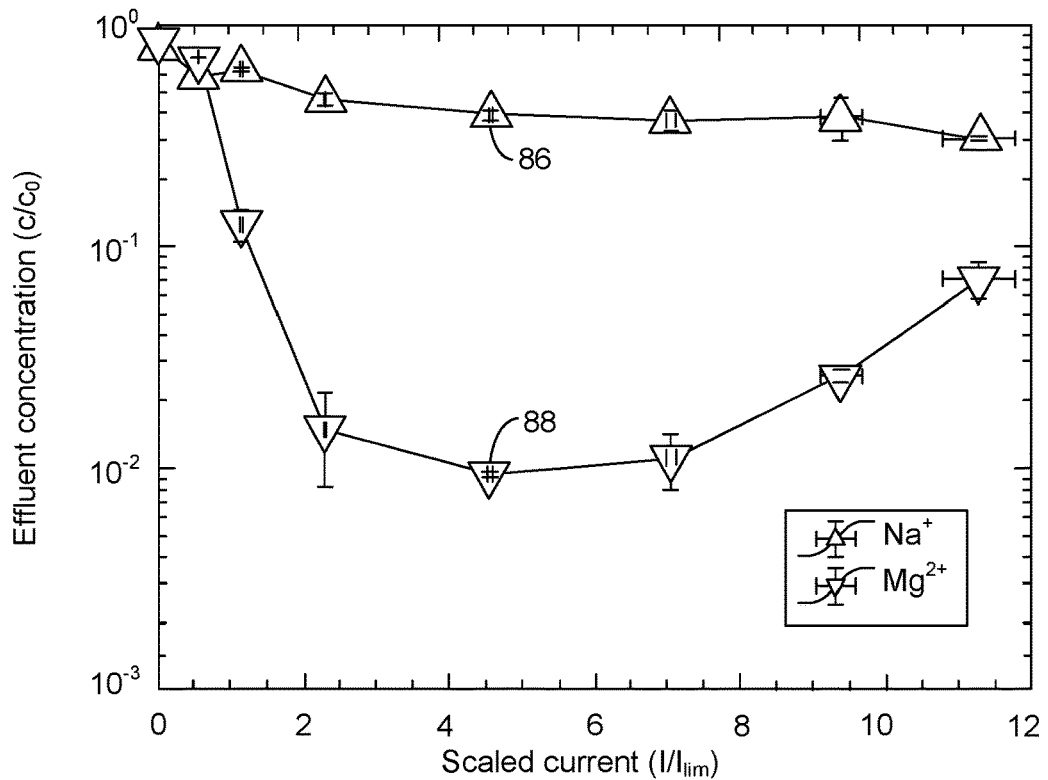
FIG. 30 is a plot showing retention of sodium and magnesium ions in the fresh stream for a feed composition of $NaCl:MgCl_2=9:1$.

FIG. 30 shows the effect of increased current on the retention of sodium 86 and magnesium 88 ions in the dilute stream produced from the "diluted seawater" (NaCl:MgCl$_2$=9:1). The sodium 86 in the system is never removed to a large extent, achieving only about 70% removal at the For an application, such as trace toxic ion removal, this result is very promising. In such systems, the toxic cation is often divalent (e.g., Pb$^{2+}$, Cu$^{2+}$) and present at a much-lower concentration that the other salts (e.g., Na+). Selectively removing it at a low energy cost would be very impactful.

Figure 32:
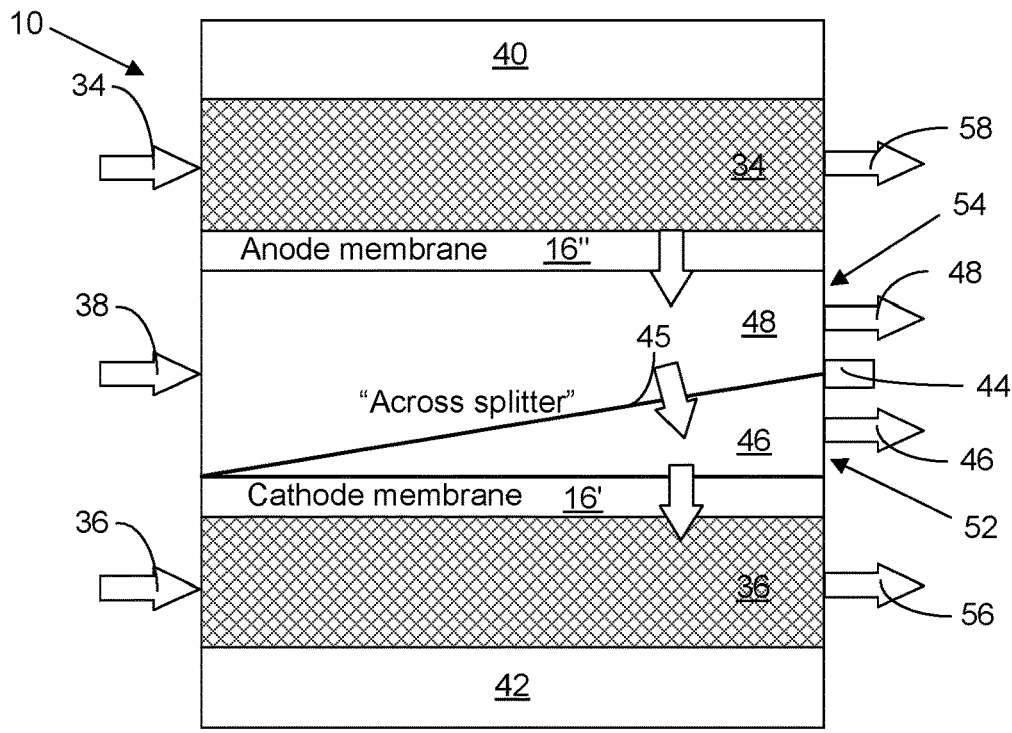
FIG. 32 is a schematic illustration of a SED device broken into four separate control volumes, one for each of the four effluent streams.

In an effort to understand where the selectivity in the system is coming from, the fluxes of all of the ions in the system were characterized. FIG. 32 is a schematic illustration of the control volumes used to calculate the fluxes throughout the device 10. The control volumes include the following: the anode flush stream 34; the concentrated stream 48, which is the concentrated remnant of the feed stream 38; the dilute stream 46; and the cathode flush stream 36. The horizontal arrows represent ion fluxes in and out of the device 10, while the vertical arrows represent ion transport between control volumes. The choice made for the anode-flush-stream control volume 34 and the cathode-flush-stream control volume 36 should be intuitive as they are fluidically separated from the other streams. The choice for how to separate the control volumes for the concentrated stream 48 and the dilute stream 46 is less obvious. The way it is drawn, the feed goes entirely into the control volume for the concentrated stream 48. From there, it either exits the cell from the control volume for the concentrated stream 48, or it passes across the splitter boundary 45 into the control volume for the dilute stream 46. Of course, the fluid is not literally passing across the splitter 44, which can be made of acrylic and positioned outside the control volumes. Instead the "across splitter" boundary line 45 denotes the following two things: first, it is the only separation that we can fully specify since we have one horizontal arrow into the frit and two horizontal arrows out; second, it represents a flux that is approximately across the deionization shock. Calling it a flux "across the shock" would be misleading, though, as the shock location changes based on the applied current and different feed conditions. Across the anode membrane 16" (i.e., the membrane closest to the anode) and across the cathode membrane 16' (i.e., the membrane closest to the cathode), the ions are carried exclusively by the electric field and gradients in concentration. Furthermore, the cation exchange membranes 16 are assumed to be perfectly ion-selective. Transport across the splitter, is not ion-selective at all, and ions can be carried by advection as well as by diffusion and electromigration.

The values of the fluxes designated by the horizontal arrows can be calculated by the flow rates and measured concentrations. To calculate the values of the fluxes designated by the vertical arrows, the system of equations provided, below, as equation set (4), can be trivially solved. N is the flux; c is the concentration; q is the volumetric flowrate; i refers to each of the three cations (Na$^+$, Mg$^{2+}$, H$^+$); and R is a reaction term for the production of H$^+$ by water splitting.

$$N_{i,anode} = c_{i,in,anode} q_{anode} - c_{i,out,anode} q_{anode} + R_i$$
$$N_{i,splitter} = N_{i,anode} - c_{i,out,brine} q_{brine} \quad N_{i,cathode} = N_{i,splitter} - c_{i,out,fresh} q_{fresh} \quad (4)$$

Forcing an overlimiting current through the system results in much of the current being carried by protons. The fraction carried by protons is considered an inefficiency of the system since, ideally, all of the current would be used to move the salt ions around the device to separate the water into a dilute stream and a concentrated stream. The efficiency can, therefore, be calculated as shown in equations (5), below. F is faraday's constant; n is the signed charge number of the ion; and I is the applied current.

$$\text{Current Efficiency} = \frac{(N_{Na,anode} + N_{Mg,anode})nF}{I} \quad (5)$$
$$\text{Current Efficiency} = \frac{(N_{Na,splitter} + N_{Mg,splitter})nF}{I}$$
$$\text{Current Efficiency} = \frac{(N_{Na,cathode} + N_{Mg,cathode})nF}{I}$$

Figure 33:
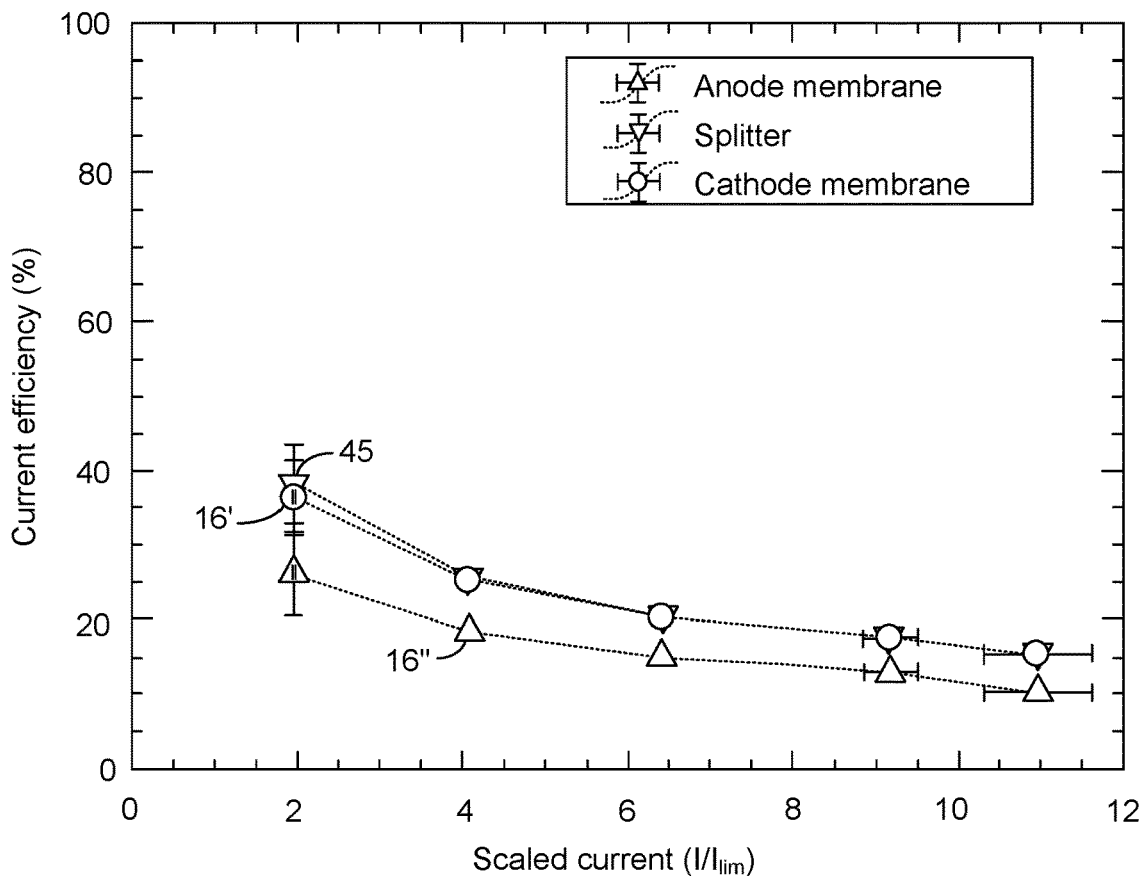
FIG. 33 is a plot of current efficiencies across each interface with a feed composition of $NaCl:MgCl_2=1:1$.
Figure 34:
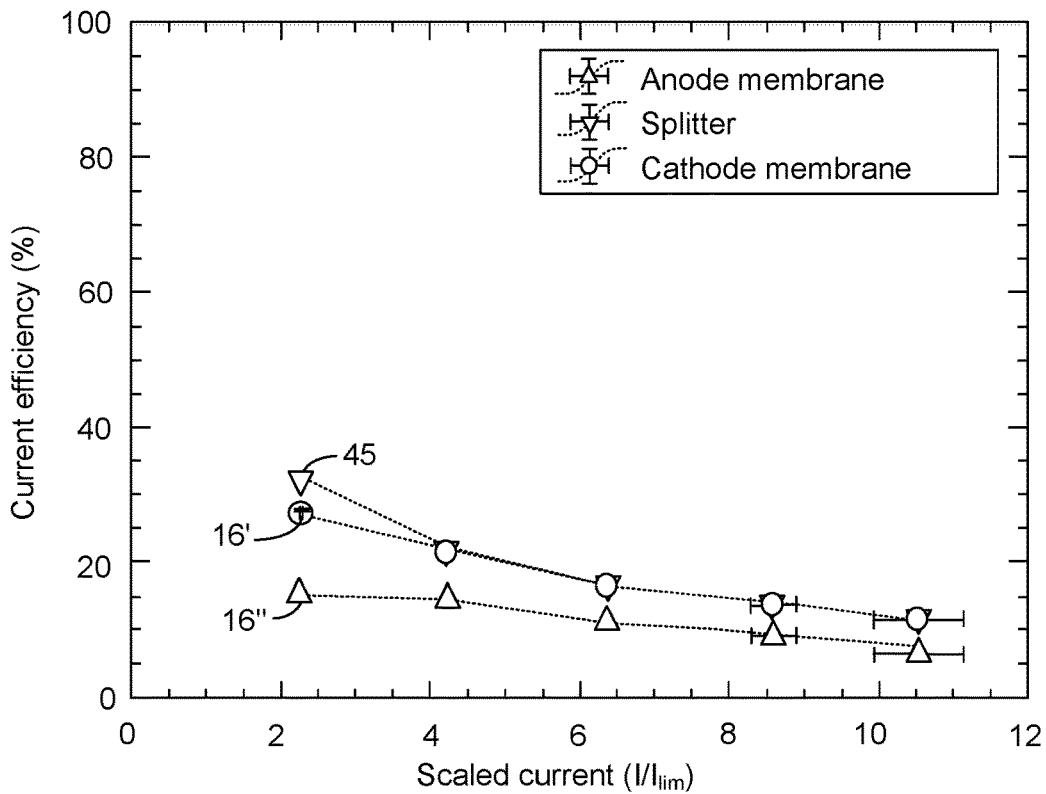
FIG. 34 is a plot of current efficiencies across each interface with a feed composition of $NaCl:MgCl_2=1:5$.

FIG. 33 shows the current efficiency for ion transport across each interface (vertical arrows from FIG. 32 across the anode membrane 16", across the cathode membrane 16', and across the splitter boundary 45) for a feed stream comprising equimolar (1:1) sodium and magnesium. As expected, the current efficiency decreases with increasing applied current. The more protons that are generated at the anode, the more current they are able to carry across the system. The efficiency across the anode membrane 16" is the lowest. This seems reasonable since, while a current is applied, the anode is the source for the protons that end up in the concentrated stream; and not many protons enter from the feed. FIG. 34 has a similar current-efficiency profile to FIG. 33 despite a significant difference in feed composition (NaCl:MgCl$_2$=1:5 in FIG. 34 compared with NaCl:MgCl$_2$=1:1 in FIG. 33).

Figure 35:
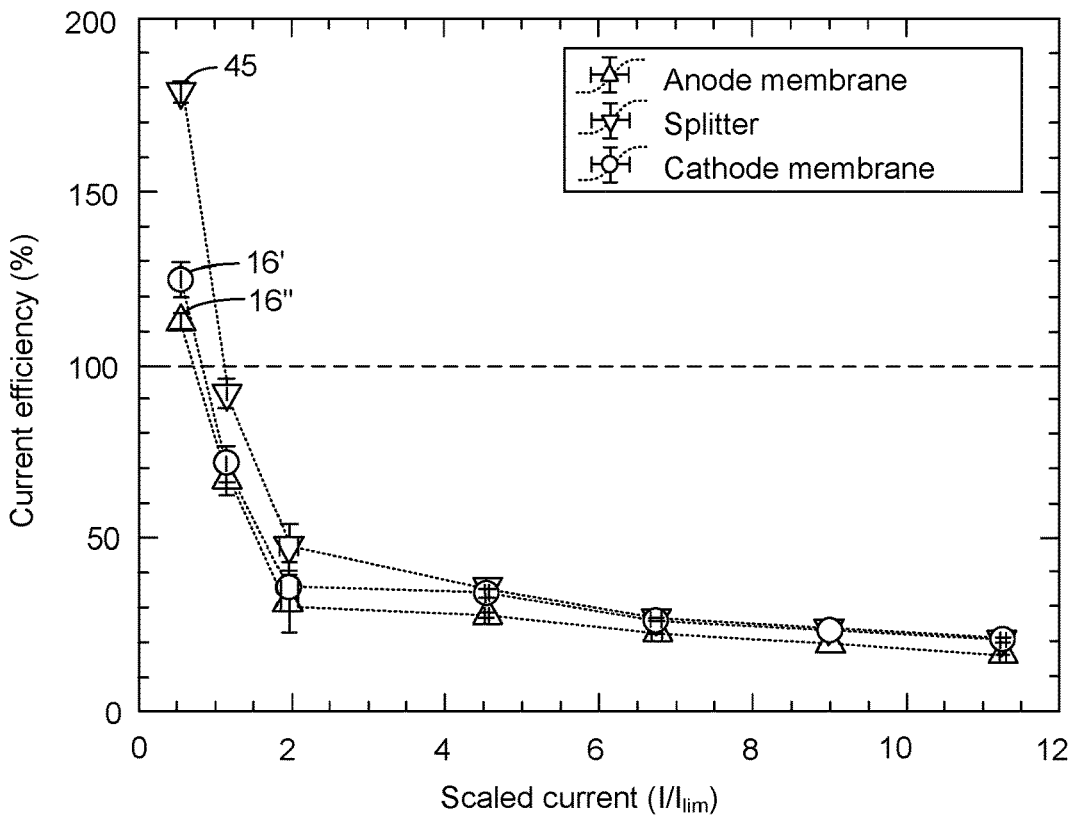
FIG. 35 is a plot of current efficiencies across each interface with a feed composition of $NaCl:MgCl_2=5:1$.
Figure 36:
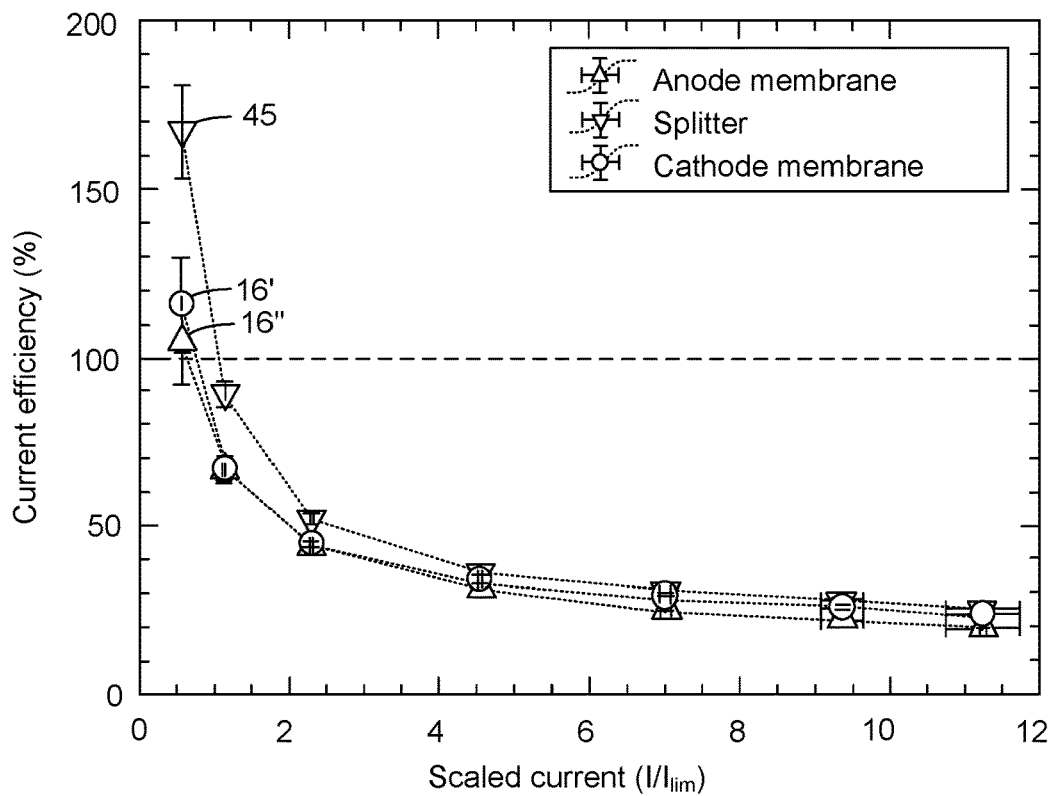
FIG. 36 is a plot of current efficiencies across each interface with a feed composition of $NaCl:MgCl_2=9:1$.

FIGS. 35 and 36 have a profile similar to that of the two previous figures but also have data collected below the limiting current. The difference between FIGS. 35 and 36 is that FIG. 35 plots the current efficiency of a feed composition ratio of NaCl:MgCl$_2$=5:1, while FIG. 36 plots the current efficiency of a feed composition ratio of NaCl:MgCl$_2$=9:1. At these low currents, some of the transport of the salt cations may still be due to the ion exchange, discussed earlier, that is happening across the cathode membrane 16'. The cation current carried across the splitter boundary 45 is artificially inflated by advection. Since only the cations are measured and accounted for in this analysis, the advection of a neutral salt would present as a current flow.

Figure 37:
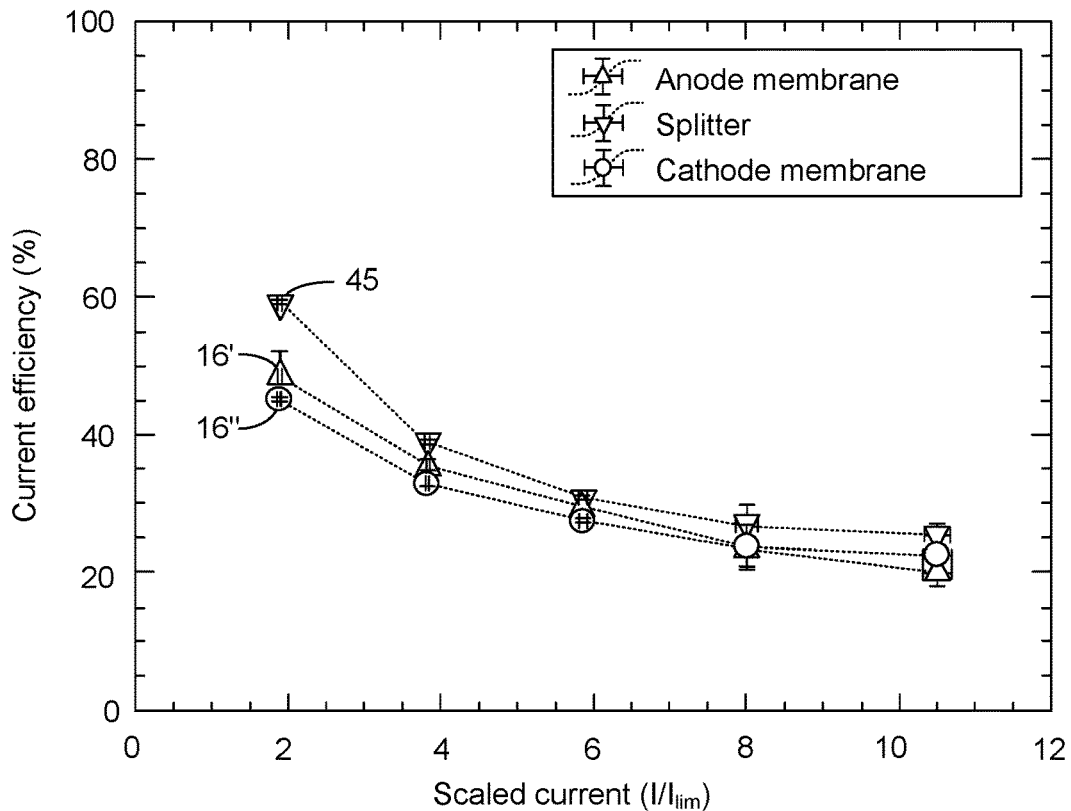
FIG. 37 is a plot of current efficiencies across each interface with a feed of 10 mM NaCl.

Even with no magnesium present (10-mM NaCl solution), the trend in current efficiency is similar, as seen in FIG. 37. The only difference is that the anode membrane 16" seems to not have quite as low of an efficiency when compared to the efficiencies across the other interfaces. This difference remains unexplained but is not far outside the error bars on the data, so it may be due to random error.

Figure 38:
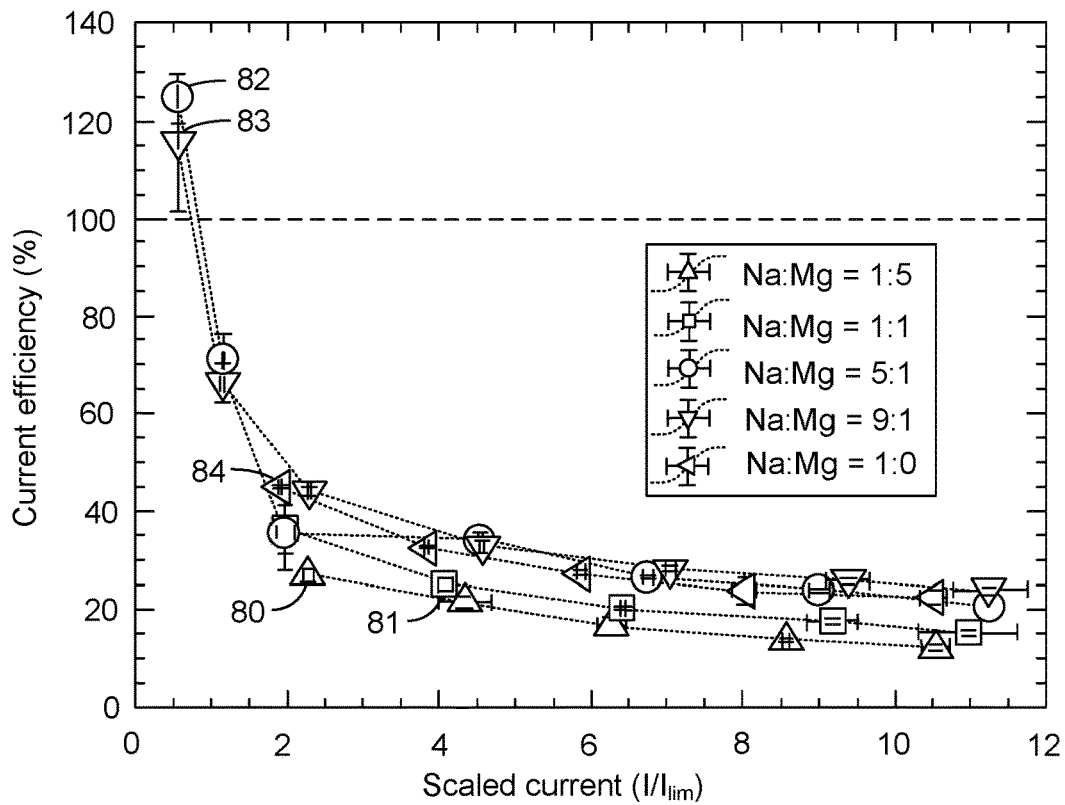
FIG. 38 is a plot of cathode-membrane current efficiency for each feed-concentration ratio studied.

In terms of the practical current efficiency of the device 10, the most important metric is the current efficiency across the cathode membrane. This efficiency is the only one that tracks how much extra current is applied to drag salt ions out of the dilute stream. FIG. 38 shows the combined results for the cathode-membrane current efficiency for each feed-concentration ratio (Na:Mg=1:5 plot 80, Na:Mg=1:1 plot 81, Na:Mg=5:1 plot 82, Na:Mg=9:1 plot 83, and Na:Mg=1:0 plot 84). The data do not collapse onto a single line; instead, a trend can be observed that the current efficiency increases with decreasing magnesium content in the feed stream.

Overall, the current efficiency decreased with increasing applied current; as more protons were generated, more current was carried by protons. A decreased abundance of magnesium in the feed increased the observed current efficiency.

The current efficiency uses information about which ions are carrying the current to explain an inefficiency in the system. The analysis in this section breaks down the current-carrying ions further to explain where the selectivity in the system is originating. The across-interface flux (vertical arrows in FIG. 32) out of each control volume can be normalized by the total flux into that control volume, as shown in equation set (6), below. This normalization makes the scaled ion flux equivalent to the fraction of ions entering a control volume that leave-leaves the control volume across an interface (instead of leaving the device). As such, it is a measurement of the ease at which each ion can cross a given interface; it is not a measurement of which ion carries the most current.

$$\tilde{N}_{i,anode} = \frac{N_{i,anode}}{c_{i,in,anode}q_{anode}} \quad (6)$$

$$\tilde{N}_{i,splitter} = \frac{N_{i,splitter}}{N_{i,anode} + c_{i,in,feed}q_{feed}}$$

$$\tilde{N}_{i,cathode} = \frac{N_{i,cathode}}{N_{i,splitter}}$$

Figure 39:
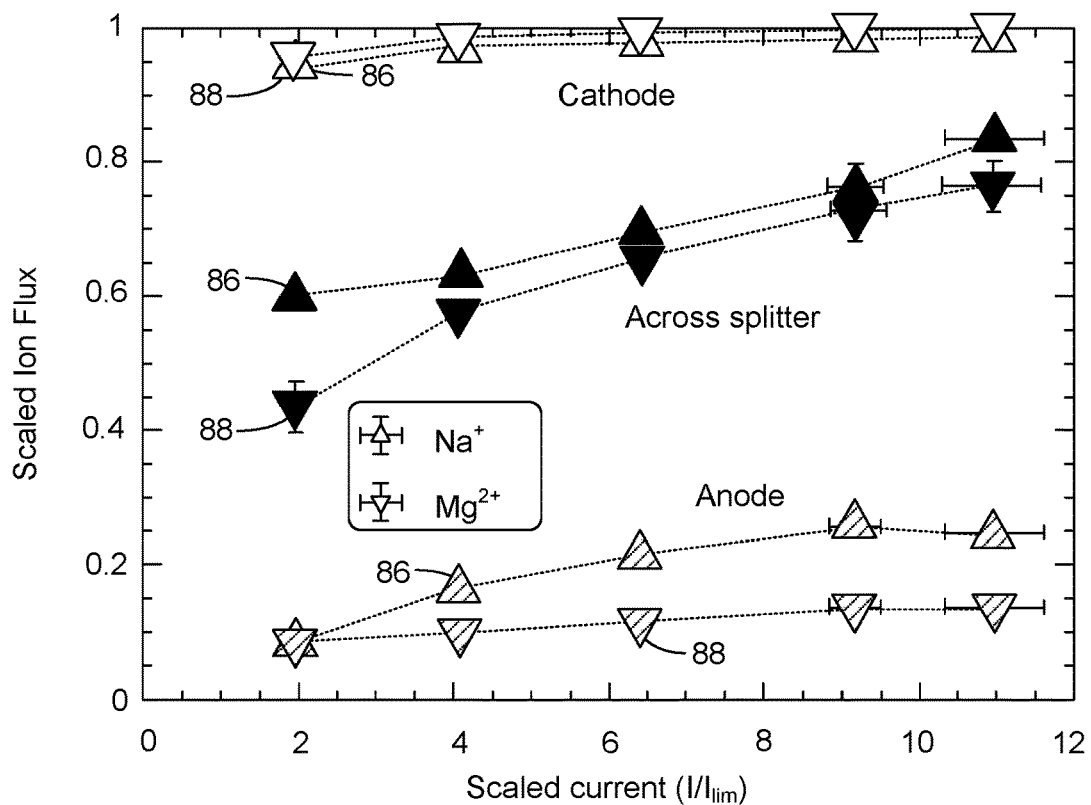
FIG. 39 is a plot of ion flux across each control-volume interface, normalized by ion flux into each control volume for a feed composition of $NaCl:MgCl_2=1:1$.

FIG. 39 looks at the scaled ion flux across each of the three interfaces (cathode membrane at top, splitter boundary in the middle, and anode membrane at bottom) for a feed with equimolar (1:1) sodium 86 and magnesium 88. As expected, the fraction of ions that are driven though the device increases with increased applied current. Sodium ions 86 pass across the anode membrane more easily than do the magnesium ions 88. The same is true across the splitter boundary 45. Across the cathode membrane 16', corresponding to ions driven out of the dilute stream 46, the magnesium ions 88 have an easier time passing. This observation provides a bit of insight into what is not causing the selective removal of magnesium 88. The anode membrane 16" is shown to not be inherently selective to the passage of magnesium 88. Since the anode and cathode membranes 16" and 16' are identical, the cathode membrane 16' is not inherently selective to passing magnesium 88, either.

Across the splitter boundary 45, sodium 86 seems to have the easier time passing, which could correspond to a slight enrichment of sodium 86 entering the dilute stream 46, contributing to selectivity. This could be the result of magnesium 88 having a harder time crossing the deionization shock. It could also be the result of magnesium 88 struggling more with electromigration in the concentrated stream 48. One possible mechanism for this is the divalent magnesium ions 88 would more closely associate with the negatively charged frit walls, slowing their transport.

Across the cathode membrane 16', magnesium 88 passes more easily. The higher field in the region for the dilute stream 46 would affect magnesium 88 more than sodium 86. This high field may be enough to offset the differences in electromigration through the porous media that is seen in the concentrated stream 48. It may even be enough to offset the apparent selectivity for sodium transport of the cation exchange membranes 16. The mechanism may also be more complicated, having to do with local changes in pH and its effect on the membrane 16 and the frit surface charge. The membrane 16 may also simply behave differently under the extreme deionization that is present at its surface. As previously mentioned, there appears to be a water-splitting reaction at the membrane surface; this reaction could also be playing a role in the selective removal of magnesium 88.

Figure 40:
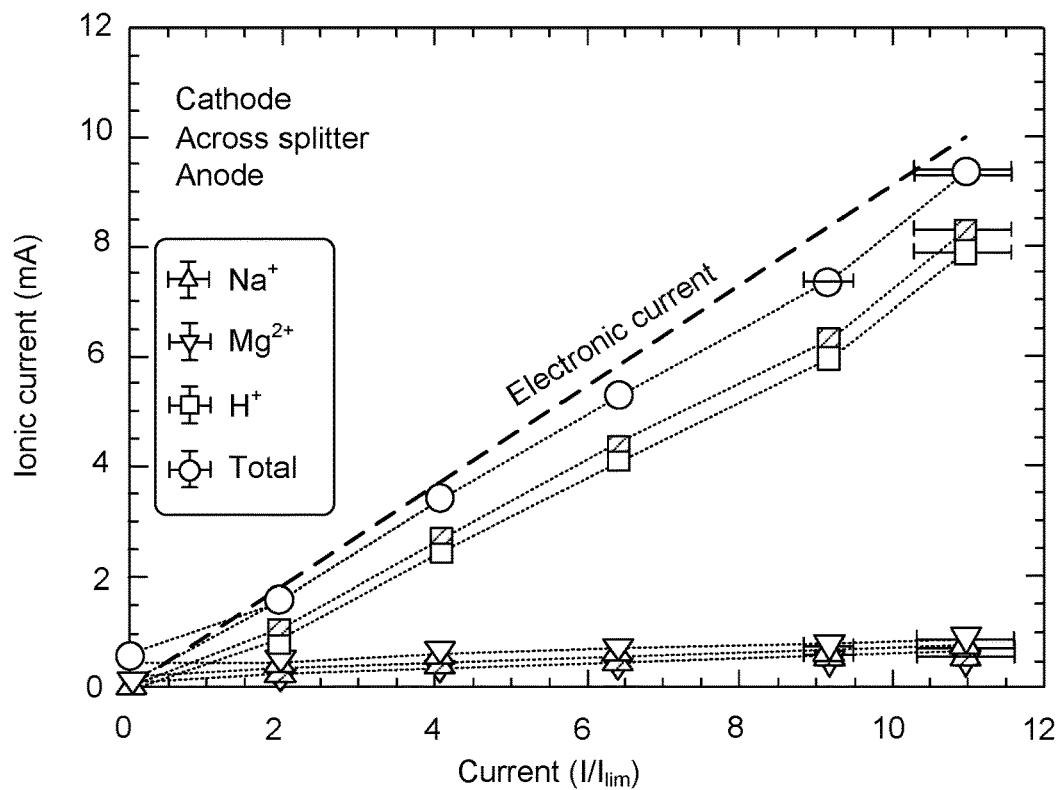
FIG. 40 is a plot of current carried by each ion across each control-volume interface, compared to the total applied electronic current for a feed composition of $NaCl:MgCl_2=1:1$.

Conservation of charge implies that the total ionic current across each interface should be equal to the total applied electronic current. FIG. 40 shows the breakdown of the current carriers (up-pointing triangles for Nat, down-pointing triangles for $Mg^{2+}$, squares for $H^+$, and circles for total ions) as well as the total current carried across each interface (clear-fill data points for ionic current across the cathode membrane, dark-filled data points for ionic current across the splitter boundary, and diagonal-hatching-fill data points ionic current across the anode membrane) for the equimolar salt feed (NaCl:MgCl$_2$=1:1). As expected from the current efficiency calculation plots earlier, the majority of the current is carried by Ht. The total measured ionic current tracks closely with the total electronic current applied to the system. The slight underestimation of the current at higher-scaled currents may be due to current carried by anions that are able to pass across the splitter boundary or through the membranes, which may not have a perfect rejection of anions. At zero current, the ionic current is nonzero. Across the cathode membrane, this nonzero current occurs because of ion exchange, as explained in earlier sections; across the splitter boundary, the nonzero current is due to the advection of a neutral salt that is misrepresented as a flux of only positive ions.

Figure 41:
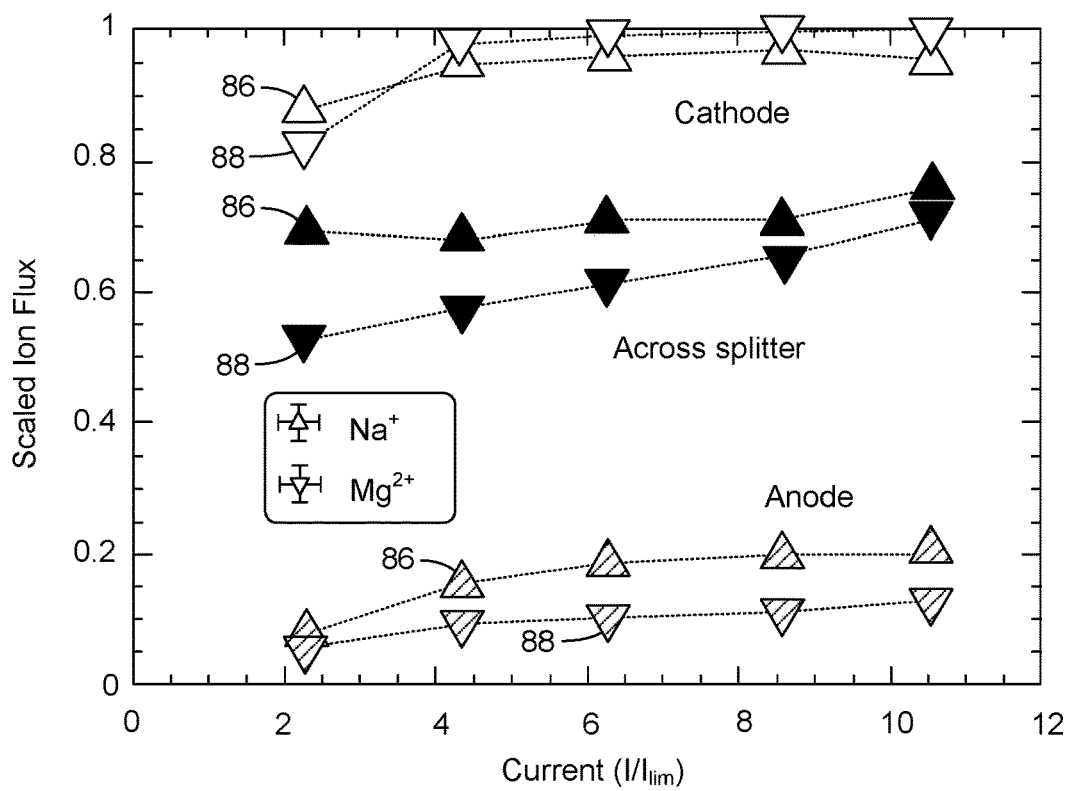
FIG. 41 is a plot of ion flux across each control-volume interface, normalized by ion flux into each control volume for a feed composition of $NaCl:MgCl_2=1:5$.

FIG. 41 shows the scaled fluxes of the salt cations (across the cathode membrane at top, splitter boundary in the middle, and anode membrane at bottom) observed in the system with a feed composition enriched in magnesium 88 (NaCl:MgCl$_2$=1:5). The data are mostly qualitatively similar to the equimolar case. The anode membrane and splitter-boundary fluxes are selective toward sodium 86 transport, while the cathode membrane is selective to magnesium 88 transport for all conditions except at the lowest current studied. Earlier, it was shown that, at this low current, there was no selectivity observed. Consequently, the selective removal of sodium 86 was enough to compensate for the sodium-enriched flux into the dilute stream.

Figure 42:
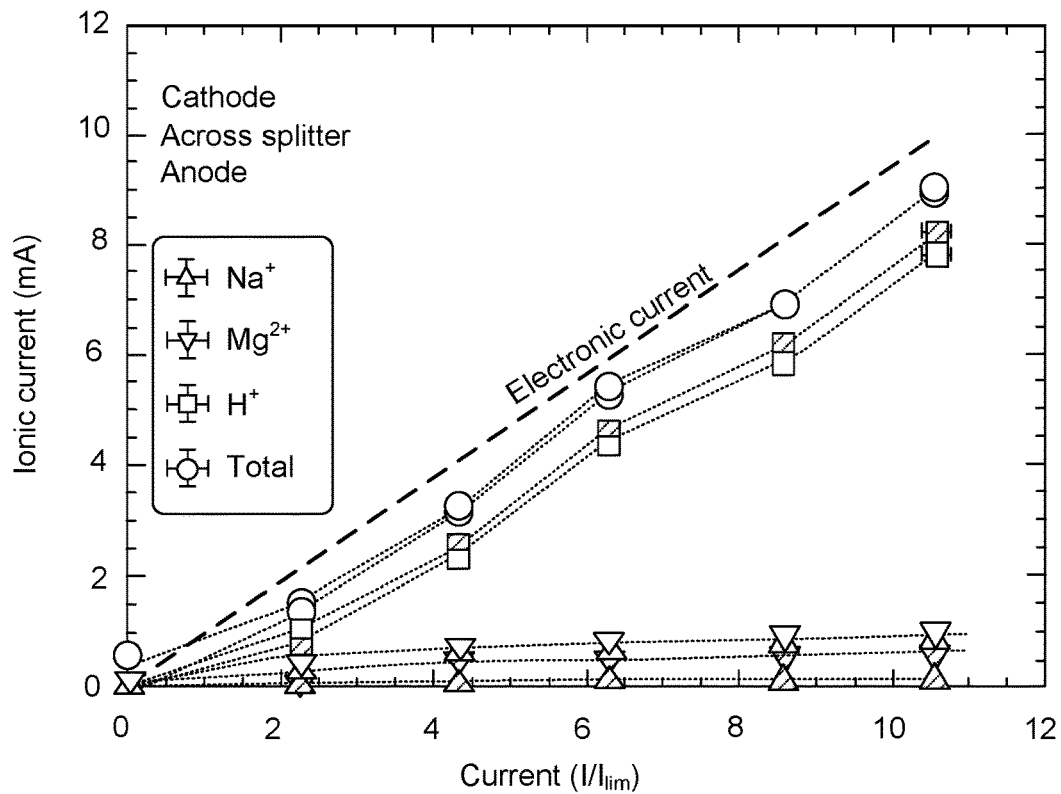
FIG. 42 is a plot of current carried by each ion across each control-volume interface, compared to the total applied electronic current for a feed composition of $NaCl:MgCl_2=1:5$.

In FIG. 42, the ionic current is broken down into its components (using the same symbols and data-point fills as were used in FIG. 40) and compared to the applied electronic current. Once again, $H^+$ conducts the majority of the current, as expected. Even though the sodium has an easier time passing through the anode membrane and across the splitter, magnesium is still the dominant current carrier. This is because $Mg^{2+}$ is the more-prevalent ion in solution. The total current is slightly underestimated, while the zero-applied-current data is a bit too high. The reasons for these observations are the same as were provided for FIG. 40.

Figure 43:
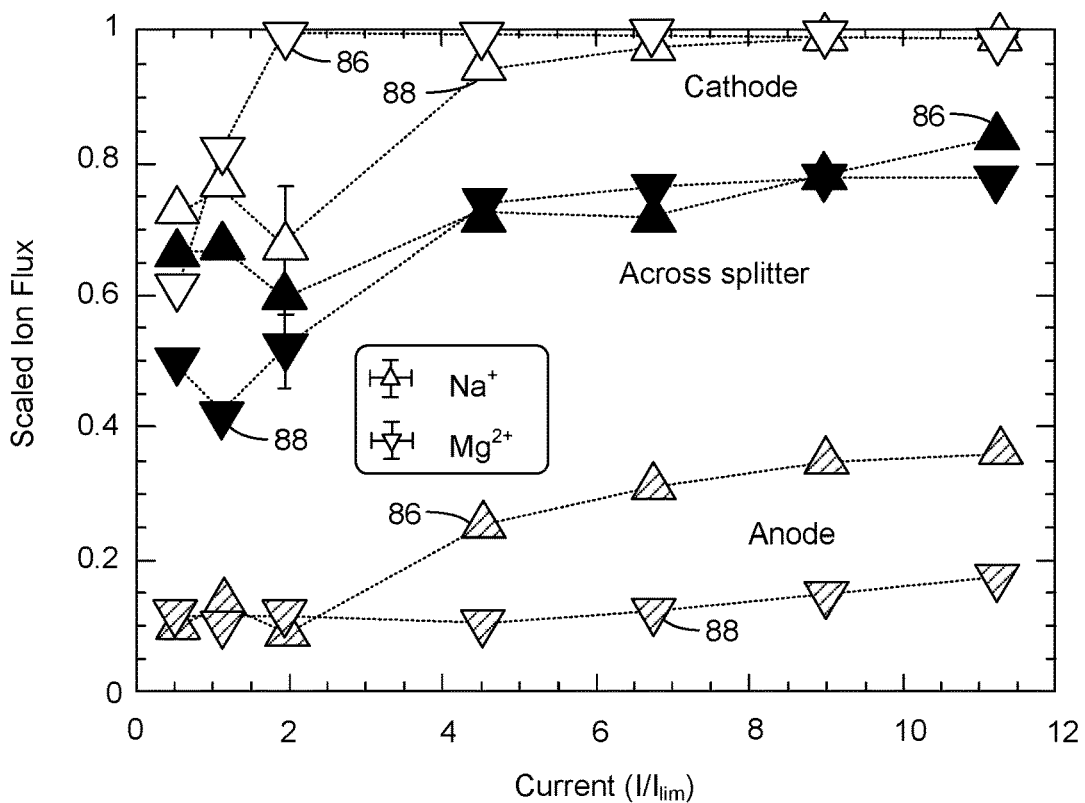
FIG. 43 is a plot of ion flux across each control volume interface, normalized by ion flux into each control volume for a feed composition of $NaCl:MgCl_2=5:1$.

FIG. 43 gives the scaled ion flux for each of the salt cations present for a feed composition of NaCl:MgCl$_2$=5:1. At moderate-to-high currents, the anode-membrane fluxes (shown at bottom) are the same as those previously shown with sodium 86 having the easier transport. At low currents, there is almost no difference in the two ions' abilities to cross the anode membrane. At low currents, sodium ions 86 pass more readily across the splitter boundary (shown at middle). For intermediate-to-high currents, there is no consistent difference in the ions' abilities to pass. Across the cathode membrane (shown at top), magnesium 88 is able to pass much more easily at a scaled current of about 2. At all currents at or above the limiting current, magnesium 88 is able to pass more easily; but the effect is not as pronounced as it is at the dimensionless current of 2. Interestingly, sodium 86 is able to pass more easily across the cathode membrane when the current is below limiting, suggesting that the strong depletion due to the deionization shock is the source of the selectivity, not the membrane itself.

Figure 44:
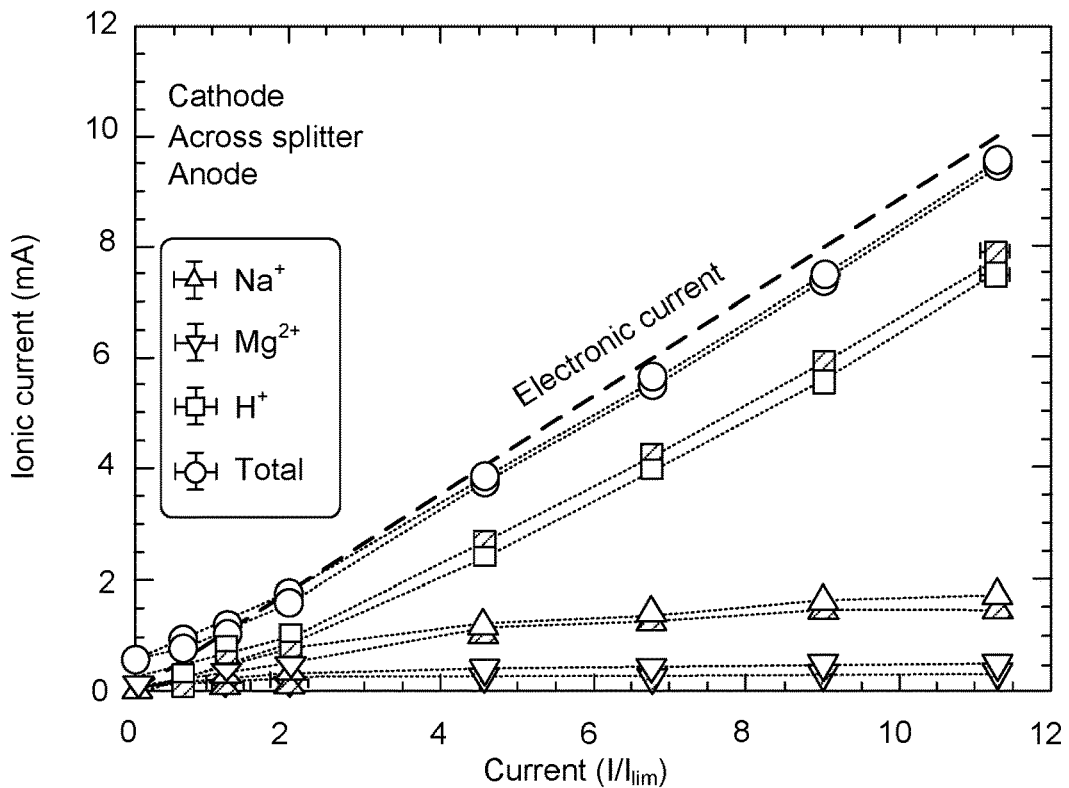
FIG. 44 is a plot of current carried by each ion across each control volume interface, compared to the total applied electronic current for a feed composition of $NaCl:MgCl_2=5:1$.

The total electronic current is compared to the ionic current and the ion fluxes that comprise it in FIG. 44 (using the same symbols and data-point fills as were used in FIGS. 40 and 42) for the case of dilute magnesium (NaCl:MgCl$_2$=5:1). As always, the total ionic current is dominated by the flux of $H^+$, especially at high currents. Sodium is the next-highest flux, because it is the most prevalent salt cation in the feed. The total current is again slightly underestimated, and the overestimation of the current across the splitter boundary at low dimensionless currents results from anion fluxes and advection of neutral salt, as explained earlier.

Figure 45:
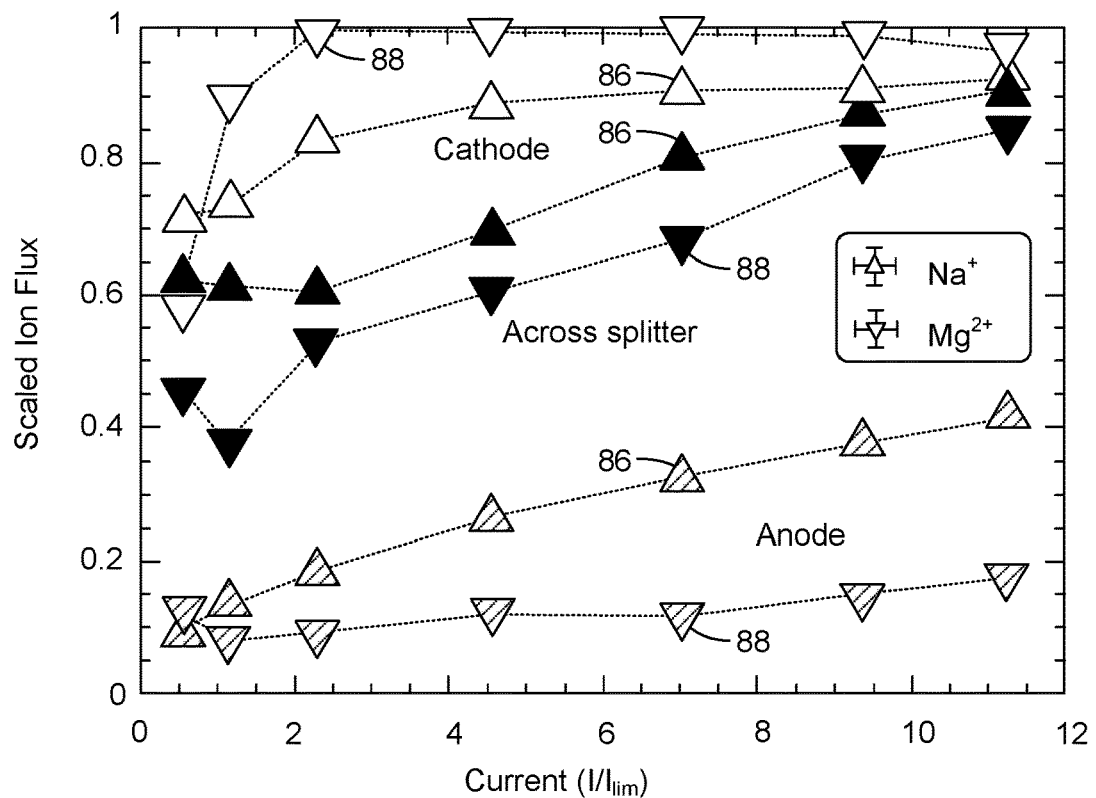
FIG. 45 is a plot of ion flux across each control volume interface, normalized by ion flux into each control volume for a feed composition of $NaCl:MgCl_2=9:1$.

FIG. 45 shows the scaled ion flux for the "diluted seawater" feed (NaCl:MgCl$_2$=9:1). At and above limiting current, sodium 86 has an easier time passing through the anode membrane (as shown at bottom) and across the splitter boundary (as shown in the middle), while magnesium 88 has the easier passage across the cathode membrane (as shown at top). At the lowest current, the selectivity is diminished across the anode membrane, and the cathode membrane shows a promoted passage of sodium 86. This same flip in cathode membrane selectivity was present in FIG. 43, as well, which was the only other feed condition at which below-limiting-currents were studied.

Figure 46:
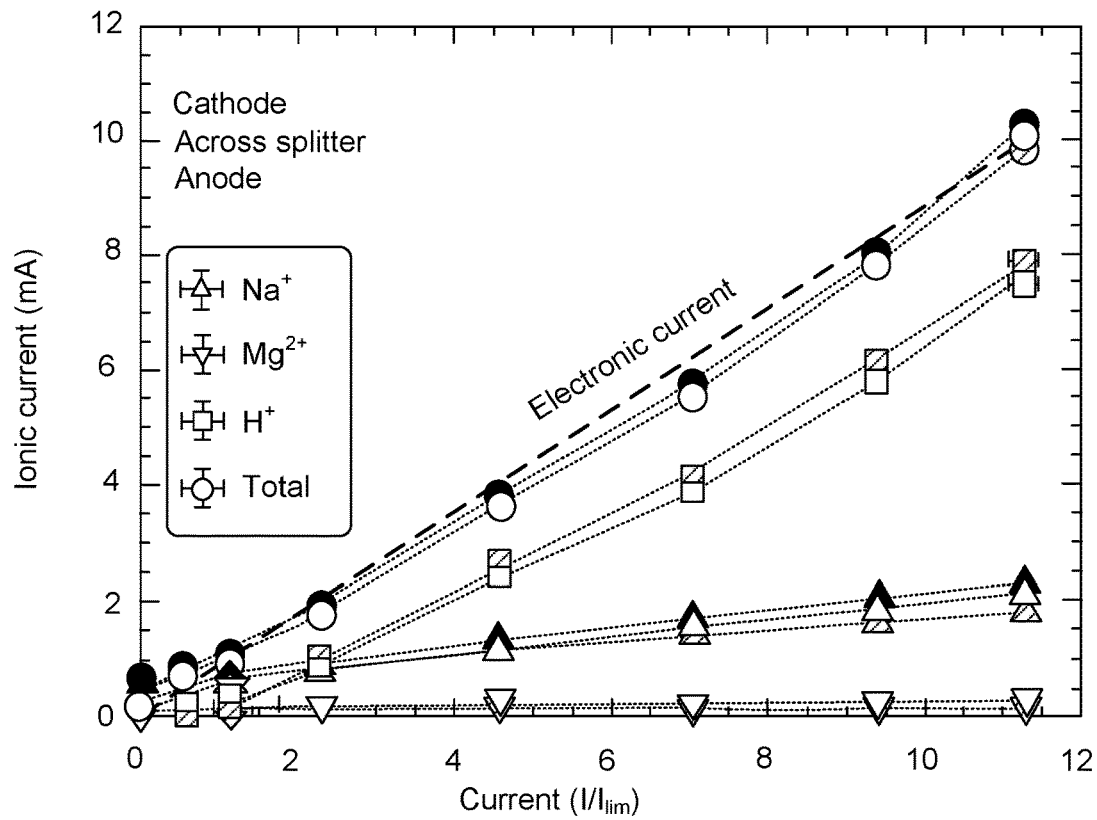
FIG. 46 is a plot of current carried by each ion across each control volume interface, compared to the total applied electronic current for a feed composition of $NaCl:MgCl_2=9:1$.

FIG. 46 (also for the "diluted-seawater" feed, where NaCl:MgCl$_2$=9:1) has characteristics that are almost identical to those in FIG. 44. The only substantial difference is the fraction of the current carried by sodium relative to magnesium. This is simply the result of the lower concentration of magnesium in the feed used in generating FIG. 46, which uses the same symbols and data-point fills as were used in FIGS. 40, 42, and 44.

Figure 47:
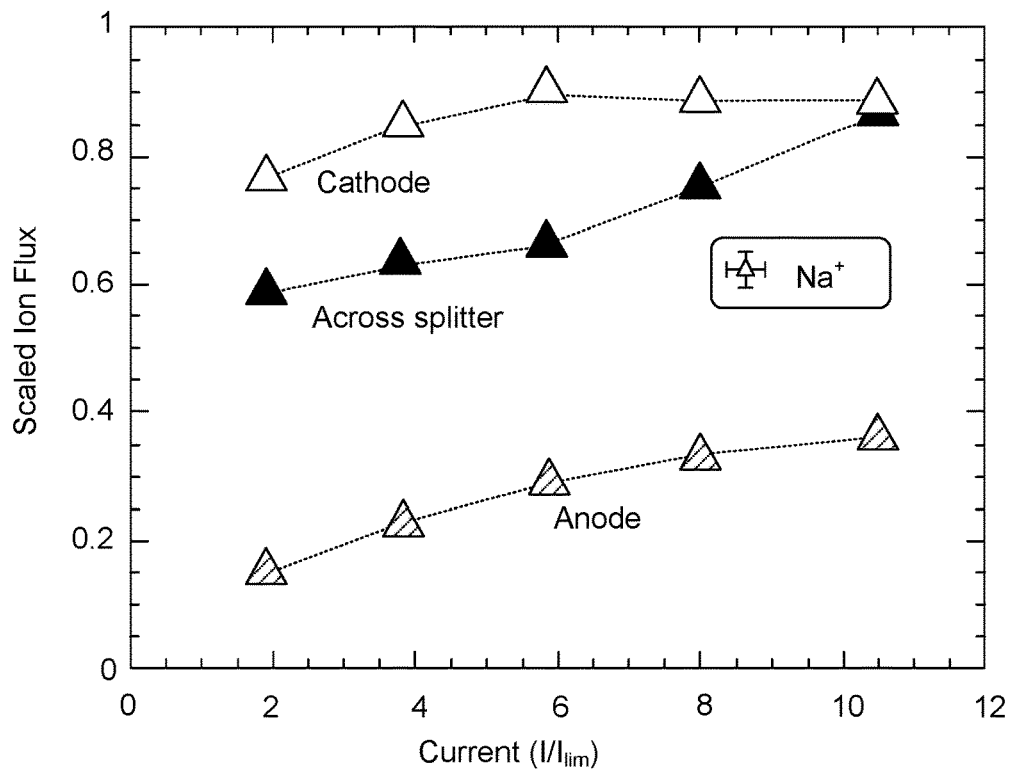
FIG. 47 is a plot of ion flux across each control volume interface, normalized by ion flux into each control volume for a feed of 10 mM NaCl.

FIG. 47 shows the scaled flux of sodium for the feed condition of 10-mM NaCl. Because the flowrate is high for the anode flush stream, only a small fraction of the sodium makes it across the anode membrane (as shown at bottom). A moderate amount makes it across the splitter boundary (as shown in the middle), but less is somewhat better to keep the concentrate as enriched as possible. For the flux across the cathode membrane (as shown at top), the fraction that makes it out is related to the ultimate desalination of the stream. For all streams, the fraction of ions that makes it out generally increases with increased current, except for the cathode-membrane flux, which plateaus at a scaled current of about 6.

Figure 48:
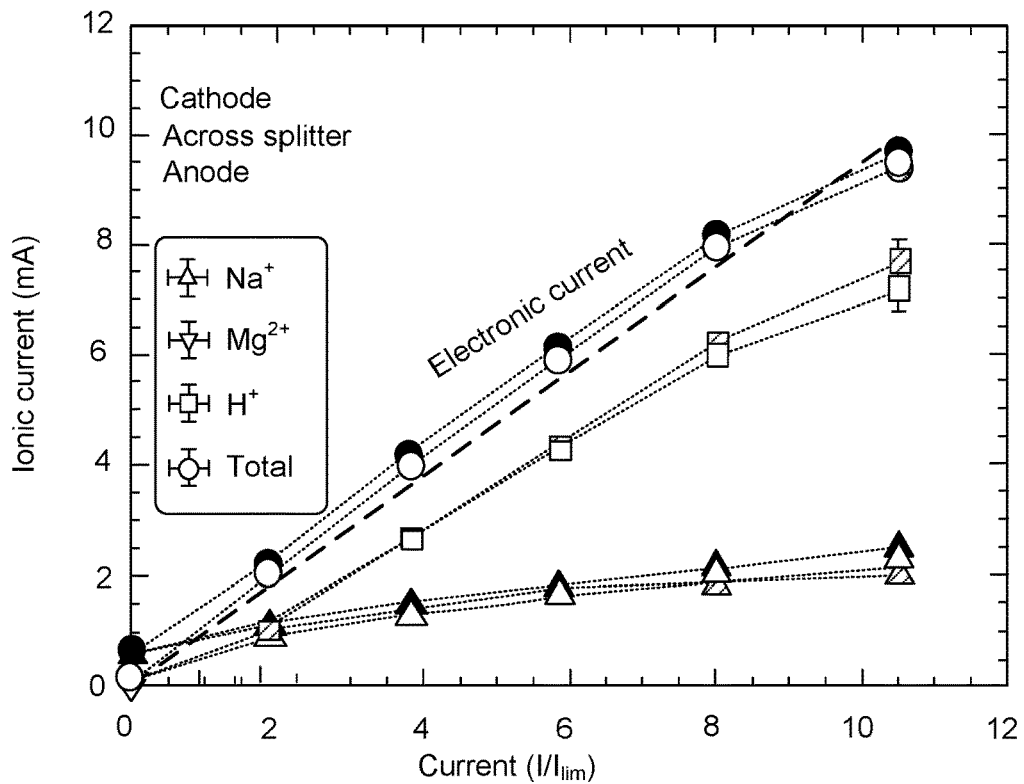
FIG. 48 is a plot of current carried by each ion across each control volume interface, compared to the total applied electronic current for a feed of 10 mM NaCl.

FIG. 48, which uses the same symbols and data-point fills as were used in FIGS. 40, 42, 44, and 46, shows the ionic and electronic currents for the 10-mM NaCl feed condition. The total measured ionic current matches well with the total applied current, but the current across the splitter is consistently a little bit overestimated for the same reasons as discussed earlier. The H$^+$ ions carry the majority of the current, as always; and this is especially true in the anode stream and at high applied currents.

Overall, tracking the current carriers throughout the system provides insight into the cause of the observed selective separation as well as confirmation of previously assumed mechanisms for losses in current efficiency. A few general trends were observed. The current across the splitter was systematically over-estimated due to advection of neutral salt. At all limiting or higher currents, the H$^+$ ions dominated the ionic current. The total ionic current measured was consistently similar to the applied electronic current. As applied current increased, the flux of each ion generally increased. Across the anode membrane, sodium passed more efficiently than magnesium; and this difference became more substantial at higher currents. Across the splitter boundary, sodium generally had a higher flux than magnesium, which may be due to a difference in affinity for the negatively charged frit walls. The higher flux of sodium contributed to enriching the dilute stream with sodium. Across the cathode membrane, magnesium had a higher flux, leading to selective retention of sodium. This result was achieved at all currents, except below the limiting current. Together, these trends suggest that the selectivity of the system is not due to a selective surface, but rather due to the extreme conditions in the deionized region below the shock.

The water recovery is defined in terms of volumetric flowrates, q, in equation (7), below.

$$\text{Water Recovery} = 100\% \cdot \frac{q_{fresh}}{q_{feed}} \quad (7)$$

Figure 49:
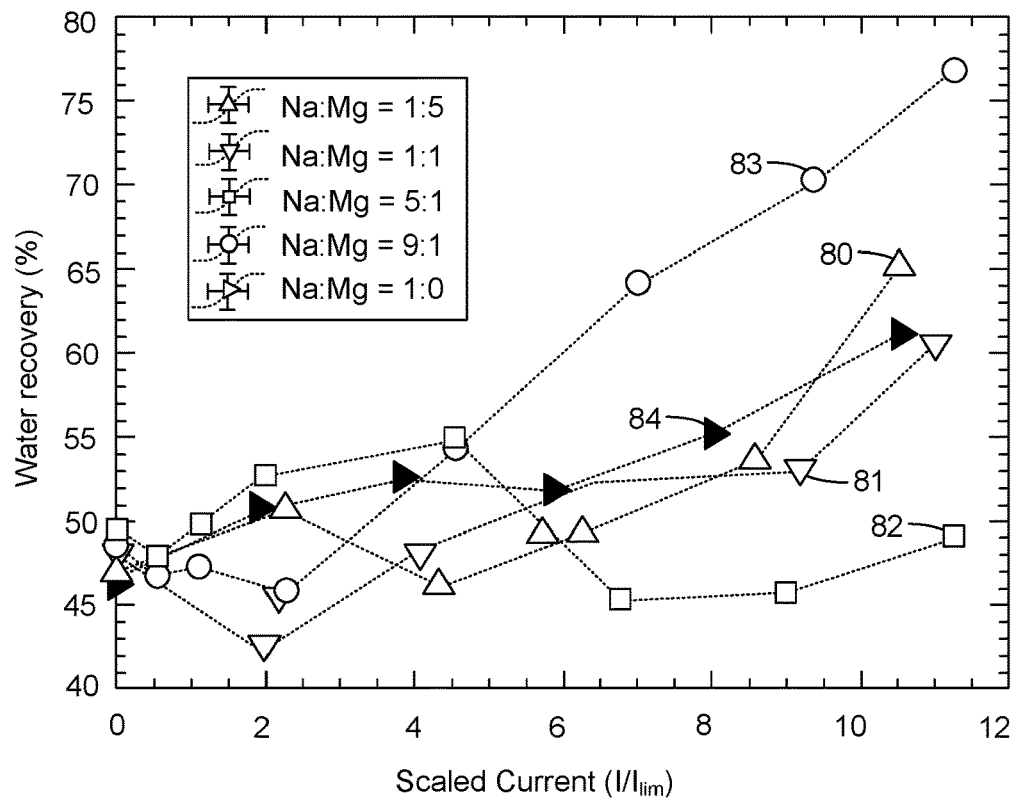
FIG. 49 is a plot showing water recovery increasing with increased electroosmotic flow across different feed compositions.

In FIG. 49, the water recovery for each feed composition studied (Na:Mg=1:5 plot 80, Na:Mg=1:1 plot 81; Na:Mg=5:1 plot 82, Na:Mg=9:1 plot 83, and Na:Mg=1:0 plot 84) is plotted against the scaled current applied to the system. Without any applied current, the water recovery for each is between 46% and 50%. With the unexplained exception of the 5:1 ratio case 82, all of the water recoveries increase with increased applied current due to electroosmotic flow in the deionized region of the device. At higher currents, there are higher potentials, which drive higher electroosmotic pressures and flows. The water recovery can be driven quite high; in the "dilute seawater" (9:1) case 83, the recovery increases from 48% up to 77%.

Figure 50:
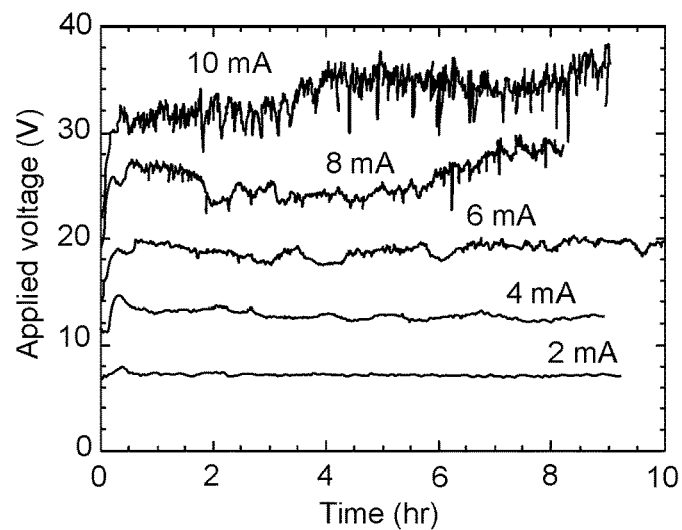
FIGS. 50-54 are plots of the voltage required to achieve each applied current for each feed composition studied: NaCl:MgCl$_2$=1:1 (FIG. 50), NaCl:MgCl$_2$=1:5 (FIG. 51), NaCl:MgCl$_2$=5:1 (FIG. 52), NaCl:MgCl$_2$=1:9 (FIG. 53), and 10 mM NaCl (FIG. 54).
Figure 51:
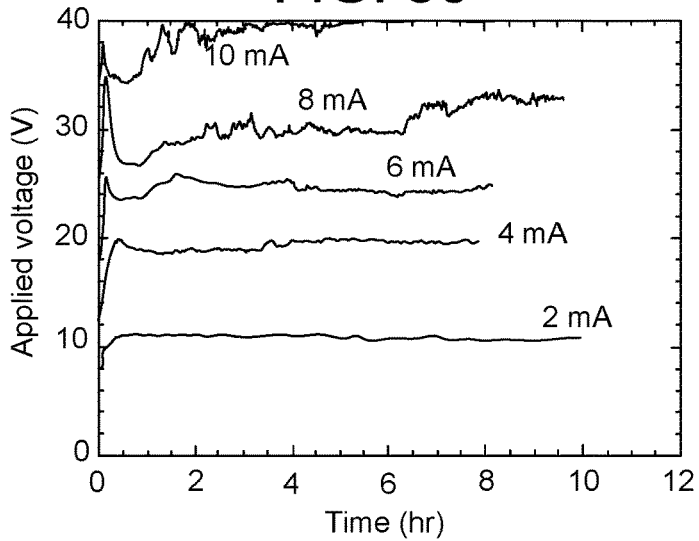
Figure 52:
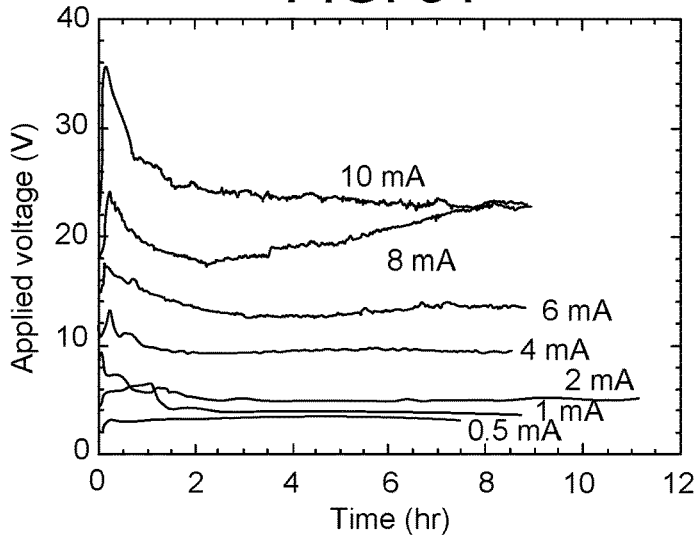
Figure 53:
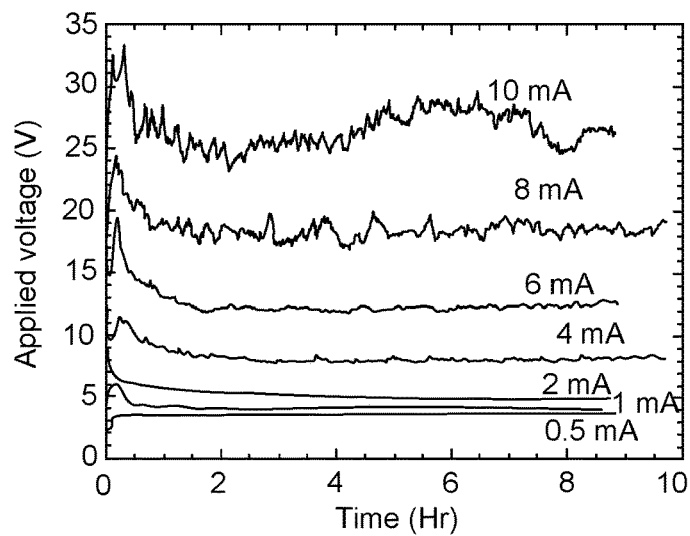
Figure 54:
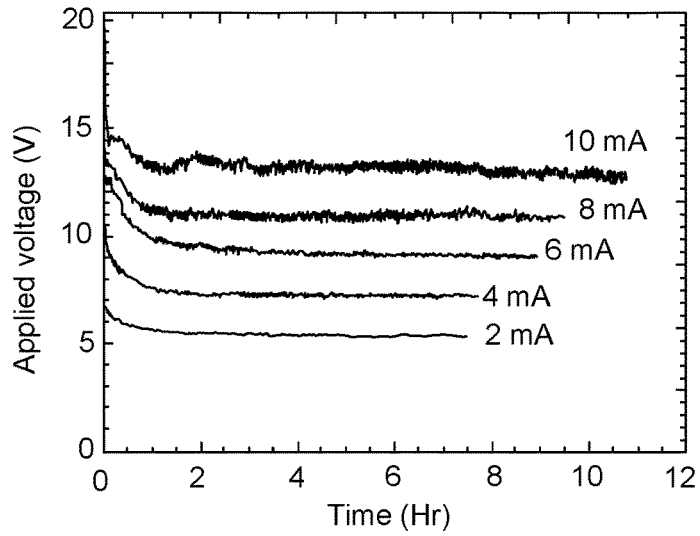

FIGS. 50-54 show the voltage that was required to achieve each of the current setpoints for each run. FIG. 50 represents a feed composition where NaCl:MgCl$_2$=1:1. FIG. 51 represents a feed composition where NaCl:MgCl$_2$=1:5. FIG. 52 represents a feed composition where NaCl:MgCl$_2$=5:1. FIG. 53 represents a feed composition where NaCl:MgCl$_2$=1:9. FIG. 54 represents a feed composition with 10-mM NaCl.

The voltage consistently increased when a higher current was applied. At high currents, the voltage requirement often became quite noisy. This noise was due to bubble formation on the electrodes during the water-splitting reaction. In all of the previous energy calculations, the voltage was averaged over the time period over which the samples were collected. These data support that the two-hour equilibration was sufficient to reach consistent steady-state behavior in the device. Only at the highest currents did the voltage signal change much, if at all, after the two-hour equilibration.

To see if the achieved selective removal of divalent magnesium ions was generalizable to other divalent ions, a mixture of sodium and lead was studied. The chosen mixture had 27 parts per billion (ppb) of lead and 4.5 parts per million (ppm) of sodium to approximate the conditions in lead-contaminated tap water in Flint, Mich, USA. Actual tap water contains other ions, of course; but this composition is still relevant as a proof of concept for the practical, selective, continuous removal of toxic lead ions. The figures that follow involve the same analysis that was performed in the above-discussed sodium-magnesium study, though the results are a bit different.

Figure 55:
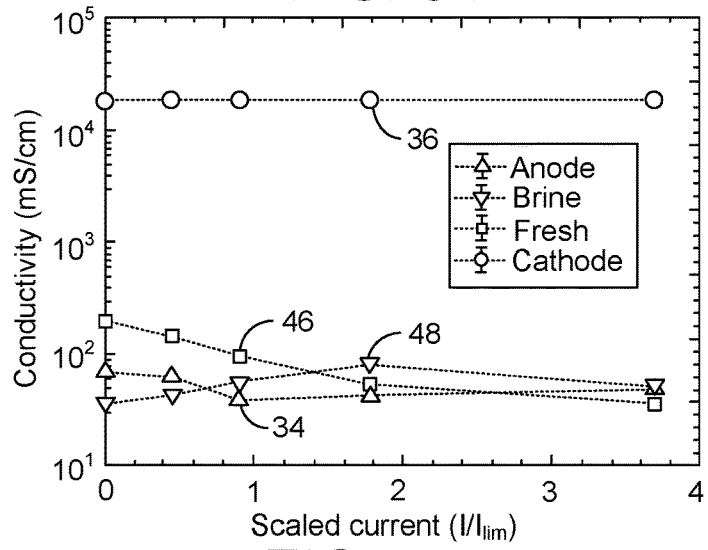
FIG. 55 is a plot of effluent conductivities of each stream with an inlet composition comparable to lead-contaminated tap water in Flint, MI.

FIG. 55 shows the effluent conductivities of each stream. As expected, the concentration of the fresh/dilute stream 46 starts higher than the concentration of the brine/concentrated or anode flush stream 48 or 34 and drops with increased applied current. The concentration in the cathode flush stream 36 is higher than that of the other streams once again because of its low initial pH due to the hydrochloric acid added to prevent scaling.

Figure 56:
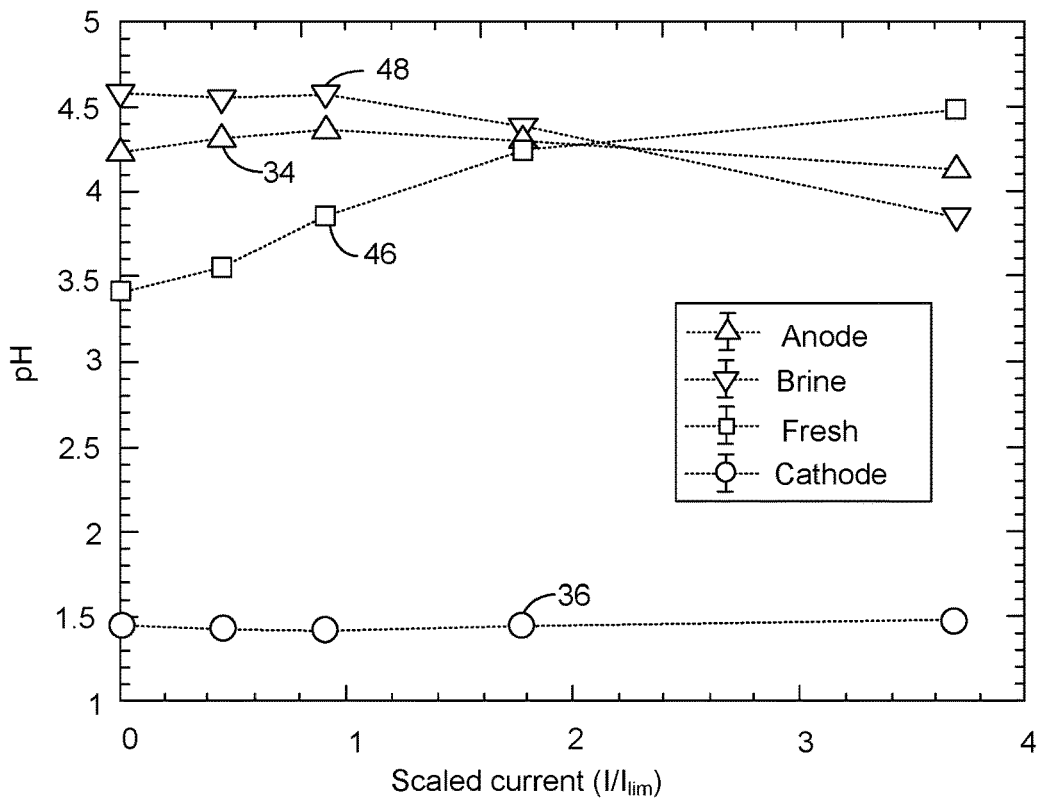
FIG. 56 is a plot of effluent pH of each stream with an inlet composition comparable to lead-contaminated water in Flint, MI.

FIG. 56 shows the pH as a function of the applied current. At low applied current, the pH is lowest for the cathode flush stream 36. It is similar for the anode flush stream 34 and brine/concentrated stream 48 and low for the fresh/dilute stream 46 due to the ion exchange across the cation-exchange membrane that allows protons to infiltrate the frit from the cathode. As current increases, the pH in the dilute stream 46 increases as protons are driven out into the cathode. The pH drops in the anode flush and concentrated streams 34 and 48 as the anode flush stream 34 becomes acidified by its water-splitting reaction. Interestingly, the concentrated stream 48 becomes more acidic than the anode flush stream 34, indicating that the protons generated in the anode flush stream 34 are not significantly accumulating there but are instead mostly pushed into the concentrated stream 48.

Figure 57:
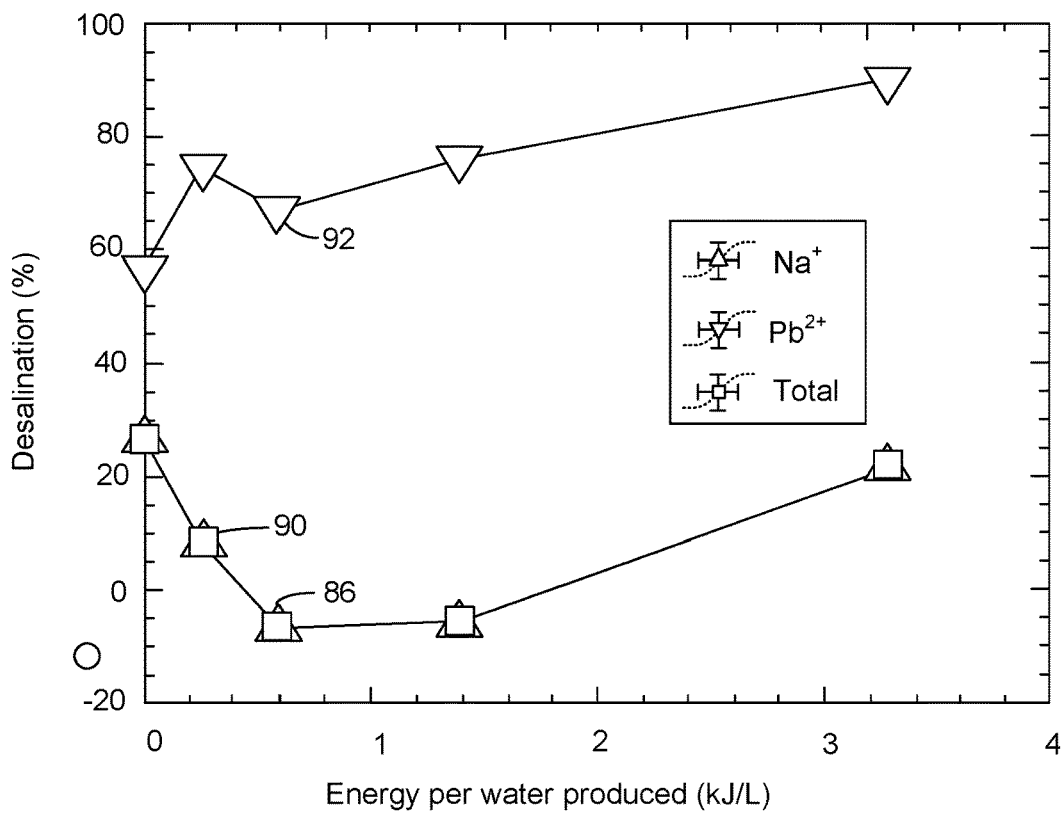
FIG. 57 is a plot of desalination of sodium and lead ions in the fresh stream for a feed composition comparable to lead-contaminated tap water in Flint, MI.

FIG. 57 shows the removal of sodium 86 and lead 92 from the fresh/dilute stream in the device. The desalination at no applied current is once again due to the ion exchange across the cation-exchange membrane. The total desalination 90 tracks very closely with the sodium desalination 86 because sodium is the dominant ion in solution. Strangely, the desalination of sodium 86 dips initially with increasing current and only climbs back to its starting value at the highest energy input studied. Lead 92, however, is removed up to 90% despite the low removal of sodium 86. The energy input here is extremely low, but it should be noted that this does not include the cost of pumping water through the system, only the cost of supplying current to the device to perform the separation.

Figure 58:
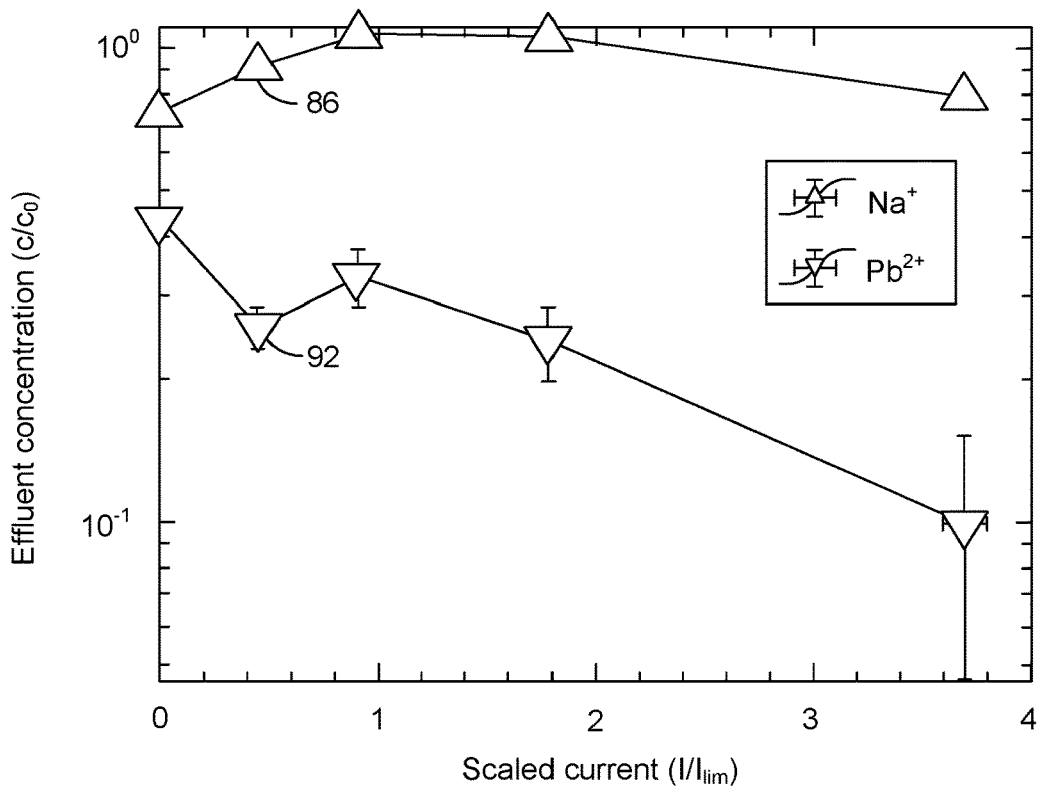
FIG. 58 is a plot of retention of sodium and lead ions in the fresh stream for a feed composition comparable to lead-contaminated tap water in Flint, MI.

FIG. 58 shows the retention of sodium 86 and lead 92 in the dilute stream in the device. The difference in retention of sodium 86 and lead 92 is significant with lead 92 having its concentration lowered significantly while sodium 86 is not removed much at all.

Figure 59:
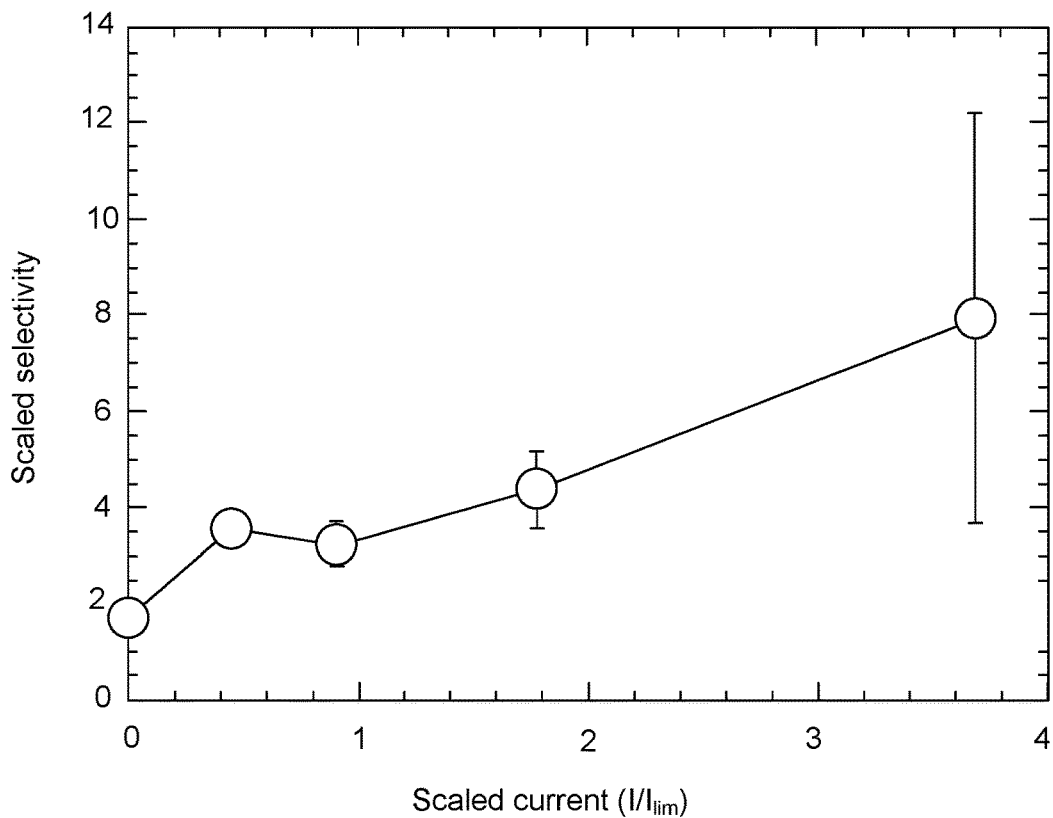
FIG. 59 is a plot of scaled selectivity for a feed composition comparable to lead-contaminated tap water in Flint, MI.

The difference in the retention of sodium 86 and lead 92 is reflected in the scaled selectivity shown in FIG. 59. The maximum selectivity achieved is 8, which is especially impressive given the low starting concentration of lead 92.

Figure 60:
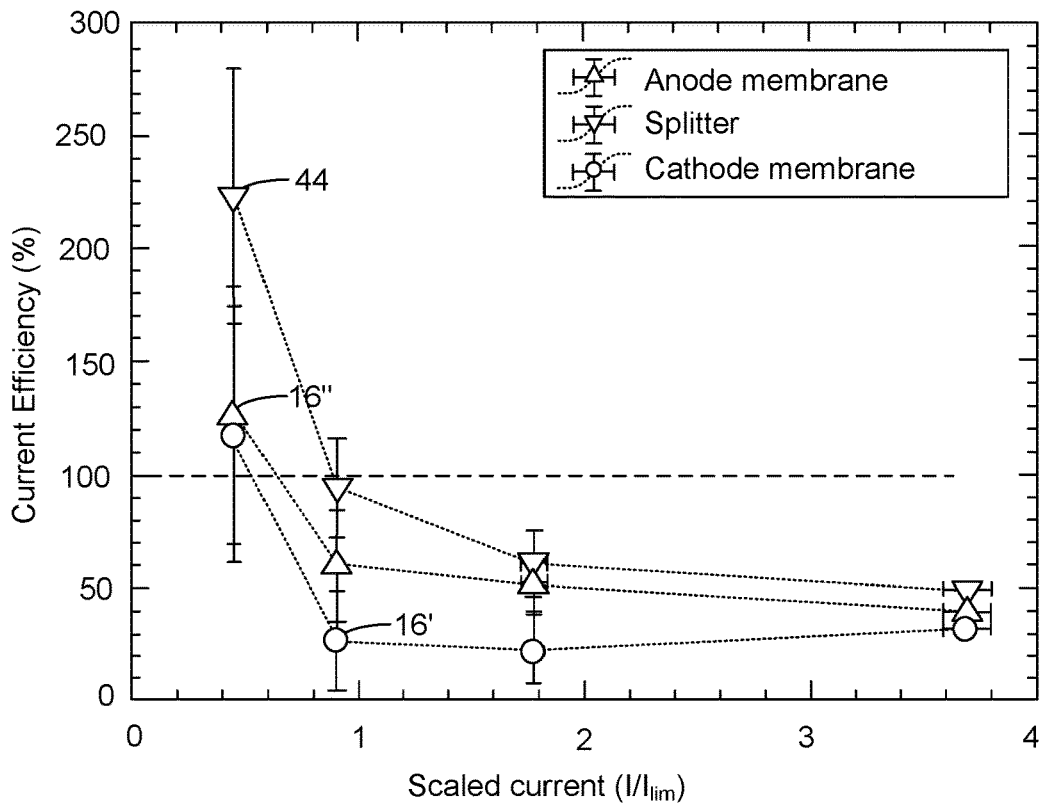
FIG. 60 is a plot of current efficiency across each interface for a feed composition comparable to lead-contaminated tap water in Flint, MI.

The current efficiency across each interface in the device is provided in FIG. 60. The trends are basically the same as those described in the sodium-magnesium work. The current efficiencies greater than 100% across the splitter boundary 44 are due to advection. The current efficiencies across the membranes 16' and 16" are close enough to 100% that they are likely within the error of the measurements. At higher currents, more of the current is carried by protons, and the current efficiency drops. Generally, the current efficiency is higher here than in the sodium-magnesium experiments, likely due to the lower total current and, therefore, lower $H^+$ production.

Figure 61:
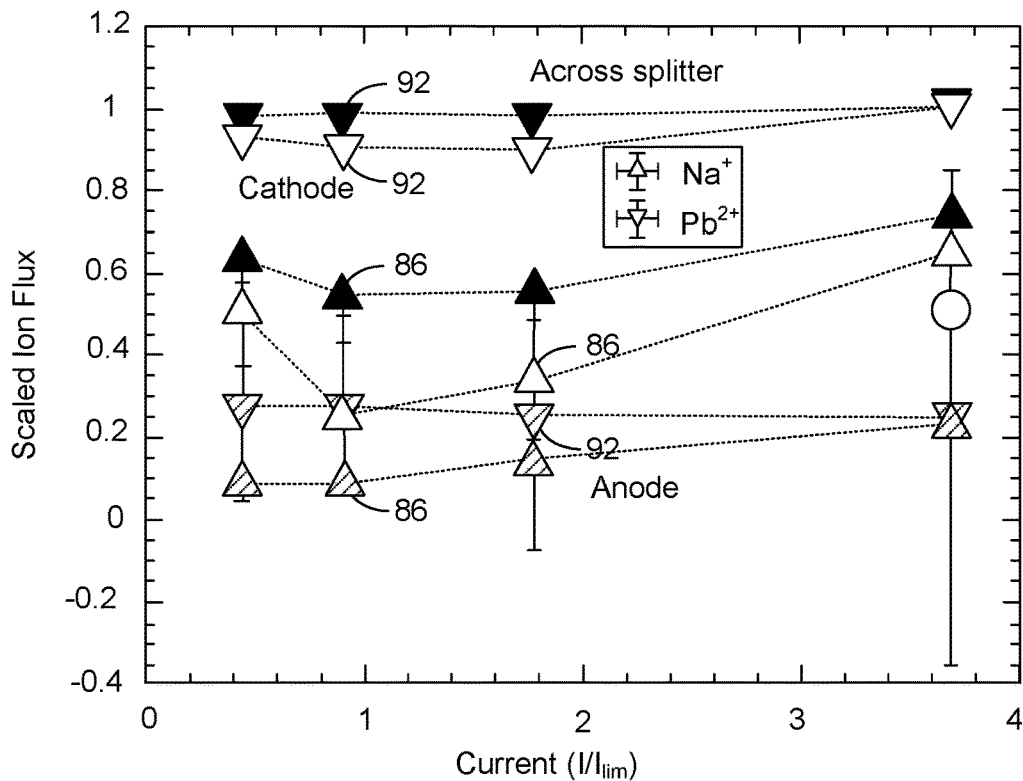
FIG. 61 is a plot of ion flux across each control-volume interface, normalized by ion flux into each control volume for a feed composition comparable to lead-contaminated tap water in Flint, MI.

FIG. 61 shows a breakdown of the current carriers across each interface of the system, wherein the cathode membrane is shown via no-fill data points, the anode membrane shown via diagonal-hatch-fill data points, and the cathode membrane shown via solid/dark-fill data points for the sodium 86 and lead 92 flux. Lead 92 seems to move very easily across the splitter boundary and through the cathode membrane. It does not move very easily through the anode membrane, similar to magnesium. When normalized by incoming ion concentration, lead 92 leaves each control volume across each interface more readily than sodium 86.

Figure 62:
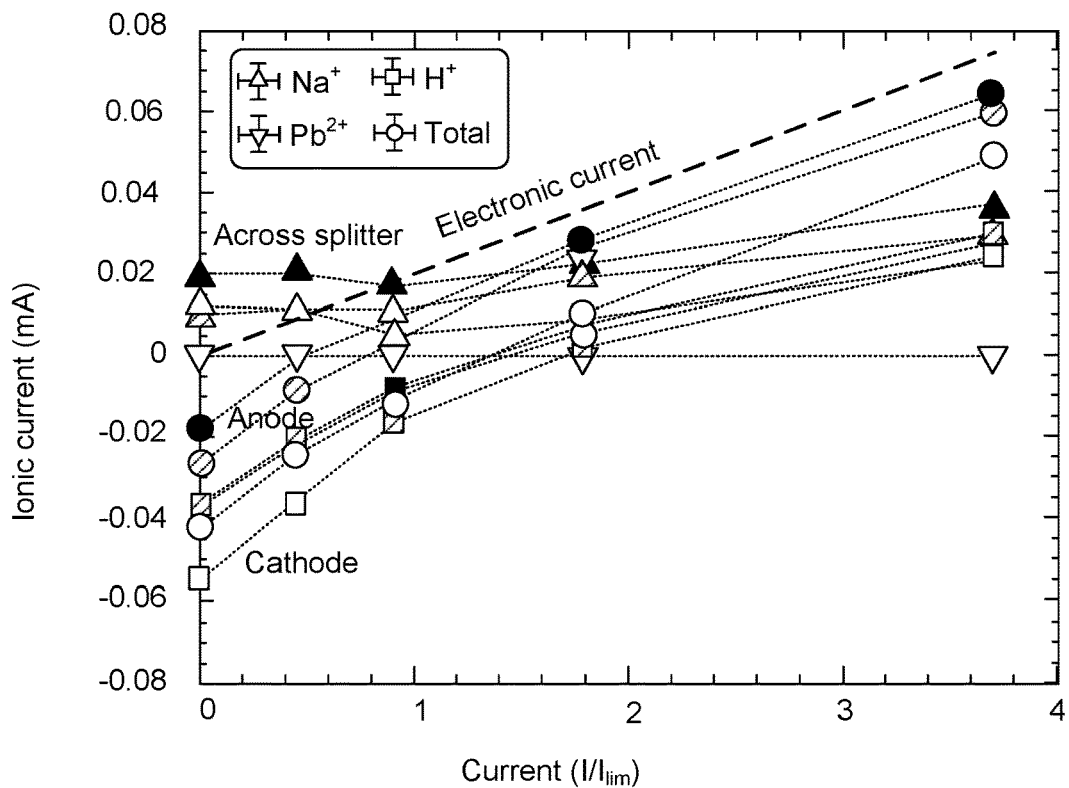
FIG. 62 is a plot of current carried by each ion across each control-volume interface, compared to the total applied electronic current for a feed composition comparable to lead-contaminated tap water in Flint, MI.

The total current carried by each ion is shown below in FIG. 62 (where $Na^+$ is shown via up-pointing triangle, $Pb^{2+}$ via down-pointing triangle, $H^+$ via square, and total ion via circle, and where current across the cathode membrane is shown via no-fill data points, across the anode membrane by diagonal-hatch-fill data points, and across the splitter boundary via dark/solid-fill data points). The current carried by each ion increases with increasing applied electric current, as expected. At low currents, the data becomes a bit messy, likely due to the ion exchange taking place across the cathode membrane. Generally, the sodium ions and protons carry a similar amount of the current, leading to the better current efficiency seen here as compared to the sodium-magnesium studies. Lead carries a negligible amount of the total current because it is such a dilute species in the overall solution.

Figure 63:
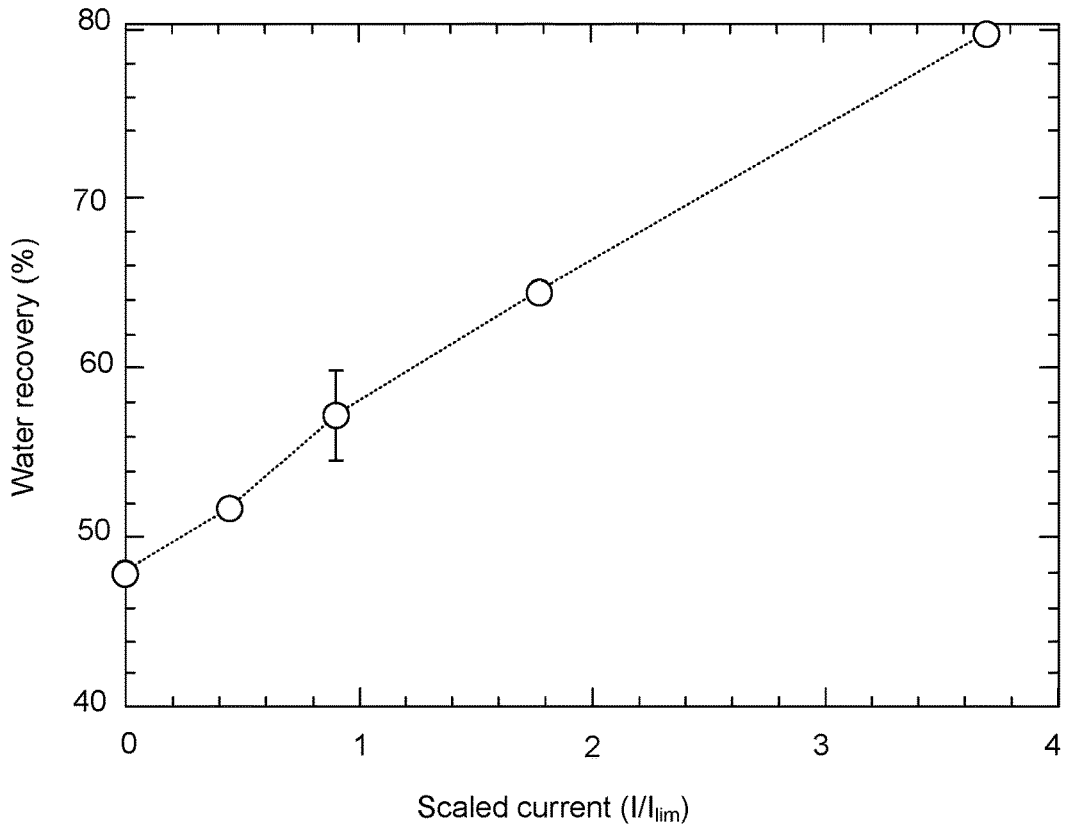
FIG. 63 is a plot of water recovery for a feed composition comparable to lead-contaminated tap water in Flint, MI.

FIG. 63 shows the water recovery increasing as a function of applied current. At the highest current studied, the water recovery reached 80%. At higher currents, the water recovery is expected to continue increasing.

Figure 64:
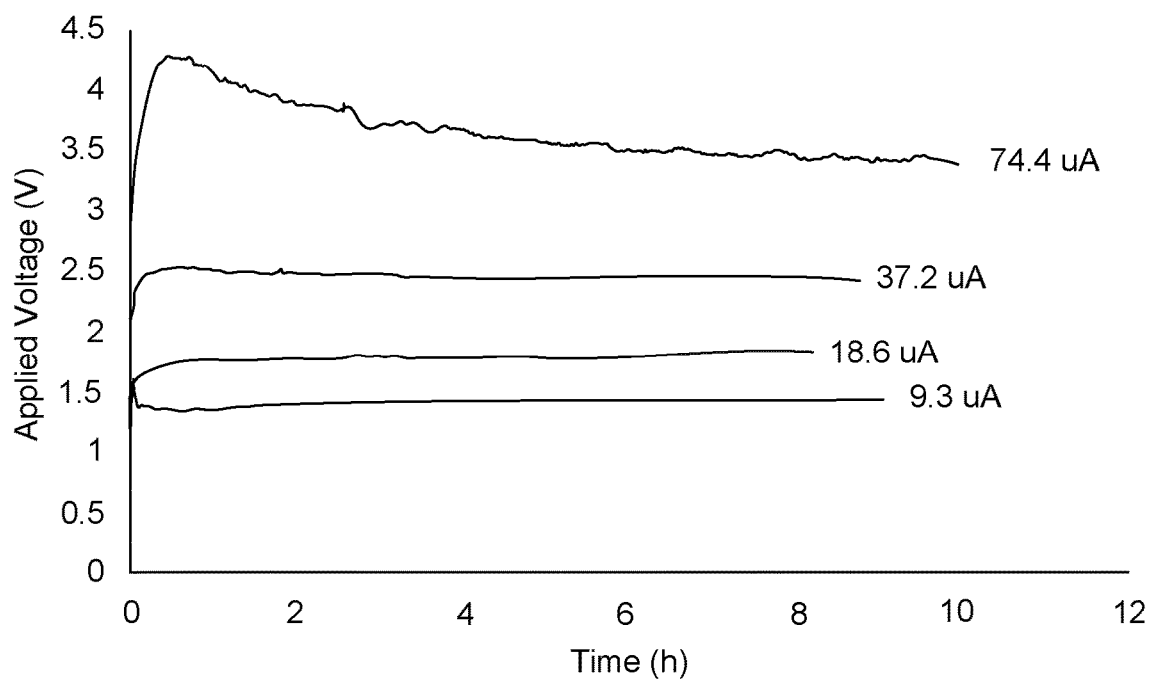
FIG. 64 is a plot of the voltage required to achieve each applied current for a feed composition comparable to lead-contaminated tap water in Flint, MI.

The voltage required to maintain the desired current in the SED device for the duration of each experiment is shown in FIG. 64. As expected, higher currents required higher voltages; and, overall, the currents and voltages used in this setup were quite low when compared to the sodium-magnesium study which operated with a 10-mM salt solution.

SUMMARY OF CONCLUSIONS

The shock electrodialysis device was improved to facilitate easier and more reproducible assembly. The splitter was made rigid and had its position determined by alignment pin holes. The thickness of the frit in the device was increased, allowing initial investigation into the effects of scale-up. For a given linear velocity of fluid inside the frit and a fixed inlet concentration of salt, the increased height meant that a larger current density was required to reach the same scaled current. The scaled current had been shown in the past to be the parameter that determined desalination, and any effects of the current density through the frit or membrane had not been studied.

A new experimental protocol was developed to allow larger sample collection, longer equilibration times, and more-detailed analysis of the inlet and effluent stream compositions. For the first time, pH measurements were taken to help investigate the cause of the low current efficiency in the device. Conductivity was replaced as the metric for tracking desalination because changes in pH can have a significant impact on the measured conductivity. Instead, inductively coupled plasma—optical emission spectroscopy (ICP-OES) was used to independently quantify the concentrations of sodium and magnesium in each stream. This independent measurement allowed a detailed study of the selectivity in the SED device.

The SED device was found to selectively remove magnesium from a mixture of NaCl and $MgCl_2$. For initial ratios of NaCl:$MgCl_2$=1:5, 1:1, 5:1, and 9:1, the scaled selectivities were 216, 4.75, 40.3, and 41.3, respectively. In the cases with dilute $Mg^{2+}$, the total desalination was only 56-68%. Leaving behind almost half of the sodium ions in the feed meant the energy consumption for 98+% removal of $Mg^{2+}$ was significantly lower due to the lower current requirements and higher conductivity of the magnesium-depleted solution.

The selectivity was found to be the result of a difference in ion mobility across the briny and deionized regions of the device when overlimiting current was applied. Specifically, sodium was passed more easily across the anode membrane and through the frit, while magnesium was passed more easily through the depleted region and through the cathode membrane. Both membranes were made NAFION N112 membranes, and the frit was roughly homogeneous. And, at low currents, sodium was transported more easily across the cathode membrane, not magnesium. Therefore, the selectivity was not due to any inherent differences in selectivity of the membranes or frit; it was a result of the overlimiting current.

pH measurements illuminated a significant increase in pH in the dilute stream when operating at currents several times the limiting current. This new discovery suggests that water splitting at the cathode membrane may be playing a role providing current through the system. This water splitting may be influencing the separation selectivity. The measurements also showed the source of low current efficiency to be the passing of $H^+$ through the device from anode to cathode.

Citric acid has been identified as a suitable buffer for use in the electrode streams. The buffer can be used to eliminate the consumption of hydrochloric acid and to reduce concentration of free protons available to conduct current, potentially increasing current efficiency. Citric acid is stable on the platinum mesh electrode and in oxidizing potentials used in the device.

Figure 65:
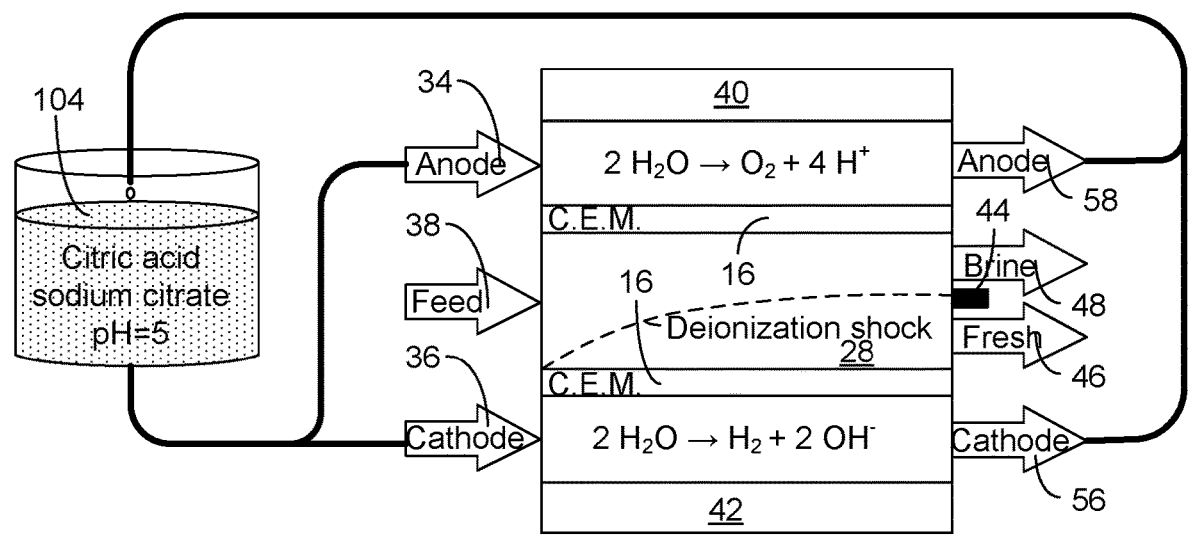
FIG. 65 is a plot of schematic for closed-loop operation with buffered electrode streams.

The inclusion of a buffer can cut down on operation expenses, eliminating the need for acid dosing. The buffer allows complete control over the anions present in the electrode flushes, preventing unwanted side reactions like chlorine evolution. FIG. 65 shows the recycle scheme for demonstrating closed-loop operation with a citric-acid buffer provided in a solution 104 with a pH of 5 for the cathode and anode flush streams 34 and 36, wherein the outputs 56 and 58 from the cathode and anode flush streams are recycled to a holding tank where the buffer solution 104 is stored.

Ultimately, lead was able to be selectively removed by a factor of 8 when compared to sodium. At high water recovery, 90% of lead could be removed while removing less than 25% of the sodium from a feed stream made to approximate lead-contaminated tap water in Flint, MI. This could be achieved at the exceptionally low energy input of 0.33 kJ/L (without accounting for pumping costs).

The selectivity of an SED has been demonstrated in the following salt pairs: (a) NaCl and $MgCl_2$ and (b) NaCl and $PbCl_2$. This selectivity may be generalized based on charge. In another example, selective separation may be performed with a mixture of KCl and $PbCl_2$. Furthermore, selectivity may be observed between ions irrespective of charge based on other differences, including the following: solvation shell (in water or another solvent), size, interactions with changes in pH, and chemical and physical interactions with the porous media, membranes, between ions in solution, or with other added materials and chemicals.

Figure 66:
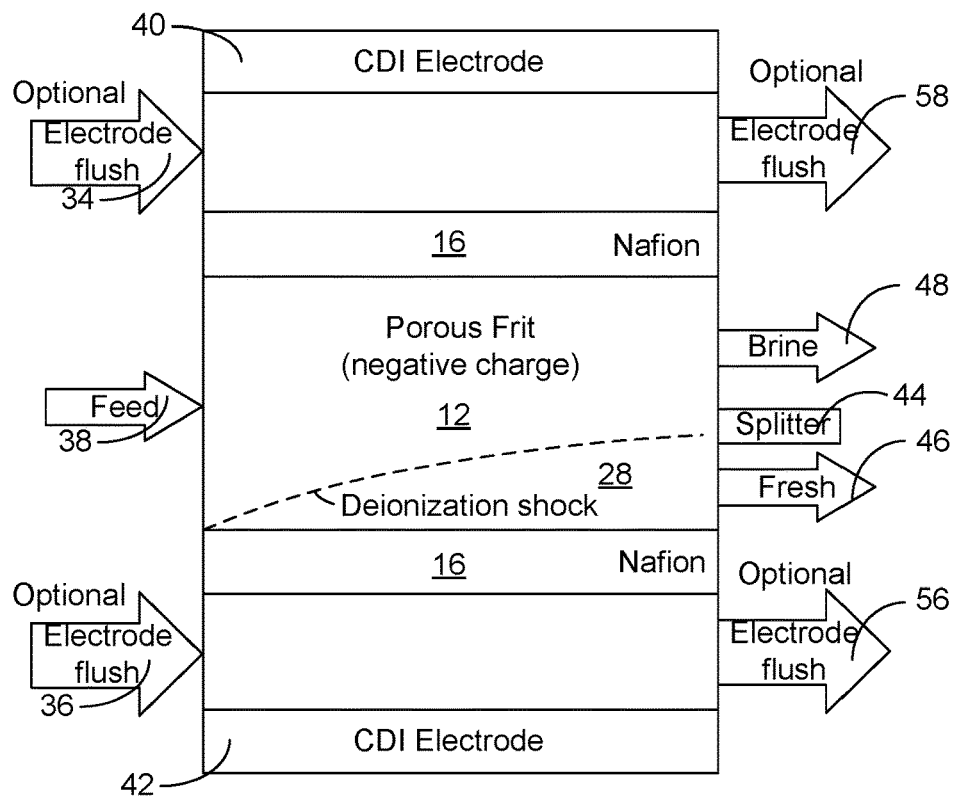
FIGS. 66 and 67 are schematic illustrations of two designs for a capacitive deionization (CDI) electrode implemented for SED, including incorporation of a standard CDI electrode (FIG. 66) and incorporation of a slurry CDI electrode (FIG. 67).
Figure 67:
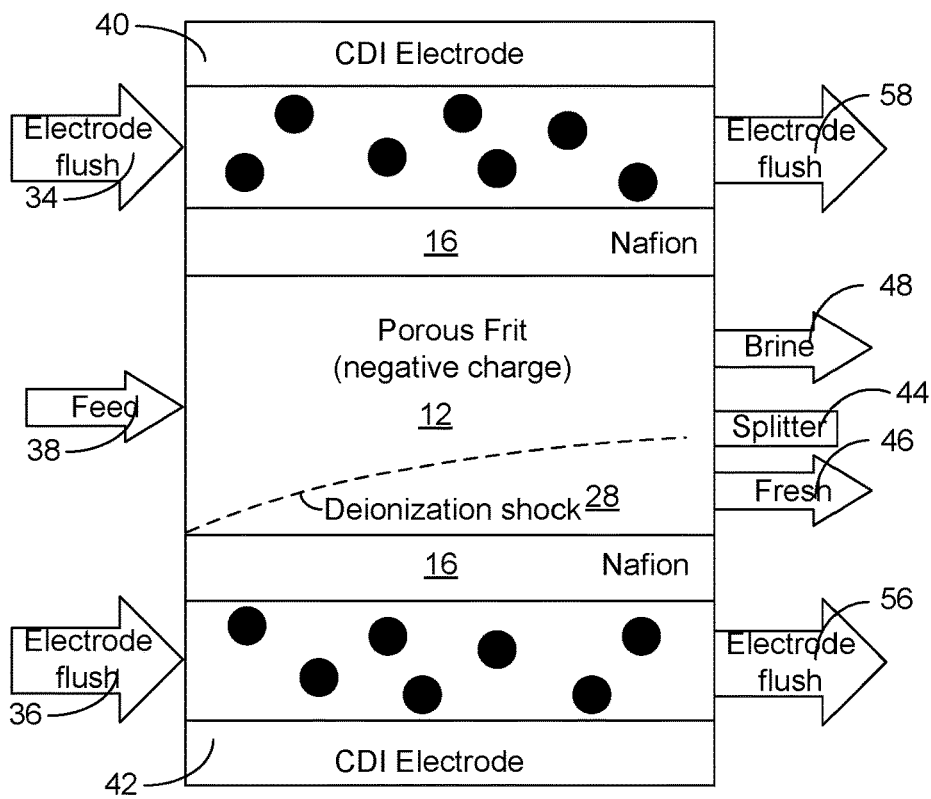

In additional exemplifications, the water-splitting reaction and its catalyst could be replaced entirely with a capacitive deionization electrode 40/42 (FIG. 66). This electrode 40/42 can operate with or without an electrode flush, depending on the needs of the application. With a simple adsorbing carbon electrode 40/42, the issue of proton transport across the cell would be mitigated. In capacitive deionization, the field is reversed periodically to discharge the capacitive electrodes. This may cause some difficulty in keeping the device operating at steady state. If there were no electroosmotic flow, the water recovery in such a system would be limited to 50% because the brine/concentrate 48 and fresh 46 streams would be switching positions during operation. Because of electroosmotic flow, the water recovery can be significantly above 50%, even in a geometrically symmetric device. To circumvent this non-steady-state issue entirely, each electrode 40/42 can be a flowable electrode, such as an activated-carbon slurry, in place of a static capacitive-deionization electrode (FIG. 67). In such a setup, the slurry particles achieve electrical contact with the current collector for long enough to charge and adsorb an ion from the electrode flush stream 34/36. The anode and cathode flush streams 34 and 36 can then be mixed back together to discharge and desorb the ions previously associated with the particles.

In more exemplifications, the borosilicate frit can be replaced or treated to modify its surface properties. Replacing the frit as the cationic porous medium 12 with a cation exchange resin (for example those used in EDI) could dramatically change the performance of the device. Using resins with different affinities for different ions could also potentially increase the selectivity of the device. One challenge to overcome with the use of a packed bed of resin is the way in which the splitter 44 is attached to the front of the device. The frit has the advantage of being monolithic, so splitter attachment is much easier. To keep this advantage, the frit can be chemically treated to modify its surface. Such modifications could be used to try to increase effective surface area, tune the surface charge and isoelectric pH, increase or decrease charge density, or enhance selectivity.

Figure 68:
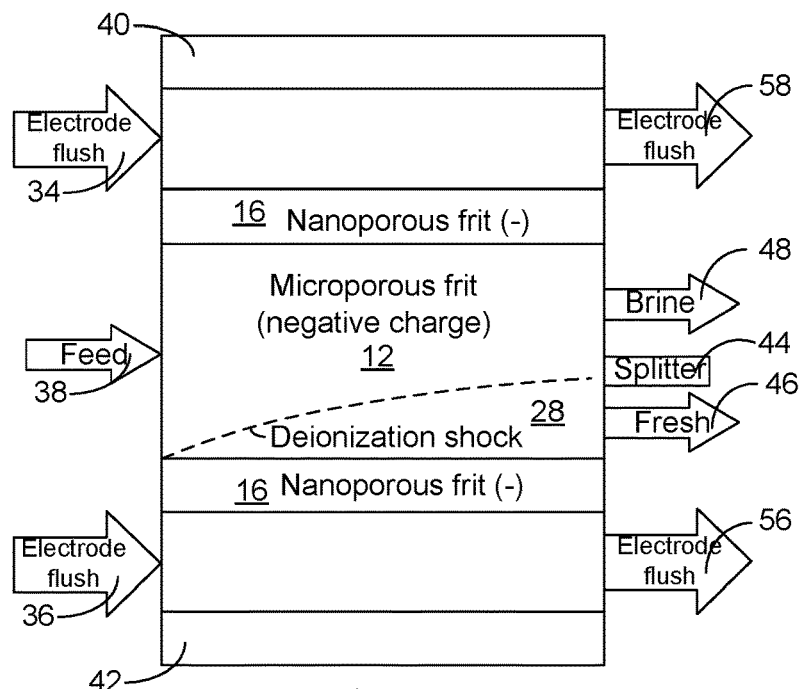
FIGS. 68 and 69 are schematic illustrations of a membrane-less SED cell comprising a single porous material with varied porosity. The single-unit device is shown in FIG. 68; and an example stack with two simultaneous separations taking place between a single pair of electrodes is shown in FIG. 69.
Figure 69:
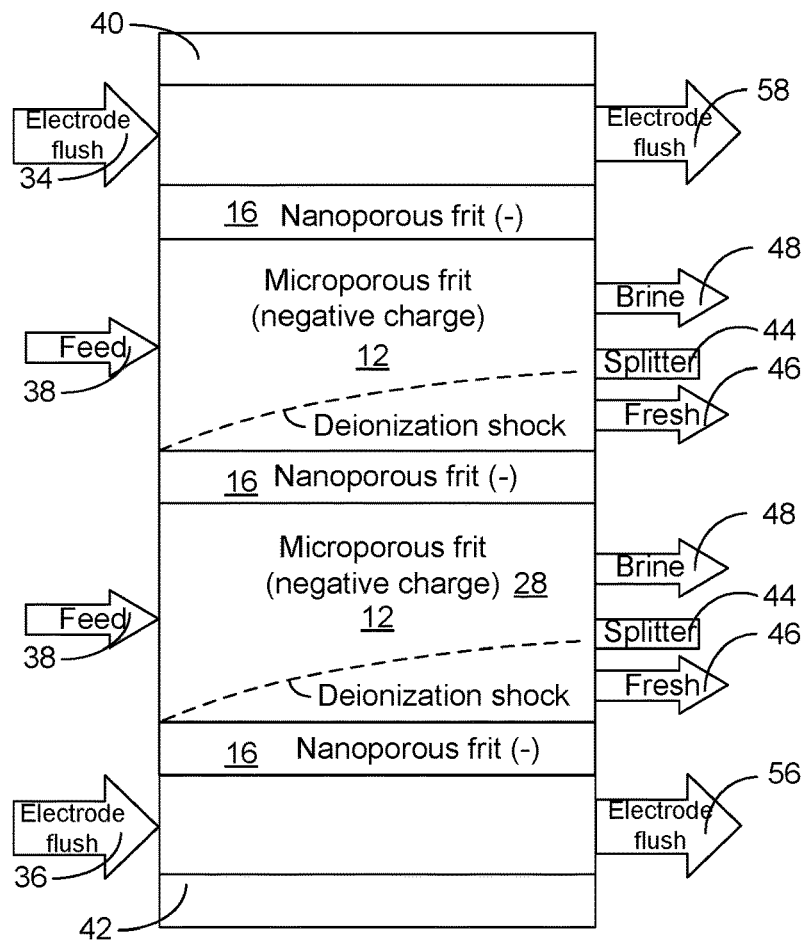

In additional exemplification, the frit and the membrane can be replaced together by a single porous material 12 with spatially varied pore size (including that provided by a nanoporous frit 16 in place of the membranes) and surface charge density, as seen in FIGS. 68 and 69, which provide a schematic illustration of a membrane-less shock-deionization cell comprising a single porous material 23 with varied porosity (FIG. 68) and a schematic illustration of a stack with two simultaneous separations taking place between a single pair of electrodes 40 and 42 (FIG. 69). The removal of the membrane can provide several advantages. First, the device would be much less prone to degradation in the presence of difficult-to-handle fluids. Examples of such fluids could include radioactive materials as well as highly reactive dissolved compounds.

Some feed streams will be too salty to completely deionize in a single pass. The currents required may be too high to be practical. For such applications, the SED device can be operated in multiple passes. The first pass can be at under-limiting current and only establish a gradient in concentration in the frit. This gradient would still achieve desalination but would not provide any region of deionization. The partially desalinated fluid can be run at under-limiting current until it reached a low enough concentration to be deionized by SED. The water recovery for a many-stage desalination scheme would be low, so a recycle scheme may be used to limit wasted water. For example, the brine/concentrate from the third pass would likely be of comparable or lower salinity to the first unit's feed. Therefore, the third system's concentrate can be recycled. In a similar fashion, the concentrate from the fourth stage can be recycled into the feed of the second unit, and so on.

Figure 70:
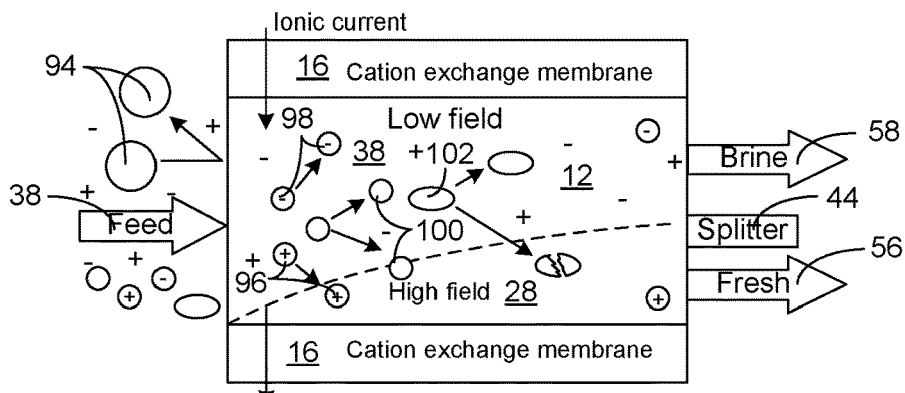
FIG. 70 is a schematic illustration showing the possibilities for process intensification including filtration of large particles, salt removal or concentration (+and −), charged particles (+and −) and uncharged particle separation, and disinfection by removal or cell lysis.

FIG. 70 shows how an SED device can be used to do several different separation and cleaning steps in a single device [e.g., filtration of large particles 94, separation of dissolved salt ions (+, −), separation of other positive and negative charged particles 96 and 98, separation of uncharged particles 100, and disinfection by removal or lysis of cells 102]. The porous media 12 used as the frit will not allow large particles 94 to pass through, providing a filtration functionality. As already mentioned, the device can perform desalination and even selective ion removal. Positively and negatively charged nanoparticles 96 and 98 would not be filtered out and will be moved by the electric field into the fresh/dilute stream 56 and brine/concentrated stream 58, respectively. Small, uncharged particles or droplets 100 will be moved by dielectrophoresis. Highly polarizable particles, such as metallic nanoparticles, would be moved into the area of high field—i.e., the dilute stream 56. Contrastingly, particles with low polarizability, such as oil droplets, would be deflected into the area of low field—i.e., the concentrated stream 58. Microbes 102 would behave similarly to the nanoparticles and droplets, with charged and uncharged cells moving based on the field. Microbes 102 that would make it into the dilute stream 56 based on their charge or polarizability would have to cross through the deionization shockwave. The dramatic change in field and salinity may be enough to cause lysis of cells 102. As long as there is some amount of salt ions (+/−) present, any or all of these separations could potentially occur simultaneously. It should also be noted that by changing the frit 12 to a positive charge and the membranes 16 to anion exchange, the charged nanoparticles 96 and 98 or microbes 102 would end up in the opposite stream (positive in concentrated stream 58, negative in dilute stream 56), but all other separations would remain mostly unchanged.

In the preceding exemplification, the magnesium was removed by passing it into the cathode stream. In a stacked system, the ions should accumulate in the brine/concentrated stream below each fresh/dilute stream. In such a system, sodium and magnesium are expected to build up in the concentrated streams, while sodium is the dominant ion remaining in the dilute stream.

Applications:

Tap water remediation is one exemplary application of this shock electrodialysis technology. The starting salinity for tap water is generally low. The goal would not be desalination, but instead the targeted removal of a trace toxic impurity, such as copper or lead. Because these cations usually exist as divalent ions in solution, they may behave similarly to magnesium and be removed much more easily than are the monovalent sodium and potassium in the tap water. This selectivity could lower energy cost dramatically.

With a conservative cost estimate for electricity at US $0.15/kWh, the demonstrated energy cost per 1000 L of water for 90% lead removal at 80% water recovery is approximately one cent (neglecting pumping cost).

Figure 71:
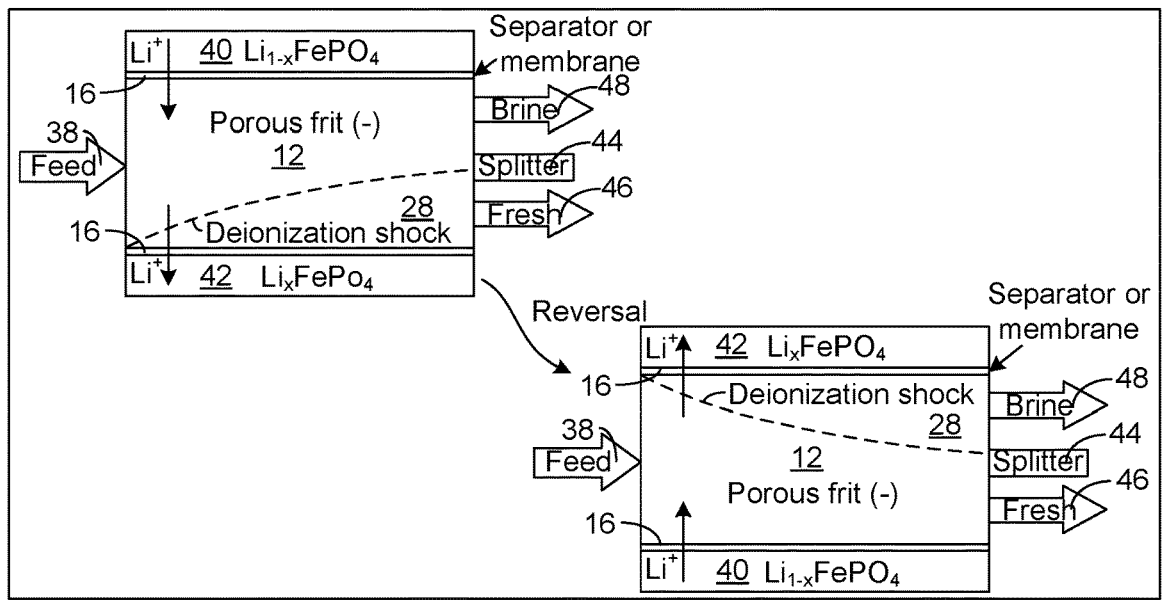
FIG. 71 is a schematic illustration of shock faradaic CDI device. The example shown is for lithium iron phosphate for the concentration of lithium, but any intercalation material could be used to target any ion in solution.
Figure 72:
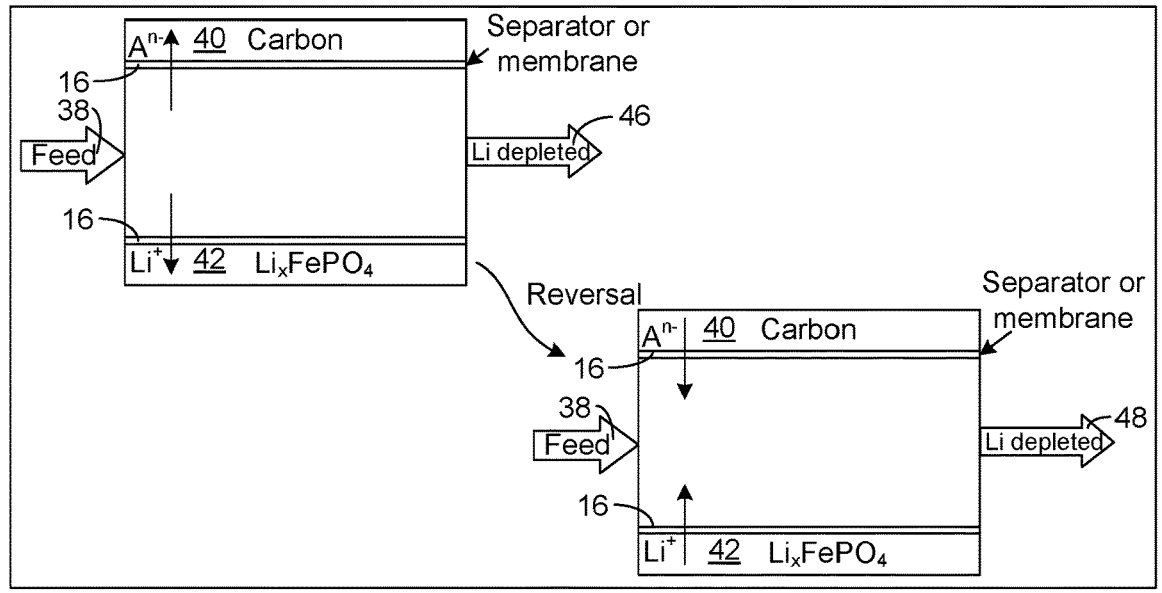
FIG. 72 is a schematic illustration of hybrid intercalation and traditional CDI for harvesting lithium or another target ion from solution. The example intercalation material shown is lithium iron phosphate, but any intercalation material could be used for any target ion.

Another application is lithium recovery. SED may be useful in recovering lithium from solutions containing lithium and the transition metals that go into lithium ion batteries. In such systems, lithium is generally present in higher concentrations than the multivalent transition metal cations (such as, e.g., manganese, cobalt and/or iron cations). As one of the initial steps in processing, all the multivalent ions could be selectively removed from a clean "lithium-only" stream. The lithium could then be electroplated out of this stream without worrying about the deposition of other metals into the solid phase. Of course, the "lithium-only" fluid would also have some anions present, but they may not interfere with the second extraction step. The electroplating step could instead be replaced by an intercalation process as a method to concentrate the lithium ions. Two possible intercalation processes are illustrated in FIGS. 71 and 72, which utilize $Li_{1-x}FePO_4$ and $Li_{1-x}FePO_4$ electrodes 40 and 42. Shock faradaic CDI is shown in FIG. 71. Both would benefit from having a stream in which the only metallic cation is lithium (or any target ion) to prevent damage to the intercalation material.

Yet another application is nuclear-wastewater treatment. Nuclear-power generation produces a lot of water that must be sealed away and buried to prevent human exposure. Ideally, this water would be concentrated before disposal, minimizing shipping and perpetual storage costs. In some circumstances, the selectivity of SEDs may be leveraged to concentrate the radioactive cations (e.g., by separating radioactive cobalt ions from lithium and cesium ions) in solution. In others, the complete deionization capabilities of SEDs can be used to concentrate everything in solution.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up or down by a factor of 1, 2, 3, 4, 5, 6, 8, 10, 20, 50, 100, etc.), or by rounded-off approximations thereof or within a range of the specified parameter up to or down to any of the variations specified above (e.g., for a specified parameter of 100 and a variation of $1/100^{th}$, the value of the parameter may be in a range from 0.99 to 1.01), unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for ion-selective separation by shock electrodialysis utilizing a system that includes at least one liquid conduit with at least one inlet port, at least one outlet port for a dilute stream, and at least one outlet port for a concentrated stream, wherein the system also includes a first electrode and a second-electrode-and-ion-selective-boundary configuration selected from (a) a second electrode and at least one distinct ion-selective boundary and (b) a second electrode that also serves as an ion-selective boundary, wherein the at least one distinct ion-selective boundary or the second electrode has a charge and is contained in the at least one liquid conduit adjacent to a porous medium or that functions as the porous medium, wherein the porous medium defines pore channels that are filled with a liquid including a plurality of species having a charge of the same sign, wherein the pore channels have a surface charge, and wherein the charge of the ion-selective boundary and surface charge of the pore channels share a sign, the method comprising:

flowing the liquid into the inlet port and through the pore channels, forming a thin diffuse electrochemical double layer at an interface of the liquid and the charged surface of the pore channels in the porous medium with a liquid bulk volume beyond the double layer in the pore channels;

applying a voltage differential between the electrodes across the porous medium, wherein the voltage differential has a magnitude set to selectively draw a first of the species in the liquid toward at least one of the electrodes to a greater extent than an extent to which a second of the species is drawn toward the same electrode, wherein the species are dissolved ion species, and wherein the first species has a higher valence than the second species;

via the application of the voltage differential, producing current at the electrodes by either Faradaic reactions or by capacitive charging and discharging and creating a shock in the charged-species concentration in the bulk volume of the liquid within the pore channels, wherein the concentration of the first species in a depleted zone of the liquid bulk volume between the shock and the ion-selective boundary is substantially lower than the concentration of the second species in the liquid bulk volume between the shock and the first electrode, and wherein electric current flows primarily through the double layers or micropores in the region between the shock and the ion-selective boundary, while electric current flows primarily through the liquid bulk volume in the region between the shock and the first electrode;

extracting the dilute stream from the depleted zone of the bulk volume in the porous medium by flow to the at least one outlet port for the dilute stream between the shock and the ion-selective boundary; and flowing the first species in the concentrated stream on an opposite side of the shock from the depleted zone, wherein the at least one outlet port for the concentrated stream is separated across the porous medium from the at least one outlet port for the dilute stream by the shock and not by a membrane.

2. The method of claim 1, wherein the electrodes comprise a cathode and an anode.

3. The method of claim 2, wherein the first and second species are both cations, wherein the system includes a pair of cation exchange membranes, wherein a first of the cation exchange membranes is between the anode and the porous medium, and wherein a second of the cation exchange membranes is between the cathode and the porous medium.

4. The method of claim 3, wherein three inlet streams are fed into the system, including a first and a second electrode flush stream and a feed stream, wherein the first and second electrode flush streams respectively flow through (a) a first flush channel between the first cation exchange membrane and the anode and (b) a second flush channel between the second cation exchange membrane and the cathode, and wherein the feed stream flows between the cation exchange membranes.

5. The method of claim 4, further comprising adding acid to the second flush channel.

6. The method of claim 4, further comprising adding a buffer to at least one of the electrode flush streams.

7. The method of claim 6, wherein the buffer is sodium citrate.

8. The method of claim 1, wherein the charged species of the higher valence is magnesium, and wherein the charged species of the lower valence is sodium.

9. The method of claim 1, wherein a plurality of inlet streams is fed into the system, the method further comprising determining and establishing a flow rate of at least one of the streams that increases the selectivity with which the first species is drawn to the electrode.

10. The method of claim 1, further comprising determining and utilizing a pore size for the porous medium that increases the selectivity with which the first species is drawn to the electrode.

11. The method of claim 1, further comprising determining and utilizing a surface charge for the porous medium that increases the selectivity with which the first species is drawn to the electrode.

12. The method of claim 1, further comprising positioning a splitter to establish a boundary separating the outlet for the dilute stream and the outlet for the concentrated stream such that the first species is selectively drawn into the dilute stream.

13. The method of claim 1, further comprising determining and establishing the magnitude of the voltage differential as a function of the dissolved ion content in the liquid.

14. The method of claim 1, wherein the liquid fed to the system is selected from flowback water from hydraulic fracturing, radioactively contaminated waste from nuclear energy production, feed for tap water, and liquid recovered from a lithium battery.

15. The method of claim 1, wherein the species are selected from ion species, proteins, other molecules, liquids, particles, and microbes.

16. The method of claim 1, wherein the second species, which is less drawn toward the same of the at least one of the electrodes as the first species, is removed in the dilute stream as a target species substantially isolated from other species, which are selectively drawn to the concentrated stream.

17. The method of claim 1, wherein the pore channels have a width in a range from 100 nm to 10 μm.

* * * * *